(12) United States Patent
Yu et al.

(10) Patent No.: US 10,914,971 B2
(45) Date of Patent: Feb. 9, 2021

(54) OPTOELECTRONIC COMPONENT

(71) Applicant: ROCKLEY PHOTONICS LIMITED, London (GB)

(72) Inventors: Guomin Yu, Alhambra, CA (US); Hooman Abediasl, Los Angeles, CA (US); Damiana Lerose, Pasadena, CA (US); Kevin Masuda, Alhambra, CA (US); Andrea Trita, Pasadena, CA (US); Aaron Zilkie, Pasadena, CA (US)

(73) Assignee: Rockley Photonics Limited, London (GB)

( * ) Notice: Subject to any disclaimer, the term of this patent is extended or adjusted under 35 U.S.C. 154(b) by 145 days.

(21) Appl. No.: 15/321,723

(22) PCT Filed: Nov. 10, 2016

(86) PCT No.: PCT/EP2016/077338
§ 371 (c)(1),
(2) Date: Dec. 22, 2016

(87) PCT Pub. No.: WO2017/081196
PCT Pub. Date: May 18, 2017

(65) Prior Publication Data
US 2017/0299902 A1    Oct. 19, 2017

Related U.S. Application Data

(60) Provisional application No. 62/351,189, filed on Jun. 16, 2016, provisional application No. 62/254,674, filed on Nov. 12, 2015.

(30) Foreign Application Priority Data

Jun. 30, 2016 (GB) .................................. 1611427.4

(51) Int. Cl.
*G02F 1/025* (2006.01)
*G02F 1/015* (2006.01)
(Continued)

(52) U.S. Cl.
CPC ........... *G02F 1/025* (2013.01); *G02B 6/1228* (2013.01); *G02B 6/131* (2013.01); *G02B 6/136* (2013.01);
(Continued)

(58) Field of Classification Search
CPC ................................ G02F 1/015; G02F 1/025
See application file for complete search history.

(56) References Cited

U.S. PATENT DOCUMENTS 5,757,986 A    5/1998    Crampton et al.
6,584,239 B1   6/2003    Dawnay et al.
(Continued)

FOREIGN PATENT DOCUMENTS

CN    104393133 A    3/2015
EP    2 908 169 A1   8/2015
(Continued)

OTHER PUBLICATIONS

U.K. Intellectual Property Office Examination Report, dated Nov. 20, 2017, for Patent Application No. GB1611427.4, 3 pages.
(Continued)

*Primary Examiner* — Chris H Chu
(74) *Attorney, Agent, or Firm* — Lewis Roca Rothgerber Christie LLP

(57) ABSTRACT

An optoelectronic component including a waveguide, the waveguide comprising an optically active region (OAR), the OAR having an upper and a lower surface; a lower doped region, wherein the lower doped region is located at and/or adjacent to at least a portion of a lower surface of the OAR, and extends laterally outwards from the OAR in a first (Continued)

direction; an upper doped region, wherein the upper doped region is located at and/or adjacent to at least a portion of an upper surface of the OAR, and extends laterally outwards from the OAR in a second direction; and an intrinsic region located between the lower doped region and the upper doped region.

29 Claims, 76 Drawing Sheets

(51) Int. Cl.
   *G02B 6/122*   (2006.01)
   *G02B 6/13*    (2006.01)
   *G02B 6/136*   (2006.01)
   *G02F 1/17*    (2019.01)
   *G02F 1/21*    (2006.01)
   *G02B 6/12*    (2006.01)

(52) U.S. Cl.
   CPC .............. *G02F 1/015* (2013.01); *G02F 1/174* (2013.01); *G02F 1/21* (2013.01); *G02B 2006/12097* (2013.01); *G02F 2001/212* (2013.01)

(56) References Cited

U.S. PATENT DOCUMENTS

| | | | |
|---|---|---|---|
| 7,684,655 | B2 | 3/2010 | Vonsovici et al. |
| 8,053,790 | B2 | 11/2011 | Feng et al. |
| 8,093,080 | B2 | 1/2012 | Liao et al. |
| 8,242,432 | B2 | 8/2012 | Feng et al. |
| 8,346,028 | B2 | 1/2013 | Feng et al. |
| 8,693,811 | B2 | 4/2014 | Morini et al. |
| 8,817,354 | B2 | 8/2014 | Feng et al. |
| 9,287,432 | B2 | 3/2016 | Shi et al. |
| 2004/0201079 | A1 | 10/2004 | Scott et al. |
| 2007/0280309 | A1 | 12/2007 | Liu |
| 2008/0260320 | A1 | 10/2008 | Laval et al. |
| 2012/0033910 | A1* | 2/2012 | Morini ................ G02F 1/025 385/3 |
| 2012/0070111 | A1 | 3/2012 | Shin et al. |
| 2014/0138789 | A1 | 5/2014 | Lim et al. |

FOREIGN PATENT DOCUMENTS

| | | |
|---|---|---|
| GB | 2 372 577 A | 8/2002 |
| GB | 2552617 A | 10/2016 |
| GB | 2552618 A | 1/2018 |
| WO | WO 02/082176 A1 | 10/2002 |
| WO | WO 2011/089386 A1 | 7/2011 |
| WO | WO 2011/101632 A1 | 8/2011 |
| WO | WO 2016/139484 A1 | 9/2016 |

OTHER PUBLICATIONS

Azadeh, Saeed Sharif et al., "Low $V_\pi$ Silicon photonics modulators with highly linear epitaxially grown phase shifters", Optics Express, Sep. 7, 2015, pp. 23526-23550, vol. 23, No. 18.

Invitation to Pay Additional Fees and Partial Search Report dated Jan. 27, 2017 in related International Application No. PCT/EP2016/077338, 8 pages.

U.K. Intellectual Property Office Examination Report, dated Sep. 19, 2017, for Patent Application No. GB1611427.4, 3 pages.

International Search Report and Written Opinion of the International Searching Authority, dated Mar. 21, 2017, Corresponding to PCT/EP2016/077338, 19 pages.

U.K. Intellectual Property Office Search Report, dated Dec. 15, 2016, for Patent Application No. GB1611427.4, 5 pages.

Kim, Younghyun et al., "Strain-induced enhancement of plasma dispersion effect and free-carrier absorption in SiGe optical modulators", Scientific Reports, Apr. 15, 2014, pp. 1-6.

Kim, Younghyun et al., "Supplementary information Strain-induced enhancement of plasma dispersion effect and free-carrier absorption in SiGe optical modulators", pp. 1-14.

U.K. Intellectual Property Office Search and Examination Report, dated Jan. 22, 2019, for Patent Application No. GB1808434.3, 10 pages.

European Patent Office Communication pursuant to Article 94(3) EPC, dated Nov. 27, 2019, for Patent Application No. 16 794 338.0, 10 pages.

Feng, Dazeng et al., "High-Speed GeSi Electroabsorption Modulator on the SOI Waveguide Platform", IEEE Journal of Selected Topics in Quantum Electronics, Nov./Dec. 2013, 10 pages, vol. 19, No. 6, IEEE.

U.K. Intellectual Property Office Examination Report, dated Jan. 9, 2020, for Patent Application No. GB1808434.3, 3 pages.

U.K. Intellectual Property Office Search Report, dated Mar. 19, 2020, for Patent Application No. GB1808434.3, 2 pages.

European Patent Office Communication pursuant to Article 94(3) EPC, dated Jul. 14, 2020, for EP 16 794 338.0, 7 pages.

* cited by examiner

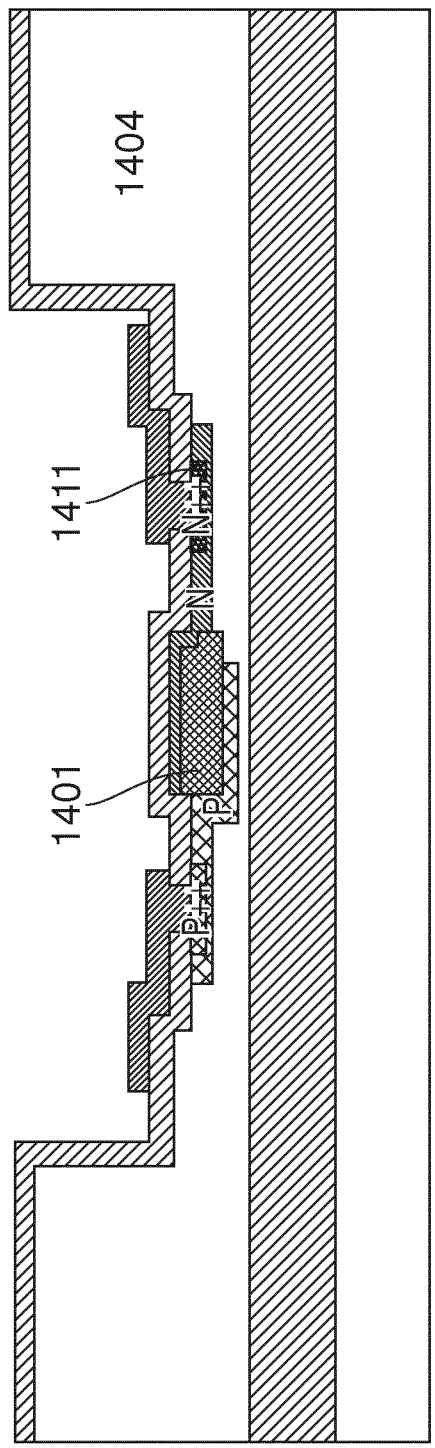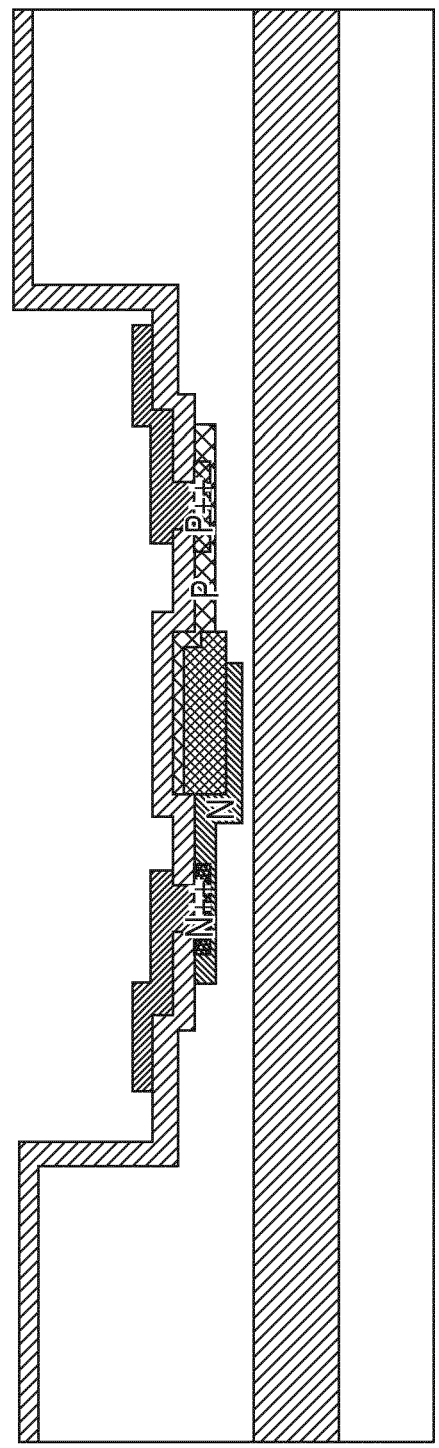
FIG. 14A
FIG. 14B

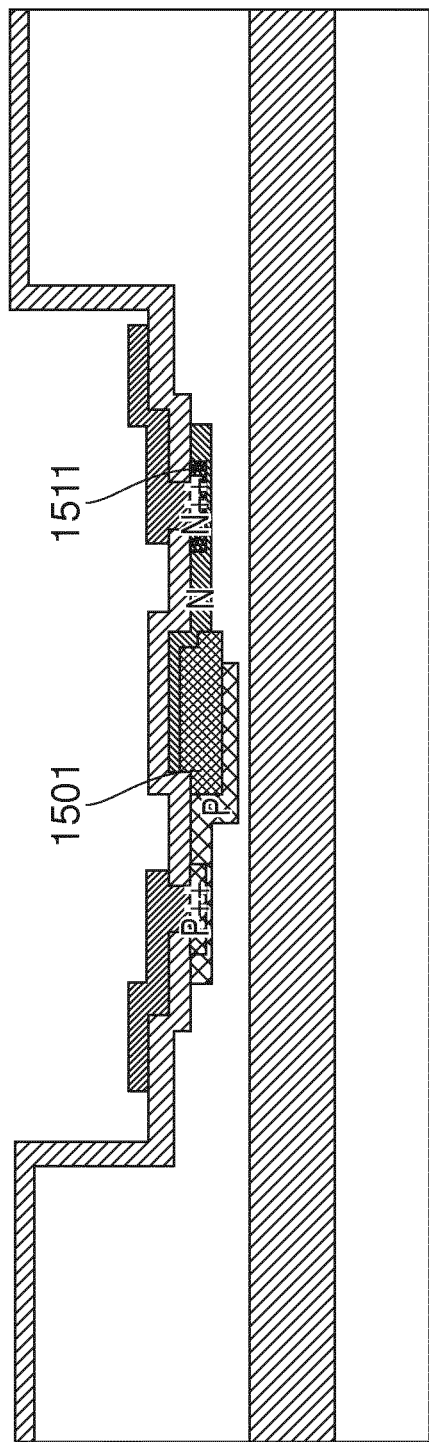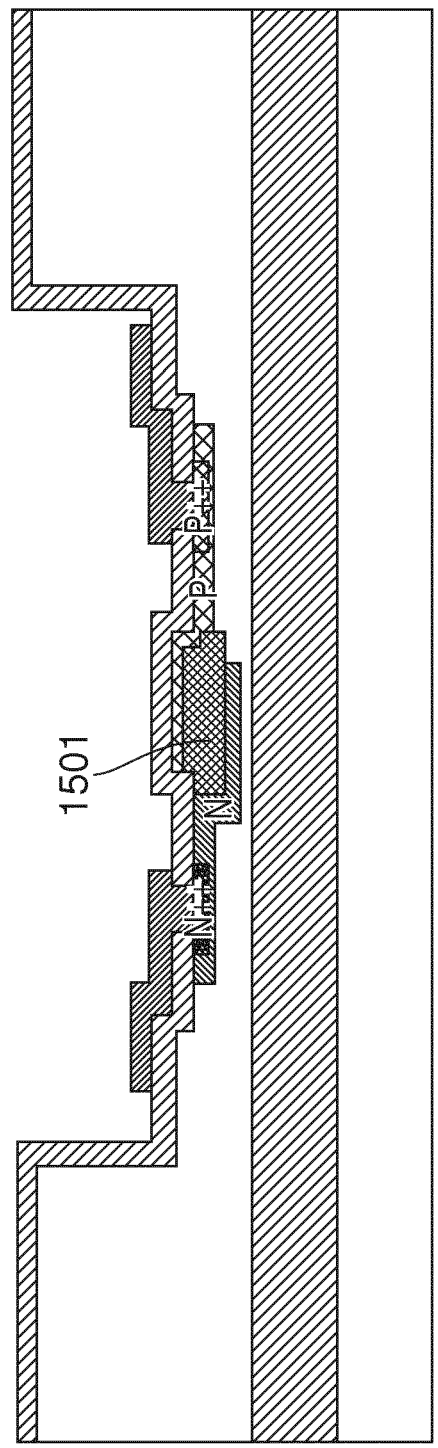
FIG. 15A
FIG. 15B

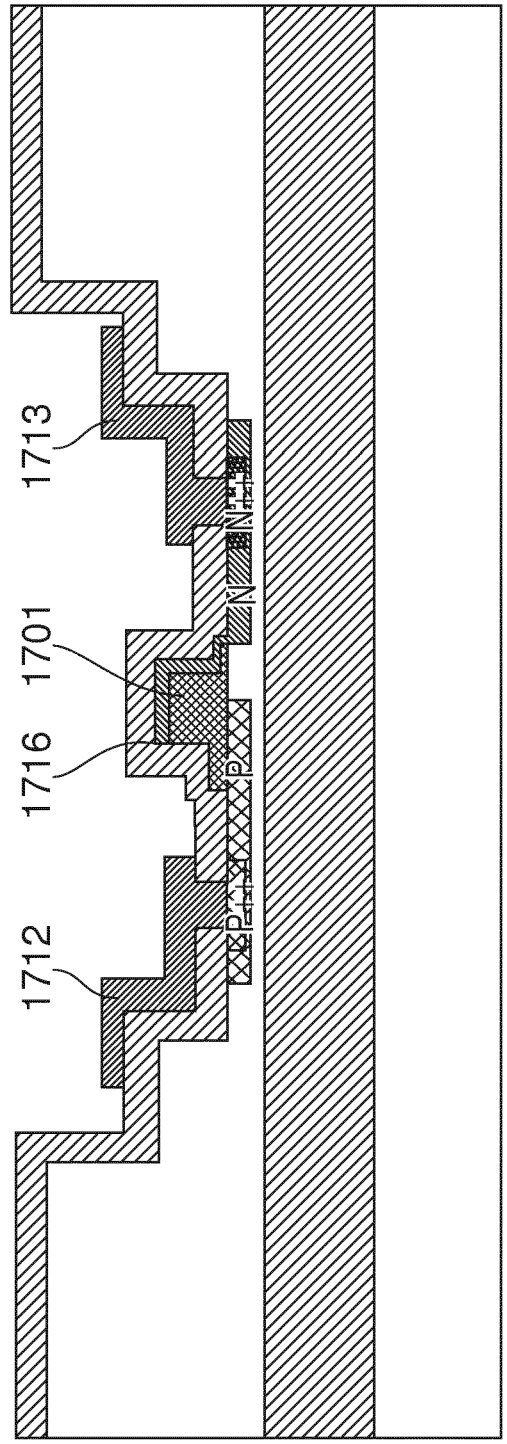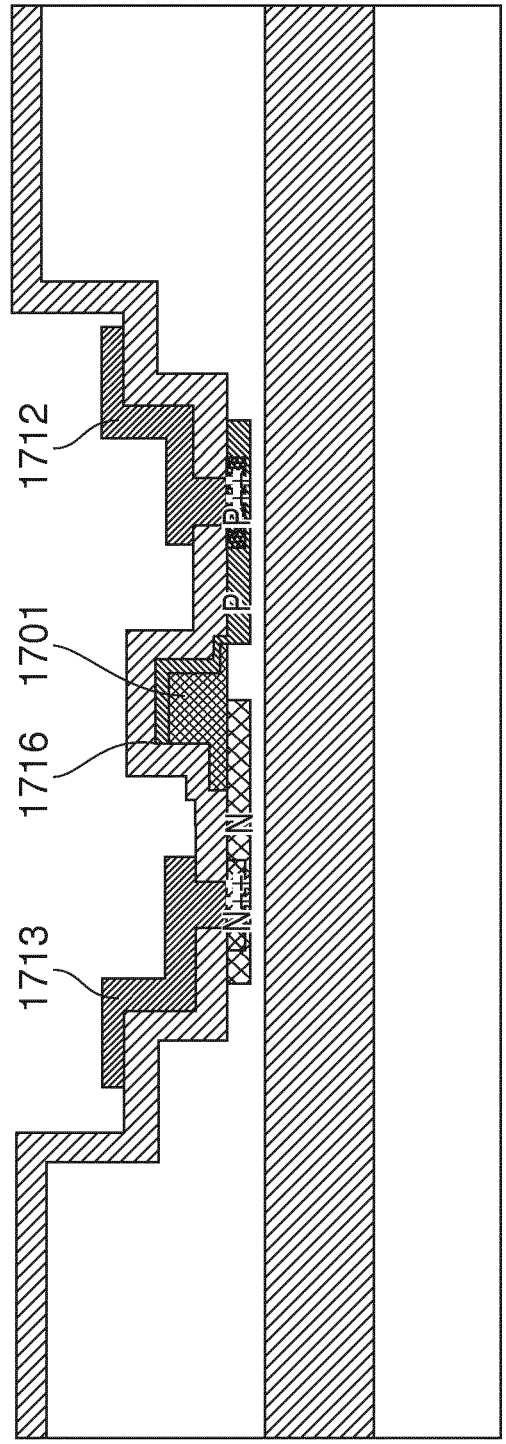

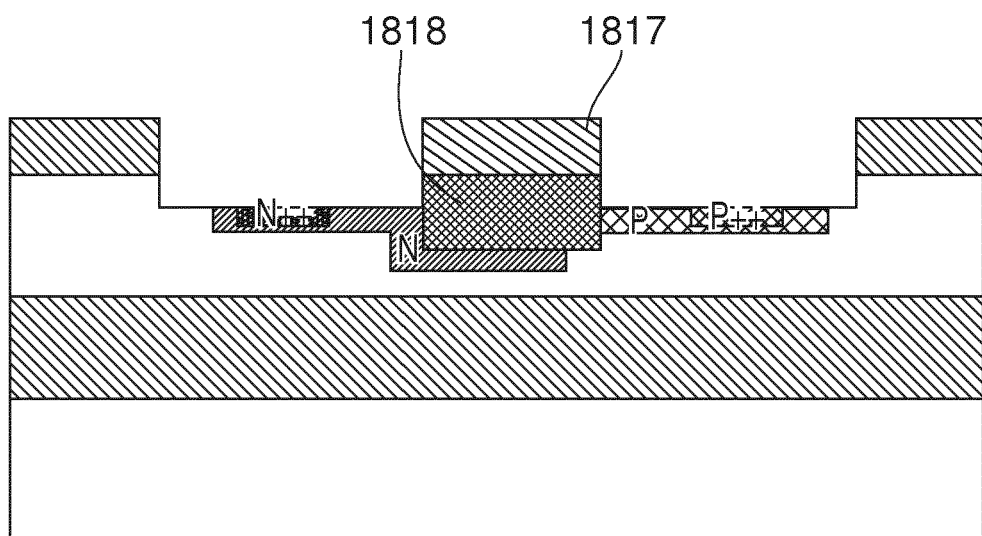
(1)
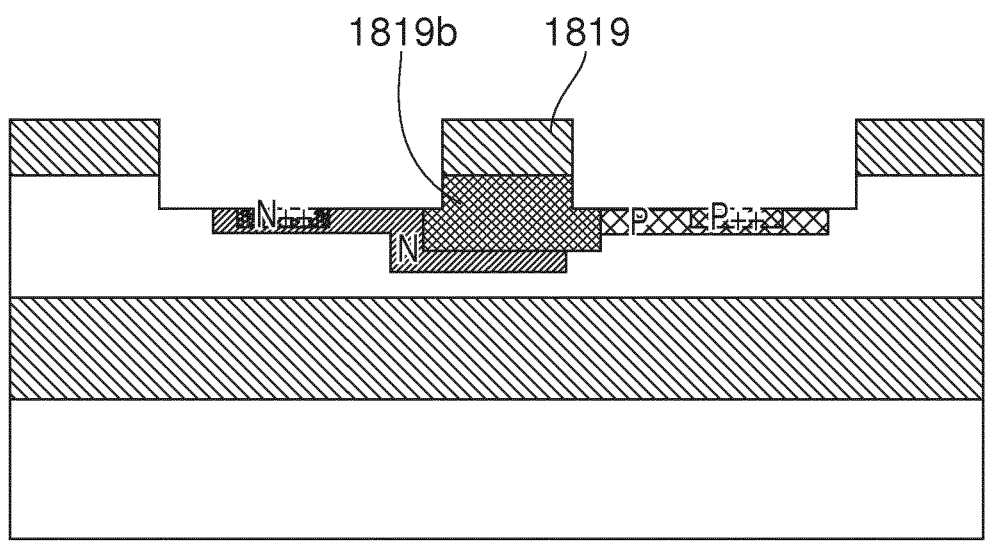
(2)
FIG. 18k

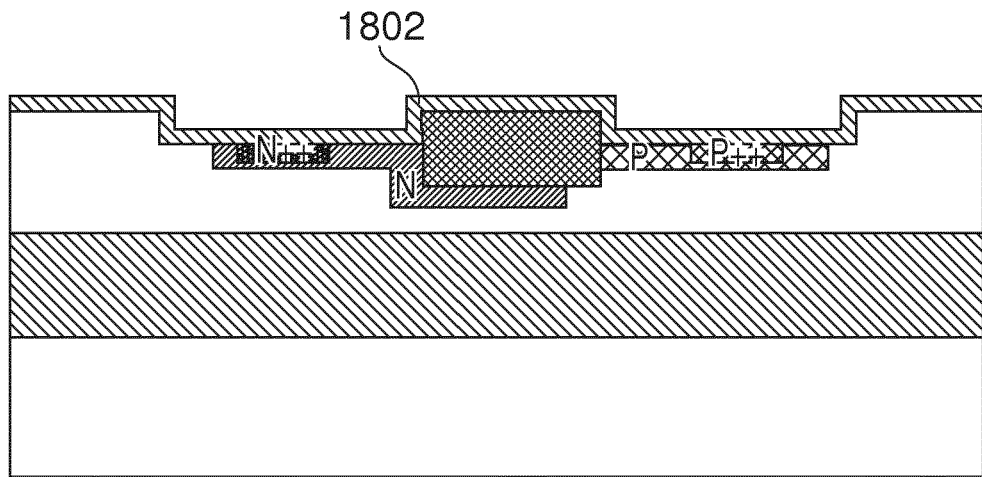
(1)
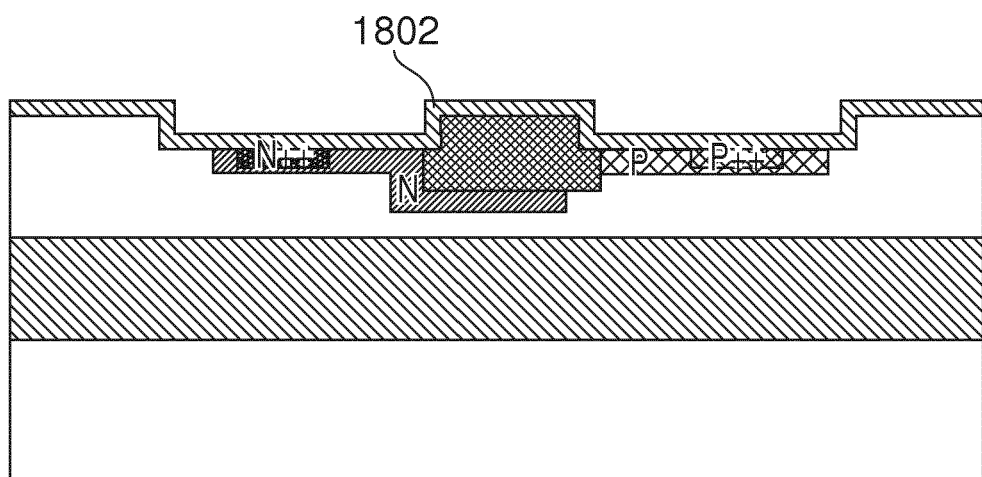
(2)
FIG. 18I

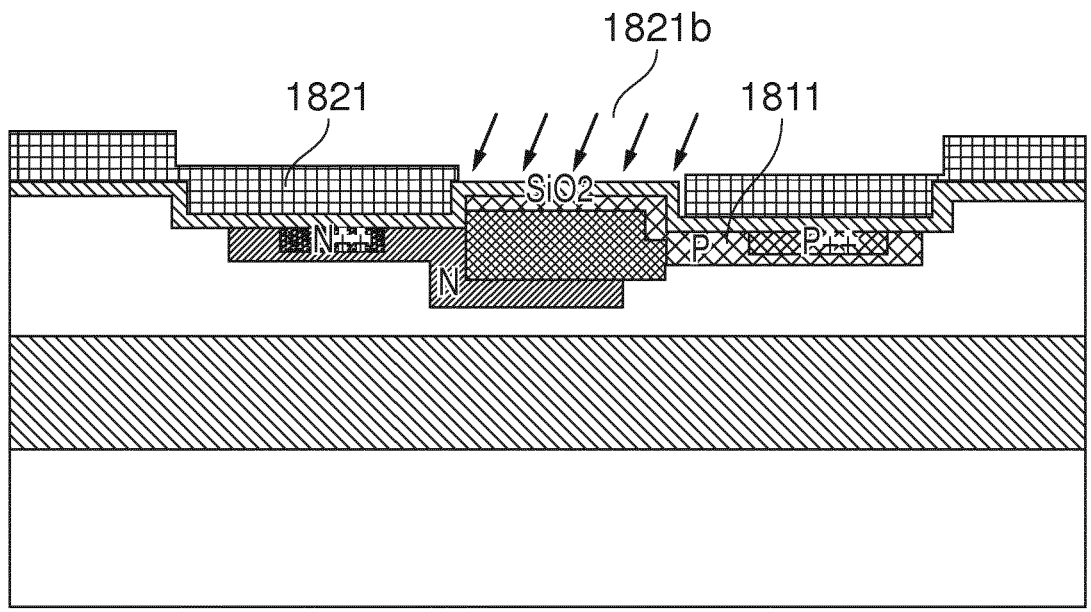
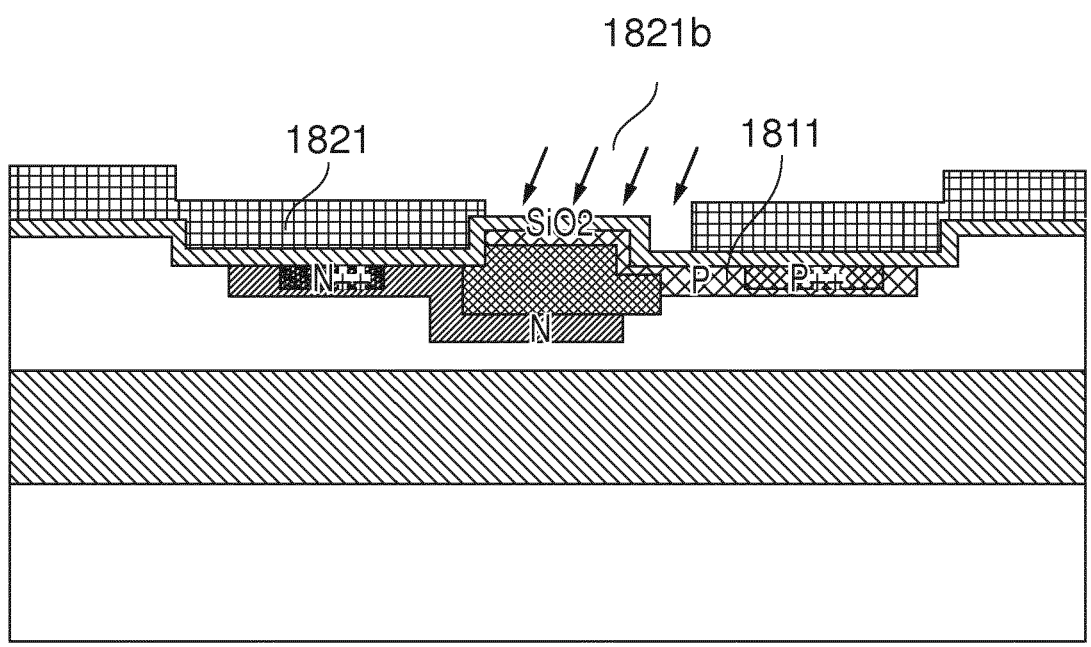
FIG. 18m

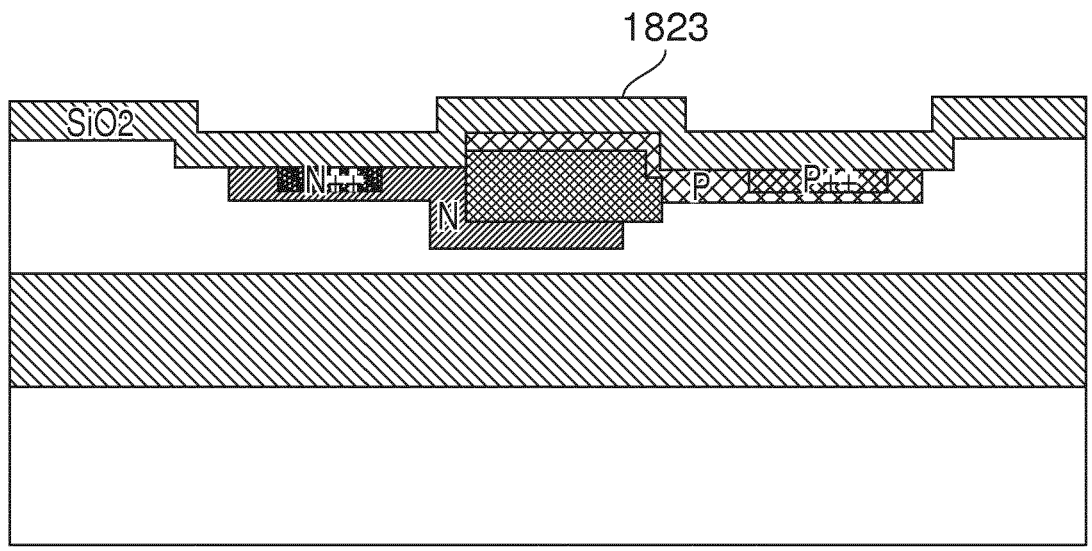
(1)
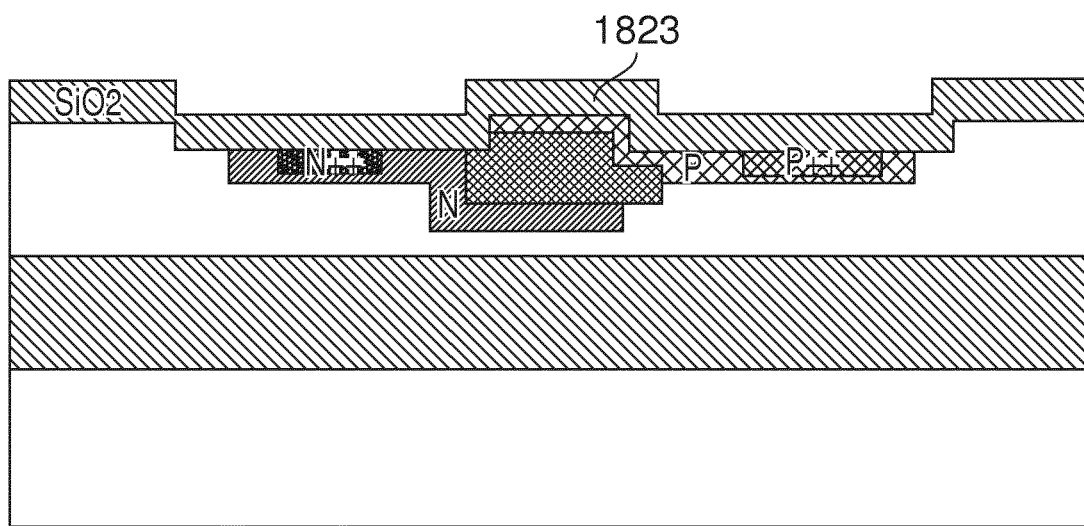
(2)
FIG. 18n

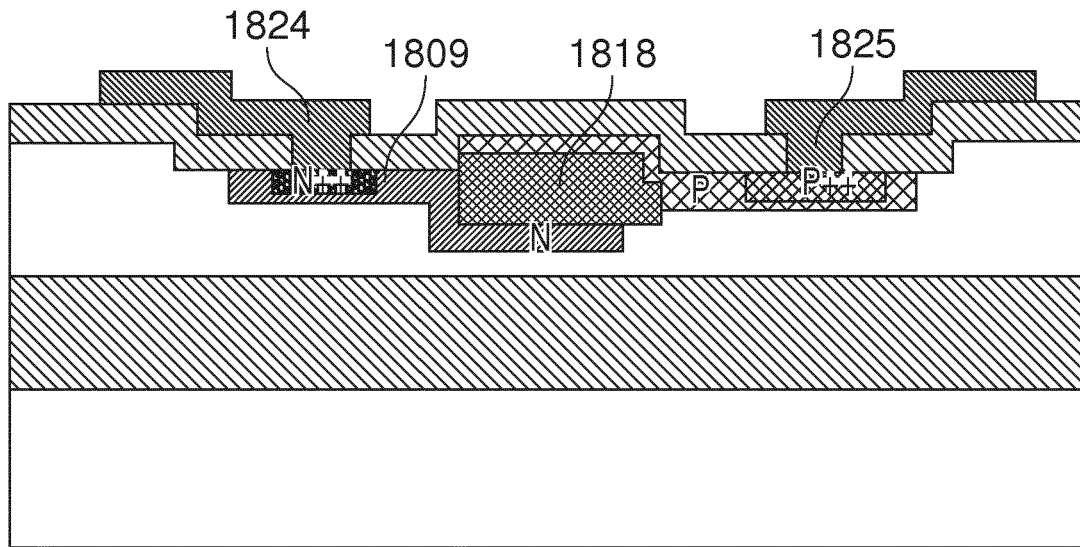
(1)
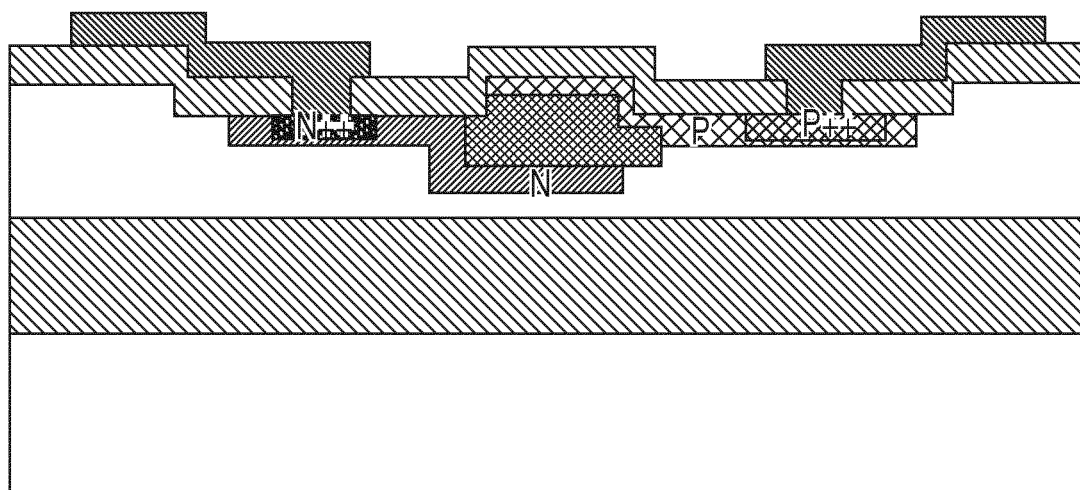
(2)
FIG. 18o

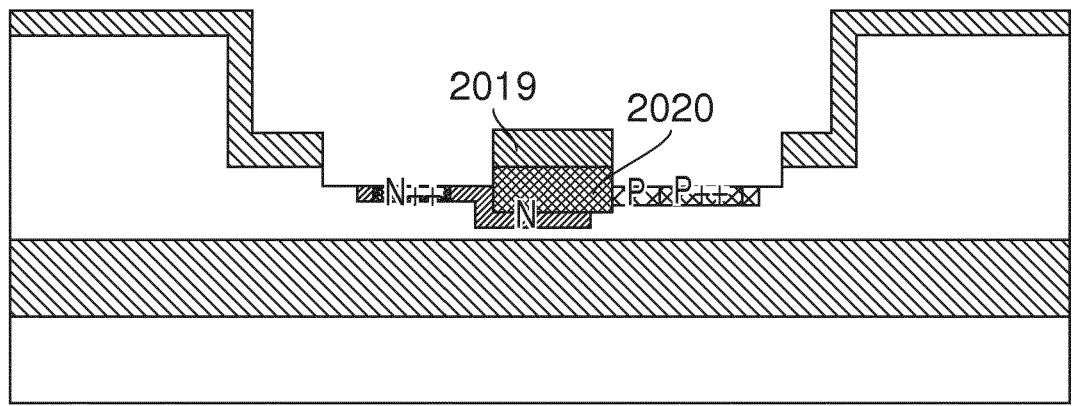
(1)
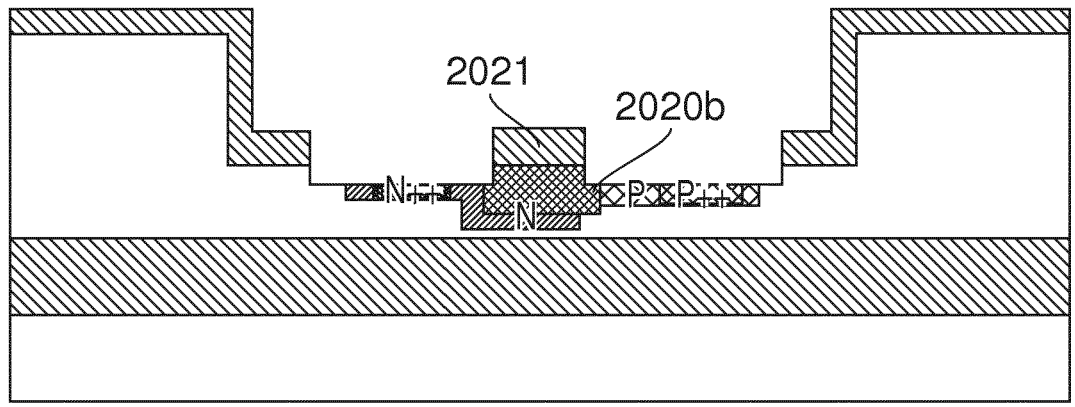
(2)
FIG. 20m

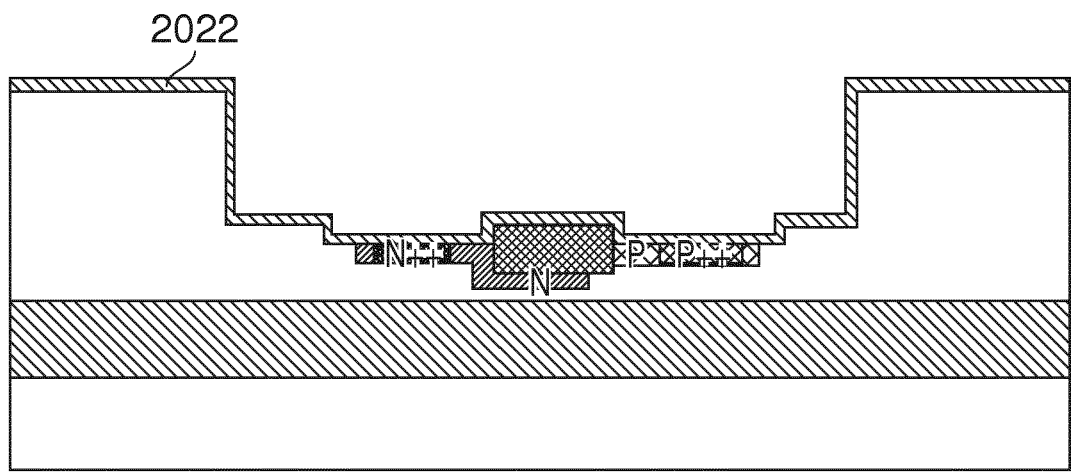
(1)
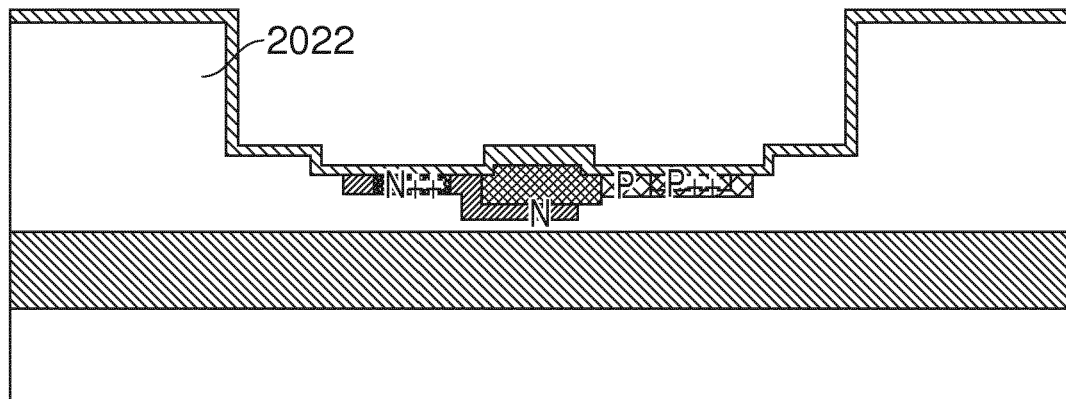
(2)
FIG. 20n

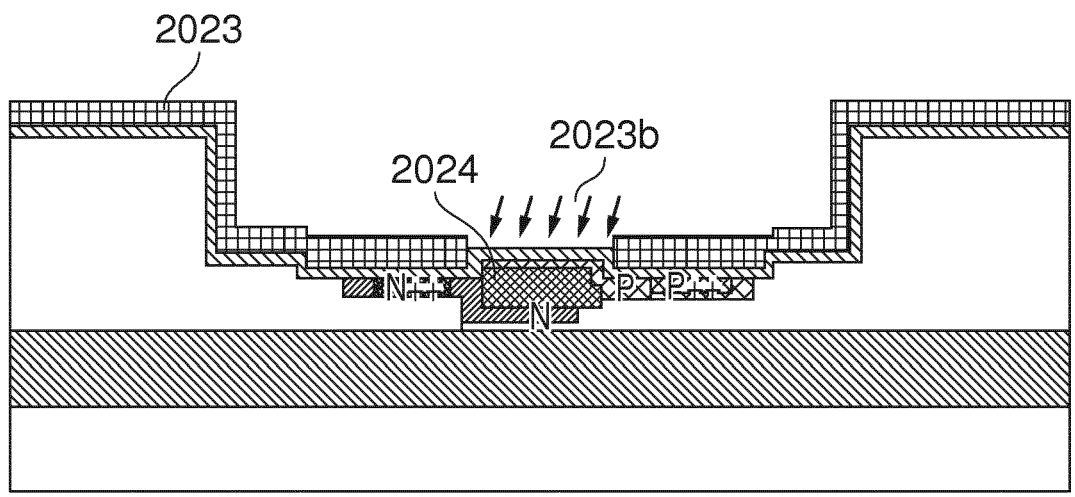
(1)
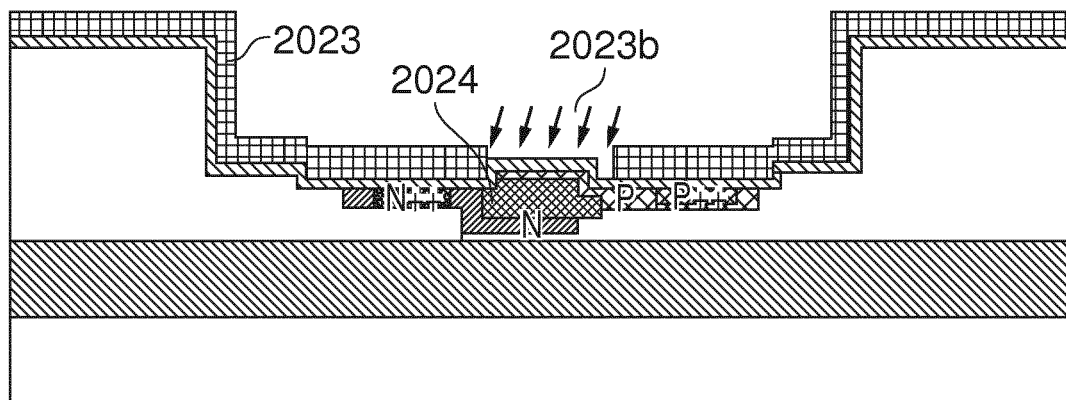
(2)
FIG. 20o

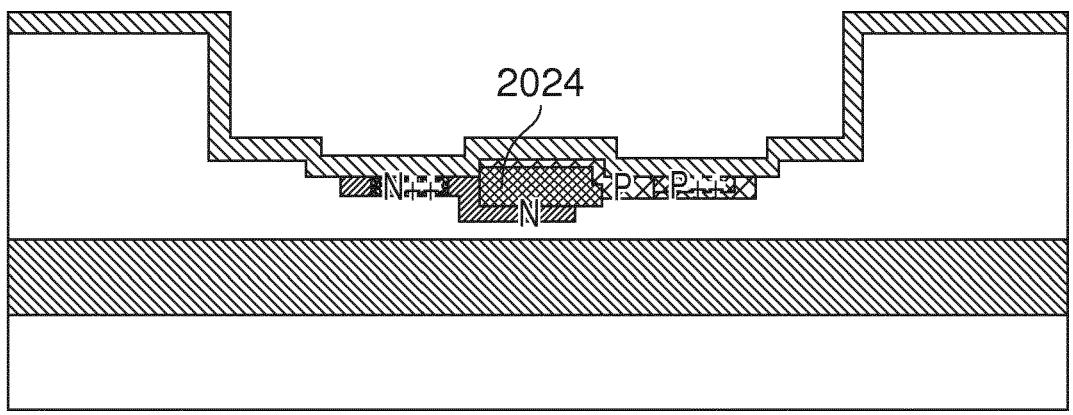
(1)
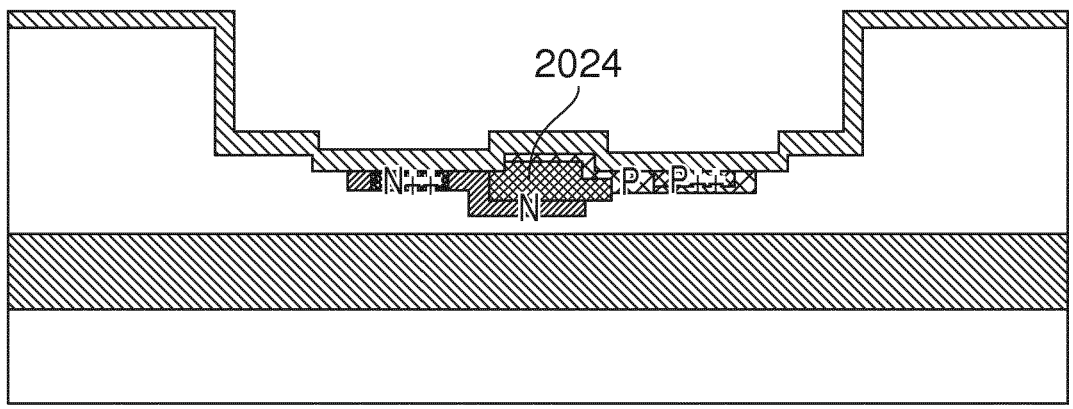
(2)
FIG. 20p

OPTOELECTRONIC COMPONENT

CROSS-REFERENCE TO RELATED APPLICATION(S)

This application is a National Phase Patent Application and claims priority to International Application Number PCT/EP2016/077338, filed on Nov. 10, 2016, which claims priority to and the benefit of U.S. Provisional Patent Application No. 62/254,674, filed on Nov. 12, 2015, U.S. Provisional Patent Application No. 62/351,189, filed on Jun. 16, 2016, and United Kingdom Patent Application Number GB 1611427.4, filed on Jun. 30, 2016, the entire contents of all of which are incorporated herein by reference.

FIELD

The present invention relates to optoelectronic component, more particularly to an optoelectronic component with an optically active region having a waveguide ridge.

BACKGROUND

In the construction of optical modulators and photodiodes in planar lightwave circuits/waveguides, there may be problems with performance and ease of manufacture and cost. In the case of PIN junction devices such as SiGe modulators and Ge photodetectors there is a need for a common structure to make simpler the design and manufacture of devices where they are integrated.

For modulators with a silicon/germanium (SiGe) medium, the Franz-Keldysh (FK) effect with lumped electrodes is used to achieve small size, high speed, low driving power consumption and ease of manufacture. A silicon/germanium region provides an electro-absorption effect that may be effective for operation in the C- and L-bands of the optical spectrum.

In modulator waveguide structures the active waveguide may be made of SiGe and the SiGe waveguides may be doped on their sides to provide effective electric contacts and to generate an electric field in the SiGe waveguide.

The PIN devices may create a field across the active intrinsic region and the shape of this field may affect performance. Thus, a design framework may be employed that allows the device designer to obtain the most effective field whilst being easy to manufacture. Essentially devices fall into the categories vertical and horizontal. Vertical devices typically have contacts at the top and bottom of the structure. In embodiments of this invention the device field is effectively vertical (although may be somewhat diagonal) but the contacts are lateral whilst the structure is relatively easy to manufacture.

SUMMARY

Accordingly, embodiments of the present invention aim to solve the above problems by providing an optoelectronic component comprising: an optically active region (OAR), including a waveguide ridge, the OAR having an upper surface and a lower surface; a lower doped region, wherein the lower doped region is located at and/or adjacent to at least a portion of the lower surface of the OAR, and extends laterally outwards from the waveguide ridge in a first direction; an upper doped region, wherein the upper doped region is located at and/or adjacent to at least a portion of the upper surface of the waveguide ridge of the OAR, and extends laterally outwards from the waveguide in a second direction; and an intrinsic region located between the lower doped region and the upper doped region.

By "at and/or adjacent" it should be understood that the lower doped region could comprise: a doped region located within the OAR itself at its lower surface; and/or a doped region outside of the OAR but adjacent (i.e. in electrical contact with) its lower surface.

Similarly, the upper doped region could comprise: a doped region located within the OAR itself at its upper surface; and/or a doped region outside of the OAR but adjacent (i.e. in electrical contact with) its upper surface.

The first and second directions may be directly opposite to one another so that they extend away from respective side walls of the waveguide ridge in respective opposite directions.

Further optional features of embodiments of the first aspect of the invention are set out below.

In some embodiments, the OAR may be formed from an optically active material. The optically active material may be a semiconductor material such as Ge or SiGe. The optically active material will at least in part be intrinsic semiconductor material but may be doped. The optically active material may be a lightly doped. The optically active material may be an intrinsic semiconductor, or intrinsic semiconductor with background n-doping or p-doping in the range of $10^{15}$-$10^{16}$ cm$^{-3}$.

In some embodiments, the OAR is formed from an electro-absorption medium in which the Franz-Keldysh effect occurs in response to the application of an applied electric field. In this way, the optical absorption within the OAR can be controlled by applying a voltage bias to the upper and lower doped regions. The optoelectronic component therefore functions as a modulator.

In other embodiments, the OAR is formed from a light absorbing medium suitable for generating a current upon detection of light when a voltage bias is applied across the upper and lower doped regions. In this way, the optoelectronic component functions as a photodiode.

The waveguide containing the OAR may be a ridge waveguide, rib waveguide, a strip waveguide or any suitable waveguide structure.

The waveguide of embodiments of the present invention may be formed on an SOI platform. SOI is a practical platform for the construction and integration of optical devices. The optoelectronic component of embodiments of the present invention may form part of a Silicon on Insulator planar light circuit (SOI-PLC).

The OAR is typically a single piece of optically active material (OAM) grown epitaxially onto a silicon on insulator platform. The lower surface of the OAR will be the surface which contacts the SOI layer onto which the OAR has been grown. The upper surface will be the opposite surface, furthest away from the SOI layer. The OAR will typically consist of a waveguide ridge portion, a first slab extending laterally away from the ridge in a first direction, and a second slab extending away from the ridge in the second direction.

The lower surface of the OAR therefore typically has a flat profile, extending along the interface between the OAR and the upper surface of the SOI layer. The upper surface of the OAR will have a more complex profile which, when taken in cross section may include: the upper surface of the waveguide ridge; the side walls of the waveguide ridge; the upper surface of the first slab and the upper surface of the second slab.

The doped regions may be configured to generate an electric field through the OAR with an electric field direction, wherein the electric field direction is different from the first and second directions. In general, the doped regions of embodiments of the present invention may extend substantially across the upper and lower surfaces of the OAR. An electric field may be formed between the first and second doped regions. The electric field may be generally vertically orientated. In the other words the electric field lines, extending between the first and second doped regions and through OAR, may be generally vertical. The electric field lines may extend between the top and bottom of the OAR. As light propagates along the waveguide, the electric field lines are therefore generally perpendicular to the light propagation direction.

The skilled person will appreciate that the electric field lines need not be exactly vertical. Field lines which are angled relative to a vertical orientation also fall within the scope of the present invention.

For example, if one or both of the doped regions at least partially cover a sidewall of the OAR, then the electric field lines may not be exactly vertical, or they may be inclined at an angle to the vertical. Similarly, if one or more of the doped regions does not completely cover the upper or lower sides of the OAR, then again the electric field lines may not be vertical, instead the electric field lines may be inclined at an angle to the vertical.

In some embodiments, the electric field direction is perpendicular or substantially perpendicular to the first and second directions.

Doped regions above and below the OAR would lead to a vertical field (i.e. one which is perpendicular to the first and second direction). The extension of doped regions laterally either side of the OAR leads to an electrical field which is substantially vertical or "off-vertical" in that the field lines may make an angle to the vertical of 0-45 degrees.

The optically active region may be formed from an optically active material, for example SiGe or Ge.

In some embodiments, the upper surface of the ridge of the waveguide at the OAR is parallel to the lower surface of the OAR. This allows the electric field formed between the first doped region and the second doped region to be generally vertically orientated. Furthermore, the parallel upper and lower surfaces allow the electric field strength to be generally constant across the width of the waveguide.

The upper surface of the OAR may be opposite to the lower surface of the OAR. In other words, the upper surface may be above the lower surface.

Optionally, the optoelectronic component further comprises a first electrode contacting the lower doped region at a first contact surface, and a second electrode contacting the upper doped region at a second contact surface; wherein the first contact surface is laterally offset from the waveguide ridge in the first direction; and wherein the second contact surface is laterally offset from the waveguide ridge in the second direction.

In some embodiments, the first and second contact surfaces are aligned with one another along a lateral plane. This lateral plane may take the form of a plane parallel to the plane of the optoelectronic chip i.e. specifically parallel to or substantially parallel to the box layer.

The electrodes may be laterally disposed to either side of the waveguide ridge. The surfaces at which the electrodes contact the doped regions may be laterally offset from the waveguide ridge. The lateral offset of each contact surface may be in a direction that is generally perpendicular to the orientation to the field lines. In other words the field lines will have a vertical component. In some embodiments, the field lines may be orientated vertically or substantially vertically, whereas the electrode contact surfaces are offset from the waveguide ridge of the OAR in a direction orthogonal or substantially orthogonal from the field, i.e. in a horizontal or substantially horizontal direction. It is important that the electrode contact surfaces are separated from the waveguide ridge of the OAR because the presence of metal in the vicinity of the waveguide ridge of the OAR causes optical loss.

In some of the embodiments described herein, the amplitude or phase of the light through the OAR of the waveguide is controlled via the Franz-Keldysh effect. In other embodiments, the amplitude or phase of light through the waveguide is controlled via the free carrier plasma dispersion effect.

The electric field formed across the OAR may change the effective refractive index of the optically active material. In turn, light will propagate differently in the OAR because of the change in effective refractive index of the optically active material caused by the application of the electric field. By controlling the voltage applied to the electrodes therefore, it is possible to control at least one property of the light contained in the OAR. This change in property of the optically active material may, for example, be used to modulate light passing through the OAR (i.e. phase modulation).

Where the optoelectronic device includes a PIN junction, in a suitable material such as SiGe and a reverse bias is applied, the Frank-Keldysh effect can be utilised, and this can give rise to a modulator with a high speed.

For a PIN junction under forward bias carrier injection will occur, leading to a lower speed modulator operating by the free carrier plasma dispersion effect.

The OAR may be formed from a material in which the Franz-Keldysh effect occurs in response to the application of an electrical bias between the doped regions, and the consequent electric field which is formed. The Franz-Keldysh effect is a change in optical absorption and/or optical phase of light with a certain wavelength passing through the OAR, where the OAR is a bulk semiconductor material. The Franz-Keldysh effect is caused by the presence of an electric field in the active material OAR.

Increasing the electric field may increase the amount of light absorbed by the OAR. Accordingly, electronics that are connected to the electrodes can be used to tune the electrical field so as to tune the amount of light absorbed by the active material of the OAR.

As a result, the electronics can modulate the electric field in order to modulate the amplitude of a light signal.

The optoelectronic component of embodiments of the present invention may also be used as a photodetector by applying a reverse bias across the OAR. The reverse bias may be achieved by suitable application of electrical charge to the electrodes, which are electrically connected to the upper and lower doped regions. This reverse bias means that at least some of the light passing through the OAR will be absorbed by the OAR to generate electron-hole pairs that cause a current to flow through the OAR between the upper and lower doped regions (or between the lower and upper doped regions). Measurement of such a current flow may then be indicative of the receipt of a light signal. The magnitude of the current generated may depend on the power or intensity of the light received (the light passing through the OAR). In this way, the active optical waveguide can be configured to operate as a photodetector.

The electrodes may extend from the electrode contact surface to an upper surface of the component. This allows access to the electrode for the application of a voltage. The voltage signal is then transmitted across the electrode contact surface to the doped region. That the electrode corresponding to the lower doped region and the electrode corresponding to the upper doped region are accessible from an upper surface of the component makes attaching further electronic components to the electrodes easier. The further electronics may include the electronics for providing signal voltages to the doped regions. Similarly, the electrodes may be used to measure voltages or currents from the doped regions.

Optionally, the first electrode contact surface is laterally offset from the waveguide ridge of the OAR in the first direction.

Optionally, the second electrode contact surface is laterally offset from the waveguide ridge of the OAR in the second direction.

Where the electrode contact surfaces are on opposite sides of the OAR, there is an effective use of space, allowing easier access to the first and second electrodes. This in turn allows for smaller optoelectronic components. For example, the electrode corresponding to the lower doped region may be on the left hand side of the waveguide and the electrode contact surface corresponding to the upper doped region may be on the right hand side (or vice versa).

Optionally, the inner edges of the first and second electrode contact surfaces are equidistant from their respective closest edge of the waveguide ridge. "Inner edge of the contact surface" means the closest point to the waveguide ridge of the electrode contact surface. "Electrode contact surface" means the area at which the electrode is attached to the doped region (either upper or lower). In this way, the electrode contact surfaces may be spaced symmetrically about the OAR.

Optionally, the inner edges of the first and second electrode contact surfaces may not be equidistant from their respective closest edges of the waveguide ridge of the OAR. In other words, either the inner edge of the first contact surface may be further from the waveguide ridge of the OAR than the inner edge of the second contact surface, or the inner edge of the second contact surface may be further from the waveguide ridge of the OAR than the inner edge of the first contact surface. The electrode contact surfaces may be spaced asymmetrically about the waveguide ridge of the OAR. The proximity of the electrode contact surface to the waveguide ridge of the OAR affects the possible modulation switching speed of the component. Faster modulation speeds are possible when the electrode contact surfaces are closer to the waveguide ridge of the OAR.

In some embodiments, the separation of the inner edge of one or both of the contact surface(s) and the closest edge of the waveguide ridge of the OAR is no more than 1 micron.

In some embodiments, the separation of the inner edge of one or more of the contact surface and the closest edge of the waveguide ridge of the OAR is no more than 2 microns.

The first and second electrodes may be formed from aluminum or other suitable materials such as (but not restricted to) gold, copper or silver.

The electrode contact surfaces may each be planar or generally planar.

In some embodiments, the first and second contact surfaces are in the same lateral plane. In this way, the fabrication of both contact surfaces (i.e. interfaces between the electrodes and the respective doped regions) could be achieved in the same fabrication step.

In some embodiments, the contact plane passes through the waveguide ridge of the OAR.

The first and second contact surfaces may not be in the same lateral plane. In other words the first electrode contact surface may be vertically offset from the second electrode contact surface.

In some embodiments, the first contact surface may be in the same plane as a lower surface of the OAR.

In some embodiments, the contact plane does not pass through the waveguide ridge of the OAR. The first and second electrode contact surfaces may be in a contact plane that passes above or below the waveguide ridge of the OAR.

The waveguide may be formed on a Silicon on Insulator (SOI) substrate.

In some embodiments, the upper doped region is doped with a p-type dopant, and the lower doped region is doped with an n-type dopant. In this case, where the optically active material is an intrinsic semiconductor, then together the upper doped region, the optically active material, and the lower doped region form a PIN junction.

In some embodiments, the upper doped region is doped with an n-type dopant, and the lower doped region is doped with a p-type dopant. In this case, where the optically active material is an intrinsic semiconductor, then together the lower doped region, the optically active material, and the upper doped region form a PIN junction.

The PIN junction would approximate, as much as possible, a vertical PIN junction whilst maintaining easy to manufacture contact surfaces.

In some embodiments, the upper doped region may be doped with a p-type dopant, and the lower doped region may be doped with a p-type dopant. In this case, where the optically active material is an intrinsic semiconductor, then together the lower doped region, the optically active material, and the upper doped region form a PIP junction.

The PIP junction would approximate, as much as possible, a vertical PIP junction whilst maintaining easy to manufacture contact surfaces.

In some embodiments, the upper doped region may be doped with an n-type dopant, and the lower doped region may be doped with an n-type dopant. In this case, where the optically active material is an intrinsic semiconductor, then together the lower doped region, the optically active material, and the upper doped region form a NIN junction.

The lower doped region is formed from or partially from Si, for example the SOI layer which may be formed in a layer below at least a portion of the lower surface of the OAR.

The upper doped region may be a doped region of the optically active material of the OAR itself. In the other words, the dopant may be injected into the optically active material to form a doped layer at the top of the waveguide ridge of the OAR.

The lower doped region may be formed from or partially formed from a doped region of the optically active material. In other words, the dopant may be injected into the optically active material to form a doped layer at the bottom of the OAR.

In some embodiments, the lower doped portion is formed in a layer (e.g. SOI layer) located directly below the OAR and is then migrated (e.g. by dopant diffusion) into the optically active material at the lower surface of the OAR.

Optionally, the upper doped region is a doped region of the optically active material, and the lower doped region is a doped layer of Si.

Optionally, the lower doped region is a doped region of the optically active material, and the upper doped region is a doped region of the optically active material.

Optionally, the upper doped region covers the upper surface of the OAR.

Optionally, the lower doped region covers the lower surface of the OAR.

Optionally, the upper doped region partially covers the upper surface of the waveguide ridge of the OAR.

Optionally, the lower doped region partially covers the lower surface of the OAR.

Optionally, the upper doped region comprises a first doped zone and a second doped zone; wherein the dopant concentration in the second doped zone of the upper doped region is higher than the dopant concentration in the first doped zone of the upper doped region; and wherein the second doped zone of the upper doped region comprises the second contact surface.

Optionally, the first doped zone of the upper doped region is at and/or adjacent to the upper surface of the waveguide ridge of the OAR, and the second doped zone of the upper doped region is located at a position which is laterally displaced from the waveguide ridge of the OAR in the second direction.

Optionally, the lower doped region comprises a first doped zone and a second doped zone; wherein the dopant concentration in the second doped zone of the lower doped region is higher than the dopant concentration in the first doped zone of the lower doped region; and wherein the second doped zone of the lower doped region comprises the first contact surface.

The average dopant concentration in the second zone of the upper doped region is higher than the dopant concentration in the first zone of the upper doped region. The dopant concentration may be higher per unit volume, or may be higher per unit area of the dopant region. This may be achieved by multiple dopant injection steps on the second upper dopant zone, or with a longer duration dopant injection step on the second upper dopant zone than for the first upper dopant zone.

Optionally, the second zone of the upper doped region has a dopant concentration $10^{19}$-$10^{20}$ cm$^{-3}$. For n-type doping, the element may be phosphorus, or arsenic; for p-type doping, the element may be boron.

Optionally, the first zone of the upper doped region has a dopant concentration $5\times10^{16}$-$5\times10^{18}$ cm$^{-3}$. The element for n-type doping may be phosphorus, or arsenic; the element for p-type doping may be boron.

The dopant concentration of the upper doped region may be higher in the vicinity of the first electrode contact surface. This allows for a smaller contact resistance, which will dictate the electrical bandwidth together with the junction capacitance Optionally, the upper doped region is stepped between its first and second zones. The doped region may not be single flat section, but may have transitional doped regions between the first and second upper contact zones. The upper doped region may have a stepped profile. The stepped profile may allow for both the first and second zones to substantially flat, while also be vertically offset from one another. The vertical offset between the first zone and the second zone may allow for a vertical offset between the first electrode contact surface and the doped region above OAR (the first upper doped zone).

Optionally, the first zone of the upper doped region is at and/or adjacent to the upper surface of the OAR (including the upper surface of the waveguide ridge of the OAR), and the second zone of the upper doped region extends outwards from the waveguide ridge of the OAR in the second direction. The upper doped region may extend away from the waveguide ridge of the OAR, allowing attachment of the electrode to the upper doped region in an area away from the waveguide ridge of the OAR, which may be desirable for avoiding optical loss caused by the electrode absorption.

In some embodiments, the first doped zone of the upper doped region is at and/or adjacent to the upper surface of the waveguide ridge of the OAR, extends along the side wall of the waveguide ridge and laterally along a slab, away from the waveguide ridge in the second direction. In such embodiments, the second doped zone may be located within the first doped zone.

Optionally, the first zone of the upper doped region is a doped region of the waveguide ridge of the OAR. The dopant may be implanted into the material of the waveguide itself, forming a doped layer immediately beneath the upper surface of the material of the waveguide. The doped layer may extend partially or completely across the width of the waveguide ridge of the OAR.

Optionally, the first zone of the upper doped region may be formed of a different material to the optically active material. The first zone may be, for example a layer of a different material. This layer of material may be doped with dopant ions. The layer of material may extend partially or completely across the width of the waveguide ridge of the OAR waveguide.

The first upper zone may be made of doped silicon.

Optionally, the first zone of the upper doped region may be a doped region of the OAR, and the second zone of the upper doped region may be a doped layer of Si. The doped region of the OAR may extend partially or completely across the width of the waveguide ridge of the OAR. The second upper zone may contact the first upper zone adjacent to a corner of the waveguide ridge of the OAR.

In some embodiments, the lower doped region is stepped between the first and second upper zones. The lower doped region may not be single flat section, but may have transitional doped regions between its first and second zones. The upper doped region may have a stepped profile. The stepped profile may allow for each of the first and second upper zones to be substantially planar, while also being vertically offset from one another. The vertical offset between the first upper doped zone and the second upper doped zone may allow for a vertical offset between the first electrode contact surface and the doped region of the waveguide ridge of the OAR (the first upper zone).

In some embodiments, the lower doped region may extend away from the waveguide ridge of the OAR, allowing attachment of the electrode to the lower doped region in an area away from the waveguide ridge of the OAR, which is desirable for avoiding optical loss caused by the electrode absorption.

In some embodiments, the second zone of the lower doped region has a higher average dopant concentration than the first lower zone. The dopant concentration may be higher per unit volume, or may be higher per unit area of the dopant region. This may be achieved by having higher implantation dosage.

Optionally, the second upper zone has a dopant concentration $10^{19}$-$10^{20}$ cm$^{-3}$.

An element for n-type doping may be phosphorus, or arsenic; an element for p-type doping may be boron.

Optionally, the first upper zone has a dopant concentration $5\times10^{16}$-$5\times10^{18}$ cm$^{-3}$.

An element for n-type doping may be phosphorus, or arsenic; an element for p-type doping may be boron.

The first contact surface may be located at the second zone of the lower doped region.

Optionally, the dopant concentration of the upper doped region is higher in the vicinity of the first electrode contact surface, which is desirable for avoiding optical loss caused by the electrode absorption.

In some embodiments the first doped zone of the lower doped region is located directly underneath the OAR; and the second doped zone of the lower doped region is located within the OAR, laterally displaced from the waveguide ridge, the second doped zone of the lower doped region having an upper surface which comprises the first contact surface, and a lower surface which is in direct contact with the first doped zone of the lower doped region.

Optionally, the second doped zone of the lower doped region is located within portion of the OAR having a reduced height. In some embodiments, this portion of the OAR having a reduced height is a pre-etched before the dopant is added.

Optionally, the portion of the OAR having a reduced height is a portion of the OAR which has been etched before the dopant species of the lower doped region is added.

In some embodiments, the etching is carried out to etch the entire way through the slab of the waveguide to create a via instead of a portion having a reduced height.

Optionally, the first doped zone of the lower doped region is located directly underneath the OAR and the OAR includes a slab which extends in the first direction, the slab exhibiting a via through its thickness at a location laterally displaced from the waveguide ridge in the first direction. In such embodiments, the second doped zone of the lower doped region may be located within the first doped zone, directly underneath the via.

According to one embodiment of the present invention, there is provided, an optoelectronic component including a waveguide, the waveguide comprising: an optically active region (OAR) including a waveguide ridge, a first slab on a first side of the waveguide ridge and a second slab on a second side of the of the waveguide ridge, the OAR having an upper surface and a lower surface; a lower doped region, wherein the lower doped region is located adjacent to a portion of a lower surface of the OAR; the lower doped portion also extending laterally along and adjacent to the first slab of the OAR, away from the ridge in a first direction; an upper doped region, wherein the upper doped region is located within at least a portion of an upper surface of the ridge of the OAR, and extends laterally outwards along the second slab of the OAR in a second direction; and an intrinsic region located between the lower doped region and the upper doped region.

In any one of the embodiments described herein where the lower doped region is located adjacent to at least a portion the lower surface of the OAR, the lower doped region may be adapted such that it migrates into the OAR, at and beyond the interface formed between the lower surface of the OAR and the doped SOI layer beneath the OAR.

Dopant diffusing into the OAR from the SOI layer beneath allows for the first doped region to be partially within the OAR material. The OAR material has a higher conductivity when doped compared to silicon, therefore reducing the modulator series resistance and increasing the modulator's bandwidth.

Optionally, the optoelectronic component may include an input waveguide. The input waveguide may be a passive waveguide. The input waveguide may be formed from Si. The input waveguide may be substantially undoped. The input waveguide may have a different cross-sectional shape to the waveguide of the optoelectronic component. The input waveguide may have larger dimensions than the waveguide of the optoelectronic component. The input waveguide may have a similar cross-sectional shape, but be of larger dimensions than the waveguide of the optoelectronic component.

The input waveguide may be optically coupled to the waveguide of the optoelectronic component. This optical coupling may be achieved by including an input taper waveguide region between the input waveguide and the waveguide of the optoelectronic component. The input taper waveguide region serves to transition between the cross-sectional shape of the input waveguide and the cross-sectional shape of the waveguide of the optoelectronic component.

The input taper region may include a vertical taper—wherein the top and bottom surfaces of the input taper waveguide region move closer together along the length of the input taper waveguide region. Alternatively to, or in addition to, the vertical taper the input taper waveguide region may include a horizontal taper wherein the side surfaces of the input taper waveguide region move closer together along the length of the input taper waveguide region. The cross-sectional area of the input taper waveguide region may decrease along the length of the input taper waveguide region. The input taper waveguide region may be integrally formed with the input waveguide. That is to say that the input waveguide tapers in the vicinity of the waveguide of the optoelectronic component. The taper waveguide region may guide the incoming light into the optoelectronic component.

In some embodiments, the optoelectronic component may include an output waveguide. The output waveguide may be a passive waveguide. The output waveguide may be formed from Si. The output waveguide may be substantially undoped. The output waveguide may have a different cross-sectional shape to the waveguide of the optoelectronic component. The output waveguide may have larger dimensions that the waveguide of the optoelectronic component. The output waveguide may have a similar cross-sectional shape, but be of larger dimensions than the waveguide of the optoelectronic component.

The output waveguide may be optically coupled to the waveguide of the optoelectronic component. This optical coupling may be achieved by including an output taper waveguide region between the waveguide of the optoelectronic component and the output waveguide. The taper waveguide region serves to transition between the cross-sectional shape of the waveguide of the optoelectronic component and the cross-sectional shape of the output waveguide.

The output taper region may include a vertical taper—wherein the top and bottom surfaces of the output taper waveguide region move apart along the length of the output taper waveguide region. Alternatively to, or in addition to, the vertical taper there may be a horizontal taper wherein the side surfaces of the output taper waveguide region move apart along the length of the output taper waveguide region. The cross-sectional area of the output taper waveguide may increase along the length of the output taper waveguide region. The output taper waveguide region may be integrally formed with the output waveguide. That is to say that the output waveguide tapers in the vicinity of the output of the waveguide of the optoelectronic component. The taper waveguide may guide the outgoing light from the optoelectronic component into the output waveguide.

It will be understood that an optoelectronic component may include an input and an output waveguide as described above. It will further be understood that the input and output waveguides need not be the same dimensions.

Input and output tapers may allow for the input and/or output waveguides to be of larger dimensions than the waveguide of the optoelectronic component. Larger waveguides are generally easier to manufacture with lower fiber-waveguide coupling loss. However, a smaller optoelectronic component is desirable so that it can be operated at higher speeds. Tapering between the input and/or output waveguides and the optoelectronic component allows the use of a small optoelectronic component, potentially exhibiting relatively high speed, while also providing the relative ease of manufacturing and relatively low coupling loss of a larger input and/or output waveguide.

The optoelectronic component may further comprise an interface between the optoelectronic component and a first waveguide, (e.g. the input waveguide or output waveguide), wherein the interface is at an angle α relative to a guiding direction of the waveguide which is less than 90°. The interface may be at an angle of between 89° and 80° relative to the guiding direction of the waveguide, and is in some examples 81°. The optoelectronic component may further comprise a second interface between the optoelectronic component and a second waveguide, wherein the second interface may be at angle β relative to a guiding direction of the waveguide which is less than 90°. The second interface may be at angle of between 89° and 80° relative to the guiding direction of the waveguide, and is in some examples 81°. The angles α and β may be equal or not-equal. The angles may be measured in different senses (i.e. one clockwise and the other anti-clockwise) such that they are not parallel even when they are equal. By providing the one or more angled interfaces back reflection can be reduced whilst not hindering the epitaxial growth of the optoelectronic component because the angle from the substrate is the same throughout the device. By use of the term guiding direction it may be meant the direction along which the waveguide guides light. Further, they may be at angles greater than 0° between a guiding direction of the first waveguide (e.g. the input waveguide or output waveguide) and a guiding direction of the waveguide through the optically active region. These angles may be denoted by $\phi$ and $\gamma$ respectively. Where $80° \leq \alpha$, $\beta \leq 89°$ then it may be the case that $0.3° \leq \phi$, $\gamma \leq 3°$. In some examples, an angle δ between the guiding direction of the OAR and a global horizontal of the optoelectronic device may be greater than 0°. Where $1° \leq \delta \leq 10°$ it may be that $0.3° \leq \phi$, $\gamma \leq 3°$. By global horizontal, it may be meant that a chip on which the optoelectronic device is disposed has what may be considered principal vertical and horizontal directions (these being mutually orthogonal). In, for example, FIG. 38, the guiding direction of the OAR may be considered to be aligned (i.e. parallel with) the global horizontal direction; i.e. the global horizontal is parallel with line C-C'. Therefore, in, for example, FIG. 39, the guiding direction of the OAR is at an angle greater than zero to the global horizontal. The angles $\phi$ and $\gamma$ may be chosen to match the angle of refraction as dictated by Snell's law for light entering the OAR from the input waveguide or for light entering the output waveguide from the OAR. In more detail, at the interface between the input waveguide and the OAR waveguide, the refractive index of the material of the input waveguide and the refractive index of the material of the OAR waveguide are input into Snell's law to determine the angle of refraction which occurs at that interface due to the change in refractive index. The angle that the input waveguide makes with the OAR waveguide is then chosen so that the input waveguide is oriented at a given angle of incidence and so that the OAR waveguide is oriented at the corresponding angle of refraction that has been calculated for the two waveguide materials and the given angle of incidence (of course, the calculation may also be carried out in reverse with the angle of refraction being the "known" quantity). The same process is carried out at the interface formed between the waveguide of the OAR and the output waveguide. If the angles of the waveguides at the input and output interfaces are not matched in this way, using Snell's law, then the angle of the light entering the high index material waveguide can be outside the acceptance angle of the waveguide for the fundamental mode, leading to some fraction of the light coupling to higher order modes. This insertion loss can be a non-negligible number, a few tenths of a dB to half a dB considering both interfaces for $\alpha = \beta = 80°$ and can, in turn, contribute to an insertion loss of the device. This insertion loss can be a non-negligible number, giving rise to a significant increase in device insertion loss, and a corresponding increase in the power penalty of the modulator, a corresponding required increase in laser power or increase in receiver sensitivity, and corresponding drop in power efficiency, in an optical link.

Said another way, the interface between an input waveguide and the waveguide of the OAR may have a non-orthogonal angle to the direction of propagation of light signals through the waveguide. Similarly, the interface between the output waveguide and the waveguide of the OAR may have an angle which is non-orthogonal to the direction of propagation of light signals through the output waveguide (and also non-orthogonal to the propagation of light through the waveguide of the OAR). The angle from the orthogonal should be enough to prevent back reflection.

Optionally, the optoelectronic component may form part of an optoelectronic device. The optoelectronic component may be a planar light wave circuit, for example. The optoelectronic component may be a section of a longer waveguide. An optoelectronic device may include any number of optoelectronic components, one or more of which may be according to embodiments of the present invention. An optoelectronic device may include any number of optoelectronic components according to embodiments of the present invention, and those optoelectronic components may be arranged in series or parallel arrangements or any combination thereof.

Optionally, the optoelectronic device may be an optical modulator. The modulator may be an electro-absorption modulator (EAM). This type of modulator is simple and provides relatively high modulation speeds. The optoelectronic device may be a photodetector.

Optionally, embodiments of the present invention aim to solve the above problems by providing, according to a second aspect, a method for fabricating an optoelectronic component. The method comprising: an etching step, wherein a waveguide trench is etched into an SOI platform; a lower implantation step, comprising implanting a first dopant species into a base of the trench and on the SOI platform on a first lateral side of the trench, to thereby form a lower doped region. The method also includes an upper lateral implantation step, comprising implanting a second dopant species on the SOI platform adjacent the second lateral side of the trench to form a upper lateral doped region; a waveguide formation step, comprising depositing optically active material into the waveguide trench; a protection step, comprising forming a protective layer covering the doped regions and the waveguide; an upper implantation step, comprising implanting the second dopant species into an upper region of the waveguide to form an upper doped region, wherein the upper lateral doped region and the upper doped region are contiguous; The method also includes a metallization step, wherein a first electrode is fabricated, wherein the first electrode contacts the lower doped region at a contact surface laterally offset from the waveguide in a first direction; a second electrode is fabricated, wherein the second electrode contacts the upper lateral doped region at a contact surface laterally offset from the waveguide in a second direction.

Optionally, the method further comprises additional implantation steps after the waveguide formation step. The additional implantation steps may include: implanting the first dopant species into a portion of the OAR located directly above the lower implanted portion, laterally displaced from the waveguide ridge in a first direction, to form an additional doped zone of the same dopant type as the lower implanted portion, but having a dopant concentration greater than that of the lower implanted portion, the first electrode contacting the lower doped region via the additional doped zone of the OAR; and implanting the second dopant species into an upper region of the OAR at a position which is laterally displaced from the waveguide ridge in the second direction to form a second doped zone in the upper doped region such that dopant concentration in the second doped zone is higher than the dopant concentration in the rest of the upper doped region, the second electrode contacting the upper doped region via the second doped zone of the OAR.

Optionally, the first and second electrodes are fabricated at the same time. This is possible because the electrode contact surfaces may be ready for metallization at the same point in the method of manufacture. This simplifies the manufacture process.

Optionally, the contact surfaces are formed to be coplanar with one another. In this way, they can be easily fabricated in the same fabrication step.

Optionally, in the waveguide formation step, the optically active material is epitaxially deposited.

Optionally, the method further includes a secondary lower implantation step, wherein a secondary lateral doped region laterally offset from the waveguide trench is doped with first dopant species. This secondary lower implantation step increases the dopant concentration in the secondary lateral doped region.

Optionally, the method further includes a secondary upper lateral implantation step, wherein a secondary upper lateral doped region laterally offset from the waveguide trench is doped with second dopant species. This secondary upper lateral implantation step increases the dopant concentration in the secondary upper lateral doped region.

Optionally, the method further includes a planarizing step, wherein the deposited optically active material is planarized. The optically active material may be planarized by chemical mechanical planarization (CMP).

Optionally, the method further includes a waveguide etching step, wherein the deposited optically active material is etched back to form a waveguide. The waveguide may be a rib type waveguide. The waveguide may be an inverted rib waveguide. The waveguide may be a strip type waveguide. Optically active waveguide may be etched back to have any suitable cross-sectional shape, for example, square or rectangular. Effective changes in refractive index may occur at the openings of narrow portions of the optically active material. The optically active material may include narrow extensions from the waveguide region. These narrow regions may be narrow relative to the wavelength of the light used in the optoelectronic component. For example, the optically active material may have a stepped cross section. The optically active material may have an inverted-'T' cross section, where a wide base of optically active material has a relative narrow upstanding region. The optically active material may have a 'T' cross section, where a wide base of optically active material has a relative wide upstanding region. The waveguide region may be the upstanding region and the region of the optically active material directly beneath the upstanding region. The waveguide may not include the extensions of the base of the cross section either side of the upstanding part of the optically active material because of the effective refractive index changes caused by the narrowness of the extensions relative to the wavelength of the light used.

Optionally, the optically active material is Ge or SiGe.

Optionally, during the upper implantation step, the second dopant species are implanted through the protective layer into the upper doped region.

Optionally, the protective layer is formed of silicon dioxide ($SiO_2$).

Optionally, the protective layer may have a thickness of about 20-50 nanometres.

Optionally, the method further comprises a passivation step, wherein the passivation step comprises the formation of a passivation layer.

Optionally, the passivation layer covers the doped regions.

Optionally, the electrodes pass through the passivation layer. This allows access to the electrodes.

Optionally, the passivation layer is formed of $SiO_2$.

Optionally, the passivation layer may have a thickness of 0.5 µm or about 0.5 µm. According to a further aspect of embodiments of the present invention, there is provided a Mach-Zehnder (MZ) modulator having two waveguide arms, each waveguide arm comprising: an optically active region (OAR) including a waveguide ridge, the OAR having an upper surface and a lower surface; a lower doped region, wherein the lower doped region is located at and/or adjacent to at least a portion of a lower surface of the OAR, and extends laterally outwards from the waveguide ridge in a first direction; an upper doped region, wherein the upper doped region is located at and/or adjacent to at least a portion of an upper surface of the waveguide ridge of the OAR, and extends laterally outwards from the waveguide ridge in a second direction; and an intrinsic region located between the lower doped region and the upper doped region.

It is envisaged that the OAR in one or both arms of the Mach-Zehnder modulator could be provided by any of the examples of optoelectronic devices disclosed in this document.

The electro-absorption modulators (EAMs) described so far operate by an absorption change which arises when a voltage bias is applied across the PIN junction.

To generate a modulated output light signal, the Mach-Zehnder modulator relies upon a phase change effect in an OAR rather than an absorption change (as is relied upon for an EAM). In the MZ modulator, an input waveguide is split into two waveguide arms, each waveguide arm comprising an OAR as per the single waveguide of the EAM embodiments. When a bias is applied across the junction of one or both of the OARs, the phase of light travelling through the respective arm(s) will be affected. The two waveguides are recombined so that light from the two arms will interfere; the signal strength produced by the interference of the two arms depending upon the phase difference between the two arms. Thus, by altering the relative phase of light in the two arms, the strength of the output signal can be modulated.

The OAR structure of each arm of a MZ modulator may be the same as the OAR structure of any one of the EAM embodiments described herein. However, the drive voltages applied across the junctions may be different. To operate EAM embodiments, the more voltage applied across the junction, the more absorption in the OAR since a greater voltage bias will give rise to a greater electric field. An example of a typical drive voltage applied is 2V. To operate the MZ modulator, a voltage required to turn the output light from on to off may be known as Vpi. This can be less than or equal to the drive voltage required for a single waveguide EAM (i.e. typically <2V). Where the MZ modulator has a push-pull configuration, the voltage applied to each arm should be half of $V_{+pi}$. Clearly the greater the drive voltage, the greater the absorption effects in a single arm of the MZ. Thus, the overall modulation of a MZ modulator could be caused by a combination of absorption and phase control in the OARs of each arm, if the absorption effects in the arms are balanced in a way that adds to the overall absorption of the modulator.

In some embodiments, the MZ modulator could be tuned by adjusting the drive voltages, and optical split ratios between the two arms, and length of two arms in order to utilise the combination of both absorption and phase effects to maximum the efficiency of the modulator.

In some embodiments of the Mach-Zehnder modulator, each waveguide arm includes a first electrode contacting the lower doped region at a first contact surface, and a second electrode contacting the upper doped region at a second contact surface; wherein the first contact surface is laterally offset from the waveguide portion in the first direction; and wherein the second contact surface is laterally offset from the waveguide ridge off the OAR in the second direction.

In some embodiments of the Mach-Zehnder modulator the first contact surface of a first of the waveguide arms corresponds to the second contact surface of a second of the waveguide arms to form a shared central contact surface between the two waveguide arms; and wherein the first electrode of the first waveguide arm corresponds to the second electrode of the second waveguide arm to form a shared central electrode between the two waveguide arms.

In some embodiments of the Mach-Zehnder modulator, the first and second contact surfaces for each arm are aligned with one another along a lateral plane.

In some embodiments of the Mach-Zehnder modulator, for one or both of the arms, the upper doped region comprises a first doped zone and a second doped zone; wherein the dopant concentration in the second doped zone of the upper doped region is higher than the dopant concentration in the first doped zone of the upper doped region; and wherein the second upper zone of the upper doped region comprises the second contact surface.

In some embodiments of the Mach-Zehnder modulator the first doped zone of the upper doped region is at and/or adjacent to the upper surface of the waveguide ridge of the OAR, and second doped zone of the upper doped region is located at a position which is laterally displaced from the waveguide ridge of the OAR in the second direction.

In some embodiments of the Mach-Zehnder modulator for one or both of the arms, the lower doped region comprises a first doped zone and a second doped zone; wherein the dopant concentration in the second doped zone of the lower doped region is higher than the dopant concentration in the first doped zone of the lower doped region; and wherein the second doped zone of the lower doped region comprises the first contact surface.

In some embodiments of the Mach-Zehnder modulator, the first doped zone of the lower doped region is located directly underneath the OAR; and the second doped zone of the lower doped region is located within the OAR, the second doped zone of the lower doped region having an upper surface which comprises the first contact surface, and a lower surface which is in direct contact with the first doped zone of the lower doped region.

In some embodiments of the Mach-Zehnder modulator, the second doped zone of the lower doped region is located within a pre-etched portion of the OAR having a reduced height.

In some embodiments of the Mach-Zehnder modulator, the first doped zone of the lower doped region is located directly underneath the OAR; the OAR includes a slab which extends in the first direction, the slab exhibiting a via through its thickness at a location laterally displaced from the waveguide ridge in the first direction; and the second doped zone of the lower doped region is located within the first doped zone, directly underneath the via.

In some embodiments of the Mach-Zehnder modulator, each waveguide arm further comprises an interface between the OAR and a first waveguide, wherein the interface is at an angle $\alpha$ relative to a guiding direction of the waveguide which is less than 90°.

In some embodiments of the Mach-Zehnder modulator, the interface is at an angle of between 89° and 80° relative to the guiding direction of the waveguide.

In some embodiments of the Mach-Zehnder modulator, there further comprises a second interface between the OAR and a second waveguide, wherein the second interface is at an angle $\beta$ relative to a guiding direction of the second waveguide which is less than 90°.

According to a further aspect of embodiments of the present invention, there is provided a method for fabricating an optoelectronic component, comprising:

an etching step, wherein a waveguide trench is etched into an SOI platform;

a lower implantation step, comprising implanting a first dopant species into a base of the trench and on the SOI platform on a first lateral side of the trench, to thereby form a lower doped region;

an upper lateral implantation step, comprising implanting a second dopant species on the SOI platform adjacent the second lateral side of the trench to form a upper lateral doped region;

a waveguide formation step, comprising depositing optically active material into the waveguide trench;

a protection step, comprising forming a protective layer covering the doped regions and the waveguide;

an upper implantation step, comprising implanting the second dopant species into an upper region of the waveguide to form an upper doped region, wherein the upper lateral doped region and the upper doped region are contiguous;

a metallization step, wherein
  a first electrode is fabricated, wherein the first electrode contacts the lower doped region at a contact point laterally offset from the waveguide in a first direction; and
  a second electrode is fabricated, wherein the second electrode contacts the upper lateral doped region at a contact point laterally offset from the waveguide in a second direction.

The method may further comprise an additional implantation step after the waveguide formation step, the additional implantation stage comprising:

implanting a dopant species into a portion of the optically active material located directly above the lower implanted portion to form a doped region of the same type as the lower implanted portion, but having a dopant concentration greater than that of the lower implanted portion.

The method may further comprise an additional etch step before the additional implantation step; the additional etch step comprising:

etching a portion of the OAR located directly above the lower implanted region to create a region of the OAR having a reduced height;

wherein the portion of the OAR to which dopant species are implanted during the additional implantation step comprises the region of the OAR having a reduced height.

The waveguide trench may comprise two arms of a Mach-Zehnder interferometer (MZI), the steps of the method being carried out to one or both arms of the MZI.

According to a further aspect of embodiments of the present invention, there is provided an optoelectronic component comprising:

an optically active region (OAR); and
an interface between the OAR and a waveguide:
wherein the interface is disposed at an angle $\alpha$ relative to a guiding direction of the waveguide which is less than 90°.

BRIEF DESCRIPTION OF THE DRAWINGS

These and other features and advantages of embodiments of the invention will now be appreciated and understood with reference to the specification, claims and appended drawings wherein:

FIG. 14A shows a cross-sectional view of a 14th embodiment of an optoelectronic device, this embodiment may be formed on a 3 um SOI platform;

FIG. 14B shows a cross-sectional view of a 15th embodiment of an optoelectronic device, this embodiment may be formed on a 3 um SOI platform;

FIG. 15A shows a cross-sectional view of a 16th embodiment of an optoelectronic device, this embodiment may be formed on a 3 um SOI platform;

FIG. 15B shows a cross-sectional view of a 17th embodiment of an optoelectronic device, this embodiment may be formed on a 3 um SOI platform;

FIG. 17A shows a cross-sectional view of a 20th embodiment of an optoelectronic device, this embodiment may be formed on a 3 um SOI platform;

FIG. 17B shows a cross-sectional view of a 21st embodiment of an optoelectronic device, this embodiment may be formed on a 3 um SOI platform;

DETAILED DESCRIPTION

The detailed description set forth below in connection with the appended drawings is intended as a description of exemplary embodiments of an optoelectronic component provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
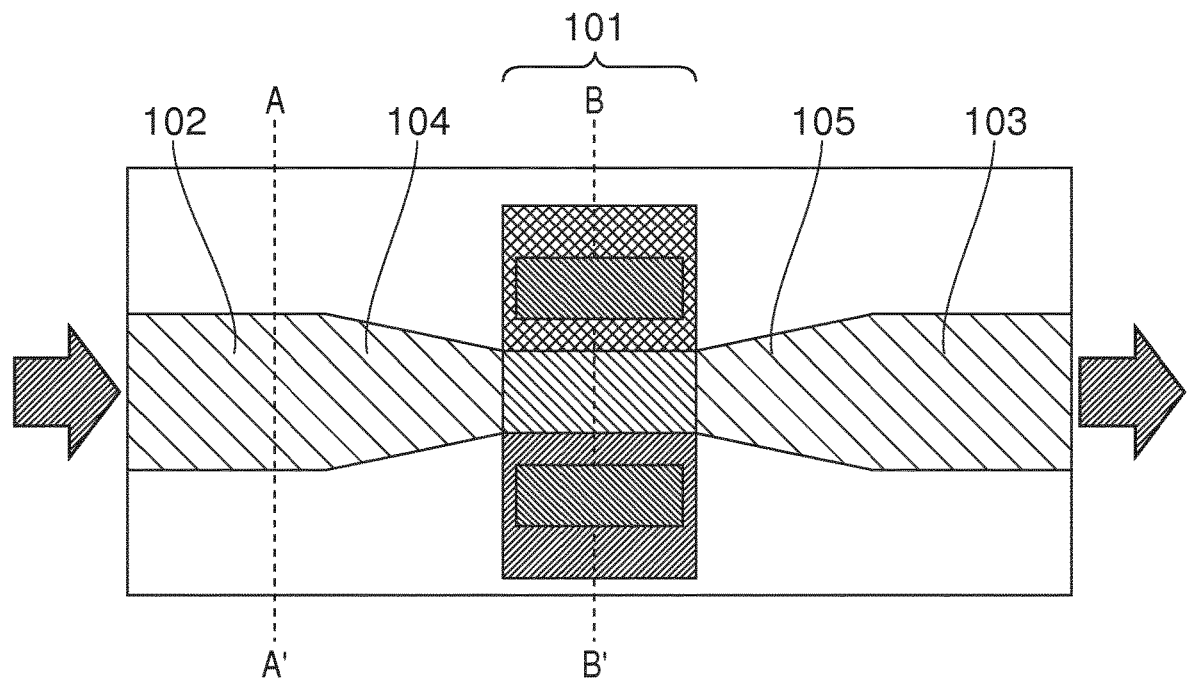
FIG. 1 shows a top down view of optoelectronic component, also shown is an input waveguide with an input taper waveguide region and an output waveguide with an output waveguide taper region.

FIG. 1 shows an architecture for an optoelectronic device including an optoelectronic component according to claim 1. The optoelectronic component 101 is shown between an input waveguide 102 and the output waveguide 103. An input taper region 104 of the input waveguide 102 and an output taper region 105 of output waveguide are also shown. The input taper region 104 helps to transition the light from the relatively wide input waveguide 102 to the relatively narrow optoelectronic component 101. Similarly, the output taper region 105 helps to transition the light from the relatively narrow optoelectronic component 101 to the relatively wide output waveguide 103. Two cross-sectional lines A-A' and B-B' are also shown. The cross-section locations are used when illustrating embodiments of the invention.

Figure 2:
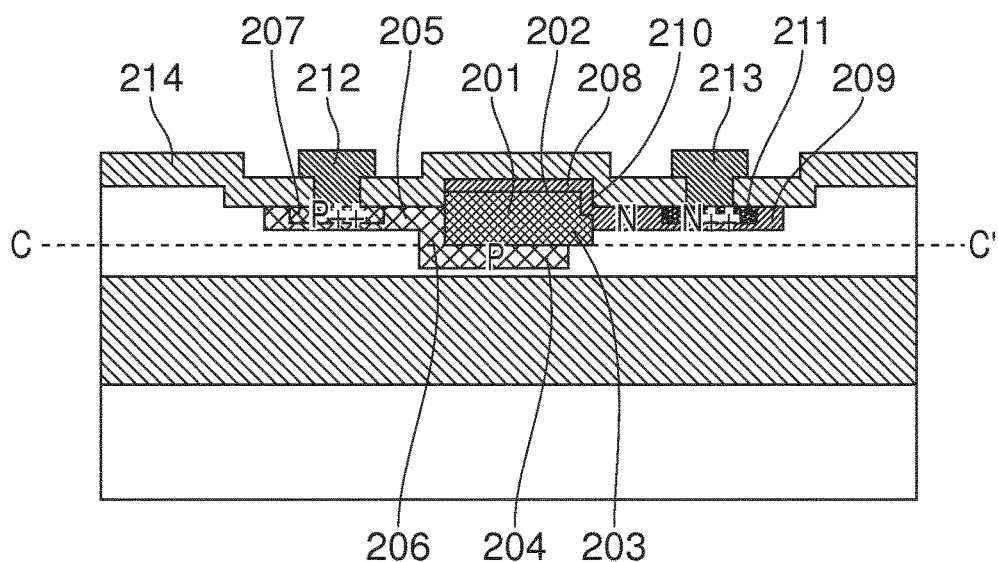
FIG. 2 shows a cross-sectional view taken through line B-B' shown in FIG. 1 of a first embodiment of an optoelectronic device.

FIG. 2 shows a cross section through B-B' (see FIG. 1). The cross sectional view illustrates the components and regions and the architecture of the optoelectronic component. A central waveguide of optically active material (for example, SiGe) 201 is shown running along the centre of the optoelectronic component—this core forms an optically active region (OAR). The waveguide 201 has an upper surface 202 and lower surface 203. The upper surface 202 and the lower surface 203 are oppositely directed to each other.

Extending across the lower surface 203 is a lower p-doped region 204. The lower p-doped region 204 extends across the full width of the lower surface 203 of the waveguide (i.e. the waveguide ridge) 201. Extending laterally away from the waveguide 201 is a lower lateral p-doped region 205. It will be noted that there is a continuous path of doping between the lower p-doped region 204 and lower lateral p-doped region 205. The lower lateral p-doped region 205 and lower p-doped region 204 is joined by a connecting p-doped region 206. The connecting p-doped region 206 extends vertically along a side of the waveguide 201. The connecting p-doped region 206, the lower lateral p-doped region 205 and the lower p-doped region 204 form a single contiguous p-doped region.

A lower super-doped region 207 is formed in the lower lateral p-doped region 205. The lower super-doped region 207 is also p-doped. However, the dopant concentration in the lower super-doped region 207 is higher than the dopant concentration in the lower lateral p-doped region 205.

Extending across the upper surface 202 is an upper n-doped region 208. The upper n-doped region 208 extends across the full or partial width of the upper surface 202 of the waveguide 201. Extending laterally from the waveguide 201 is an upper lateral n-doped region 209. It will be noted that there is a continuous path of doping between the upper n-doped region 208 and upper lateral n-doped region 209. The upper lateral n-doped region 209 and upper n-doped region 208 may be joined by a connecting n-doped region 210. The connecting n-doped region 210 extends vertically along a side of the waveguide 201. The connecting n-doped region 210, the upper lateral n-doped region 209 and the upper n-doped region 208 form a single contiguous n-doped region.

An upper super-doped region 211 is formed in the upper lateral n-doped region 209. The upper super-doped region 211 is also n-doped. However, the dopant concentration in the upper super-doped region 211 is higher than the dopant concentration in the upper lateral n-doped region 209.

A first electrode 212 is attached to the lower super-doped region 207. A second electrode 213 is attached to the upper super-doped region 211. When a voltage is applied between the first electrode 212 and the second electrode 213 a corresponding bias is applied between the upper n-doped region 208 and the lower p-doped region 204. This bias forms an electric field through the waveguide 201. The electric field has field lines that are generally vertical through the waveguide. It will be noted that the electric field is generally vertical and the first 212 and second 213 electrodes are offset horizontally from the waveguide 201. In other words, the orientation of the electric field and the offset direction of the electrodes 212, 213 from the waveguide 201 are opposite. It is important to keep the locations that the electrodes contact the doped regions distant from the waveguide.

A protective layer 214 covers the majority of the upper surface of the component. Although, it will be noted that the upper surfaces of the first and second electrodes 212, 213 are not completely covered by the protective layer 214. In the embodiment of FIG. 2, the protective layer 214 may be formed of $SiO_2$ (silicon dioxide).

Figure 3:
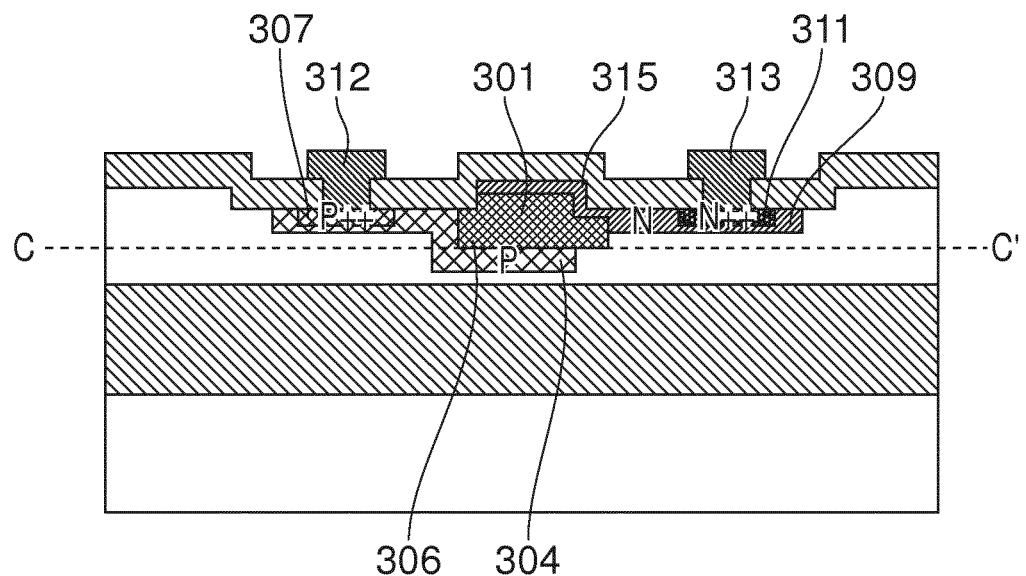
FIG. 3 shows a cross-sectional view taken through line B-B' shown in FIG. 1 of a second embodiment of an optoelectronic device.

FIG. 3 shows a cross section through B-B' (see FIG. 1). The cross sectional view illustrates the components and regions and the architecture of the optoelectronic component. The elements shown in FIG. 3 are numbered similarly to those in FIG. 2 (for example, element 211 in FIG. 2 corresponds to element 311 in FIG. 3).

A difference between the embodiment shown in FIG. 2 and the embodiment shown in FIG. 3 is the cross sectional shape of the waveguide 301. It will be noted that the cross-section of the waveguide 301 has a notch 315 formed in top right hand corner. The notch 315 of the embodiment of FIG. 3 is larger than that shown in the embodiment of FIG. 2. The upper doped region extends across and follows the profile of the notch 315.

In the embodiment of FIG. 3, the lower doped region 304 does not extend to cover the full width of the lower surface 306 of the waveguide 301. The lower doped region does, however, extend such that the maximum extent of the lower doped region 304 is level with the lateral extent of the notch 315 into the waveguide 301.

Figure 4:
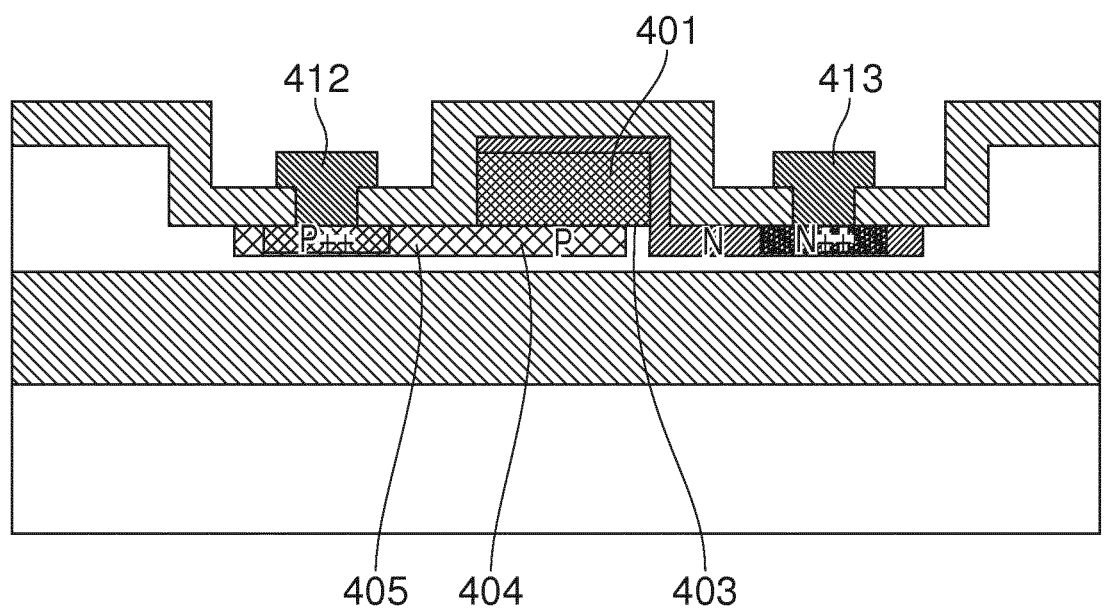
FIG. 4 shows a cross-sectional view taken through line B-B' shown in FIG. 1 of a third embodiment of an optoelectronic device.

FIG. 4 shows a cross section through B-B' (see FIG. 1). The cross sectional view illustrates the components and regions and the architecture of the optoelectronic component. The elements shown in FIG. 4 are numbered similarly to those in FIG. 2 (for example, element 211 in FIG. 2 corresponds to element 411 in FIG. 4).

The first difference between the embodiment shown in FIG. 2 and the embodiment shown in FIG. 4 is the lower p-doped region 404 and the lower lateral p-doped region 405 form a generally planar arrangement. In others words the lower doped region is generally formed in a single plane. Part of that planar doped region partially covers the lower surface 403 of the waveguide 401.

The second difference between the embodiment shown in FIG. 2 and the embodiment shown in FIG. 4 is that the waveguide 401 has a generally rectangular cross section. In other words, the cross sectional shape of the waveguide 401 does not include any notches or cutouts.

Figure 5:
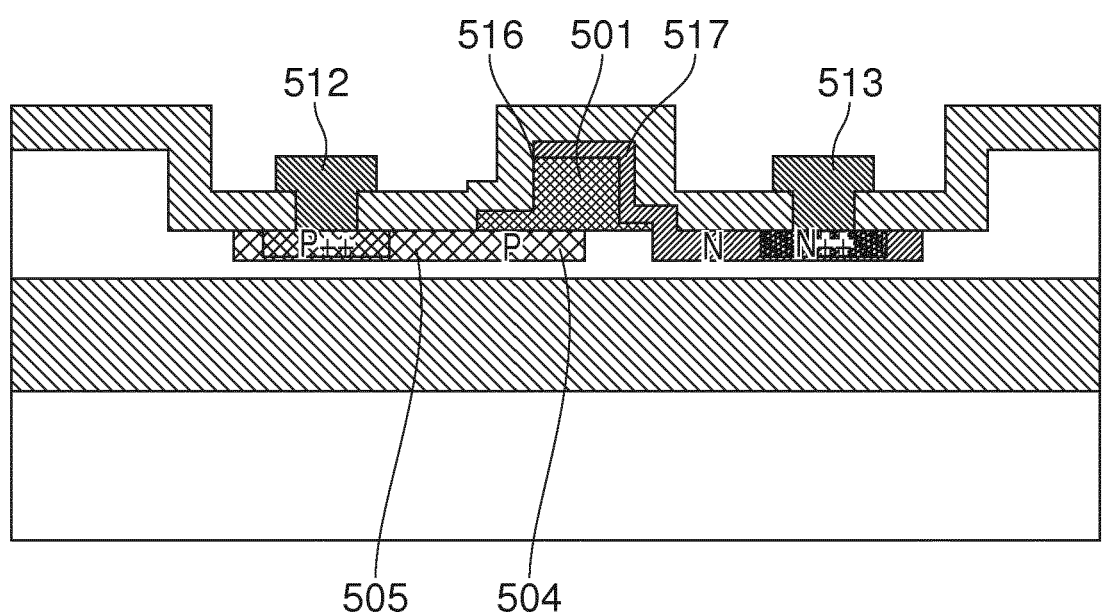
FIG. 5 shows a cross-sectional view taken through line B-B' shown in FIG. 1 of a fourth embodiment of an optoelectronic device.

FIG. 5 shows a cross section through B-B' (see FIG. 1). The cross sectional view illustrates the components and regions and the architecture of the optoelectronic component. The elements shown in FIG. 5 are numbered similarly to those in FIG. 2 (for example, element 211 in FIG. 2 corresponds to element 511 in FIG. 5).

The first difference between the embodiment shown in FIG. 5 and the embodiment shown in FIG. 2 is the lower p-doped region 504 and the lower lateral p-doped region 505 form a generally planar arrangement. In others words the lower doped region is generally formed in a single plane. Part of that planar doped region partially covers the lower surface 503 of the waveguide 501.

The second difference between the embodiment shown in FIG. 2 and the embodiment shown in FIG. 5 is that the waveguide 501 has an inverted-'T' cross sectional shape. In other words, the cross sectional shape of the waveguide 501 has a relatively wide base with a relatively narrow upward extension from the base. This shape of waveguide 501 can alternatively be thought of as having a notch on each side 516, 517.

Figure 6:
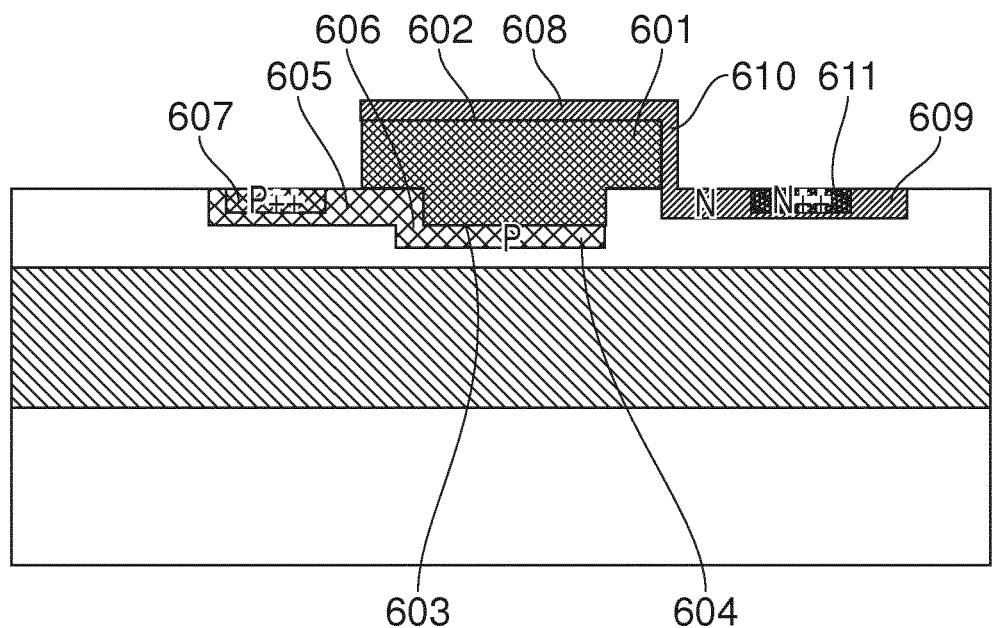
FIG. 6 shows a cross-sectional view taken through line B-B' shown in FIG. 1 of a fifth embodiment of an optoelectronic device.

FIG. 6 shows a cross section through B-B' (see FIG. 1). The cross sectional view illustrates the components and regions and the architecture of the optoelectronic component. A central waveguide of optically active material (for example, SiGe) 601 is shown running along the centre of the optoelectronic component—this core includes an optically active region (OAR). The waveguide 601 has an upper surface 602 and lower surface 603. The upper surface 602 and the lower surface 603 are oppositely directed to each other.

Figure 7:
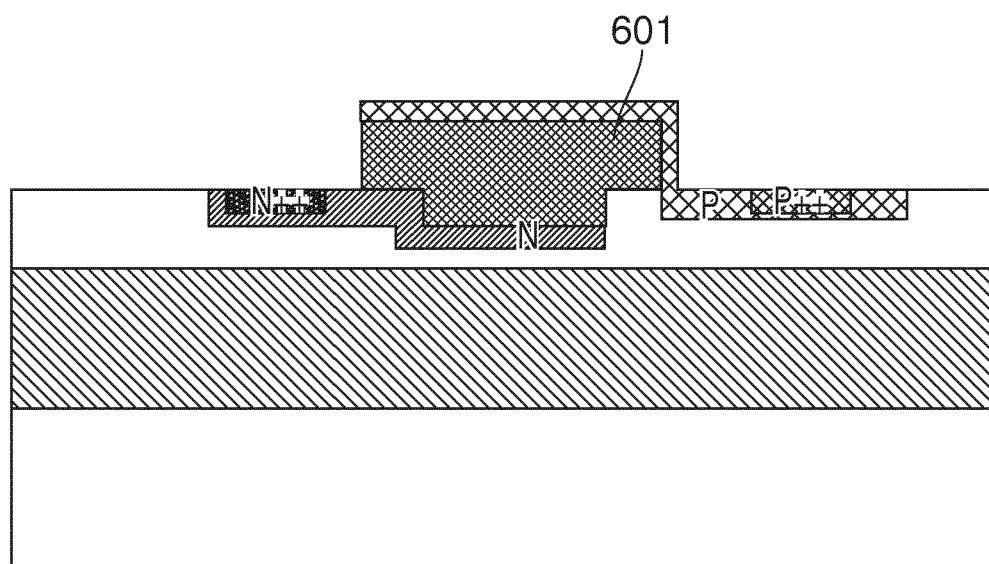
FIG. 7 shows a cross-sectional view taken through line B-B' shown in FIG. 1 of a variant of the fifth embodiment, where the p and n doping is reversed relative to the embodiment shown in FIG. 6.

The waveguide is an inverted-rib type waveguide that has a 'T'-shaped cross section. The waveguide generally has a narrow stem with a wider top. This shape is illustrated in FIGS. 6 & 7.

Extending across the lower surface 603 is a lower p-doped region 604. The lower p-doped region 604 extends across the full width of the lower surface 603 of the waveguide 601. Extending laterally from the waveguide 601 is a lower lateral p-doped region 605. It will be noted that there is a continuous path of doping between the lower p-doped region 604 and lower lateral p-doped region 605. The lower lateral p-doped region 605 and lower p-doped region 604 is joined by a connecting p-doped region 606. The connecting p-doped region 606 extends vertically along a side of the waveguide 601. The connecting p-doped region 606, the lower lateral p-doped region 605 and the lower p-doped region 604 form a single contiguous p-doped region.

A lower super-doped region 607 is formed in the lower lateral p-doped region 605. The lower super-doped region 607 is also p-doped. However, the dopant concentration in the lower super-doped region 607 is higher than the dopant concentration in the lower lateral p-doped region 605.

Extending across the upper surface 602 is an upper n-doped region 608. The upper n-doped region 608 extends across the full width of the upper surface 602 of the waveguide 601. Extending laterally from the waveguide 601 is an upper lateral n-doped region 609. It will be noted that there is a continuous path of doping between the upper n-doped region 608 and upper lateral n-doped region 609. The upper lateral n-doped region 609 and upper n-doped region 608 may be joined by a connecting n-doped region 610. The connecting n-doped region 610 extends vertically along a side of the waveguide 601. The connecting n-doped region 610, the upper lateral n-doped region 609 and the upper n-doped region 608 form a single contiguous n-doped region.

An upper super-doped region 611 is formed in the upper lateral n-doped region 609. The upper super-doped region 611 is also n-doped. However, the dopant concentration in the upper super-doped region 611 is higher than the dopant concentration in the upper lateral n-doped region 609.

FIG. 7 shows an alternative to the embodiment of FIG. 6, wherein the dopant species have been reversed. The lower doped regions are n-doped and the upper doped regions are p-doped in the embodiment shown in FIG. 7, opposite to the embodiment shown in FIG. 6.

Figure 8:
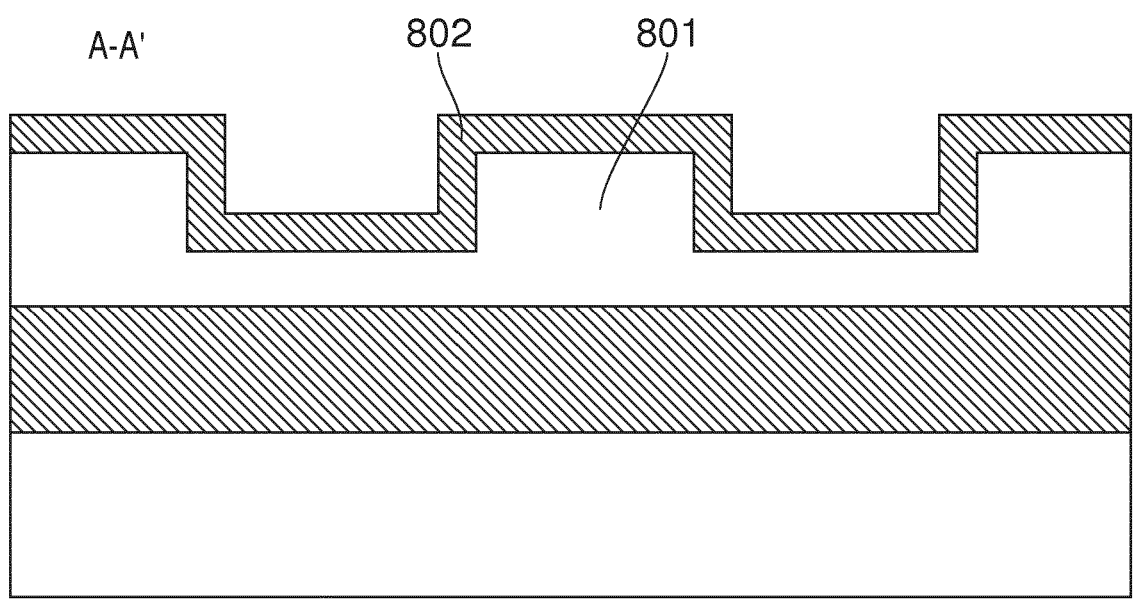
FIG. 8 shows a cross-sectional view taken through line A-A' shown in FIG. 1, showing an example cross section through the input waveguide.

FIG. 8 shows a cross-sectional view taken through line A-A' shown in FIG. 1, showing an example cross section through the input waveguide 2 from FIG. 1. A central waveguide region 801 is shown. The central waveguide region 801 may then be tapered such there is a transition in waveguide dimension and/or shape between the input waveguide and the waveguide of the optoelectronic device (see FIG. 1). A protective layer 802 of e.g. $SiO_2$ is also shown covering the uppermost surface of the device.

The waveguide 801 shown in FIG. 8 is also equally applicable as an output waveguide (see FIG. 1).

Figure 9:
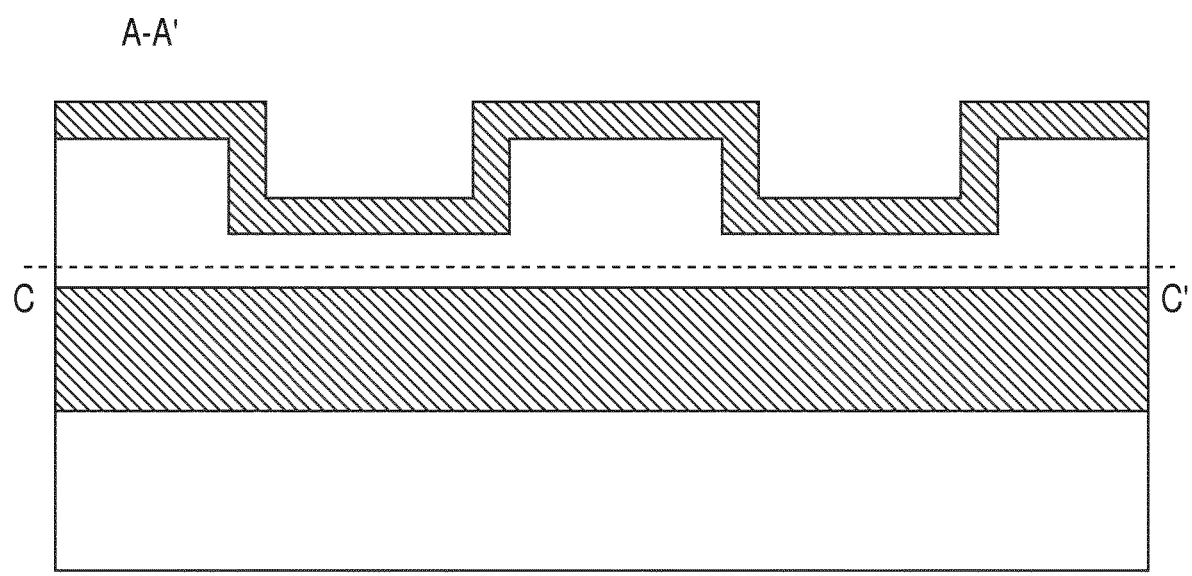
FIG. 9 shows a cross-sectional view taken through line A-A' shown in FIG. 1, the line C-C' is also shown in FIGS. 2 and 3.

FIG. 9 shows an input/output waveguide similar to the waveguide shown in FIG. 8. The location of the line C-C' is shown on FIG. 9 for comparison to other FIGs that show the line C-C'.

Figure 10A:
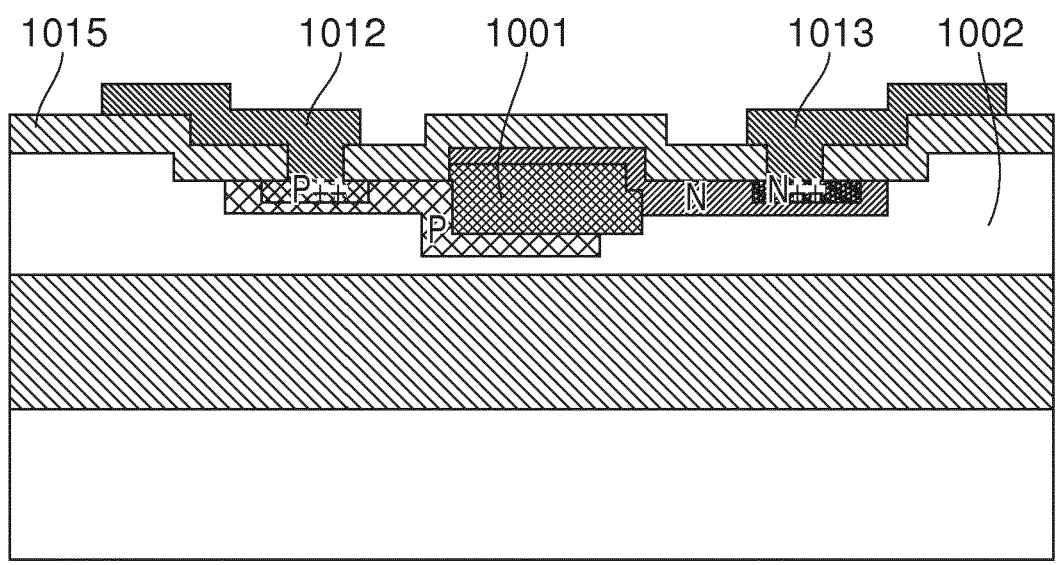
FIG. 10A shows a cross-sectional view of a sixth embodiment of an optoelectronic device, this embodiment may be formed on a nominally 0.8 um (0.2-1 um) SOI platform.

FIG. 10A shows a cross section through B-B' (see FIG. 1). The cross sectional view illustrates the components and regions and the architecture of the optoelectronic component. The components are numbered as in FIG. 2.

The first difference between the embodiment shown in FIG. 10A and the embodiment shown in FIG. 2 is that the first electrode 1012 extends across the protective layer 1015 in a lateral direction away from the waveguide 1001. This means the source of the bias that is applied to the electrodes (and in turn to the doped regions) can be connected further away from the waveguide 1001. The source of the bias may be electronics. The lateral extension of the electrodes increases the ease of manufacture of the device and the attachment of electronics for connecting to the electrodes 1012, 1013.

The first and second electrodes 1012, 1013 may all be formed from aluminium. The embodiment shown in FIG. 10A is formed on a 0.8 um SOI platform 1002.

Figure 10B:
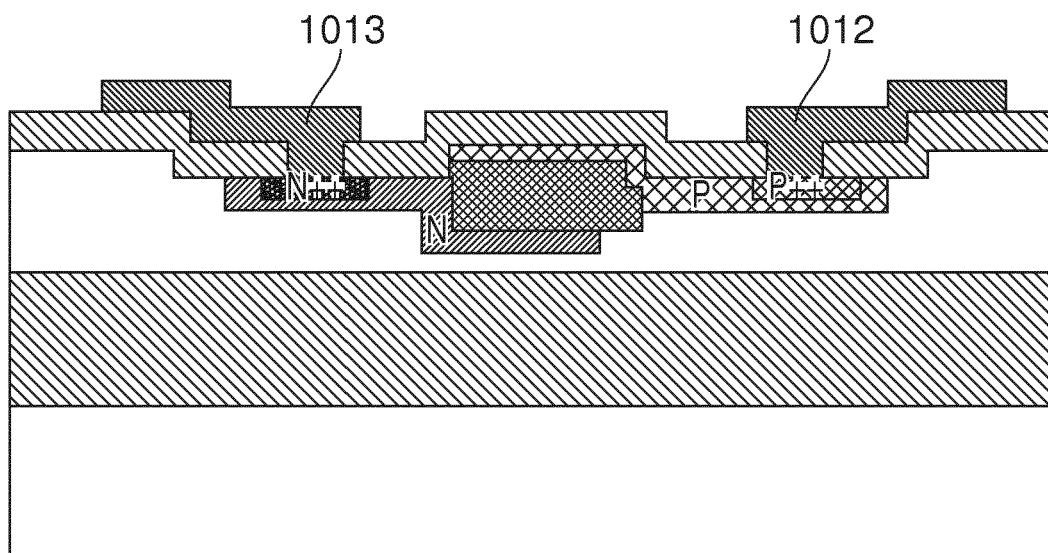
FIG. 10B shows a cross-sectional view of a seventh embodiment of an optoelectronic device, this embodiment may be formed on a nominally 0.8 um SOI platform.

FIG. 10B shows an alternative to the embodiment of FIG. 10A, wherein the dopant species have been reversed. The lower doped regions are n-doped and the upper doped regions are p-doped in the embodiment shown in FIG. 10B, opposite to the embodiment shown in FIG. 10A.

Figure 11A:
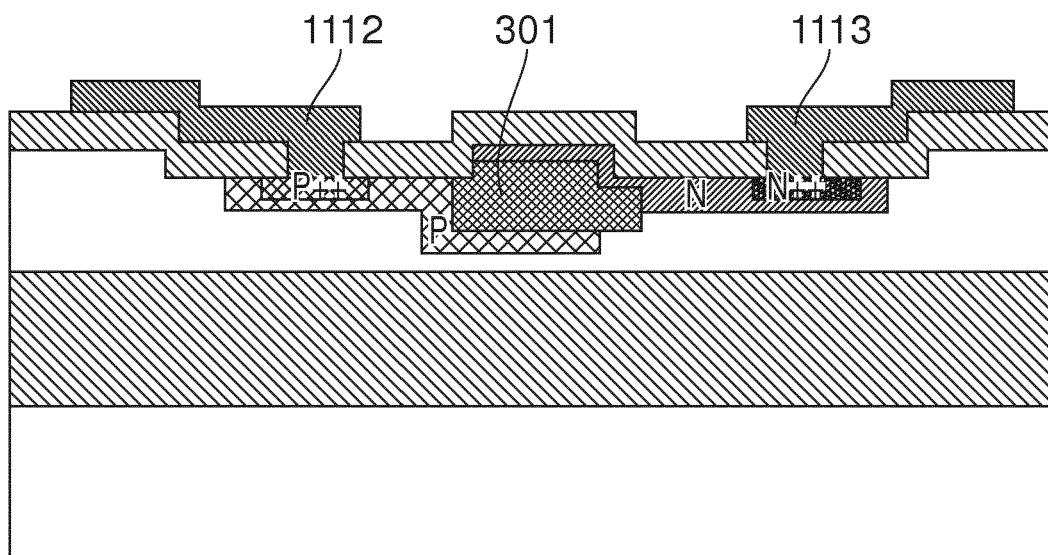
FIG. 11A shows a cross-sectional view of an eighth embodiment of an optoelectronic device, this embodiment may be formed on a 0.8 um SOI platform.

FIG. 11A shows a cross section through B-B' (see FIG. 1). The cross sectional view illustrates the components and regions and the architecture of the optoelectronic component. The components are numbered as in FIG. 3.

The first difference between the embodiment shown in FIG. 11A and the embodiment shown in FIG. 3 is that the first electrode 1112 extends across the protective layer 1114 in a lateral direction away from the waveguide 1101. This means the source of the bias that is applied to the electrodes (and in turn to the doped regions) can be connected further away from the waveguide 1101. The source of the bias may be electronics. The lateral extension of the electrodes increases the ease of manufacture.

The first and second electrodes 1112, 1113 may be formed from aluminium. The embodiment shown in FIG. 11A may be formed on a 0.8 um SOI platform.

Figure 11B:
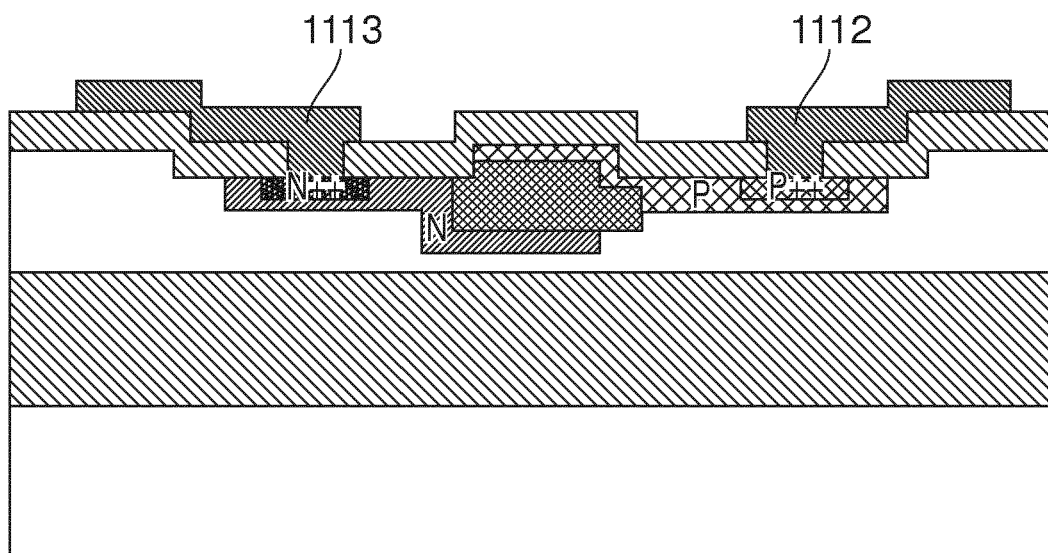
FIG. 11B shows a cross-sectional view of a ninth embodiment of an optoelectronic device, this embodiment may be formed on a 0.8 um SOI platform.

FIG. 11B shows an alternative to the embodiment of FIG. 11A, wherein the dopant species have been reversed. The lower doped regions are n-doped and the upper doped regions are p-doped in the embodiment shown in FIG. 11B, opposite to the embodiment shown in FIG. 11A.

Figure 12A:
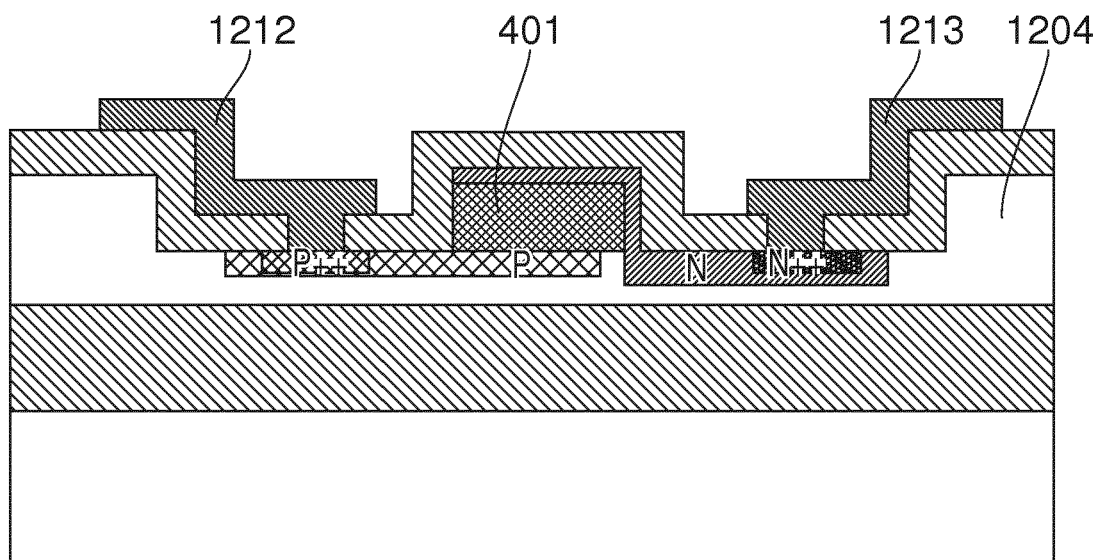
FIG. 12A shows a cross-sectional view of a 10th embodiment of an optoelectronic device s, this embodiment may be formed on a 0.8 um SOI platform.

FIG. 12A shows a cross section through B-B' (see FIG. 1). The cross sectional view illustrates the components and regions and the architecture of the optoelectronic component.

The first difference between the embodiment shown in FIG. 12A and the embodiment shown in FIG. 4 is that the first electrode 1212 extends across the protective layer 1214 in a lateral direction away from the waveguide 1201. This means the source of the bias that is applied to the electrodes (and in turn to the doped regions) can be connected further away from the waveguide 1201. The source of the bias may be electronics. The lateral extension of the electrodes increases the ease of manufacture.

The first and second electrodes 1212, 1213 may be formed from aluminium. The embodiment shown in FIG. 12A may be formed on a 0.8 um SOI platform 1204.

Figure 12B:
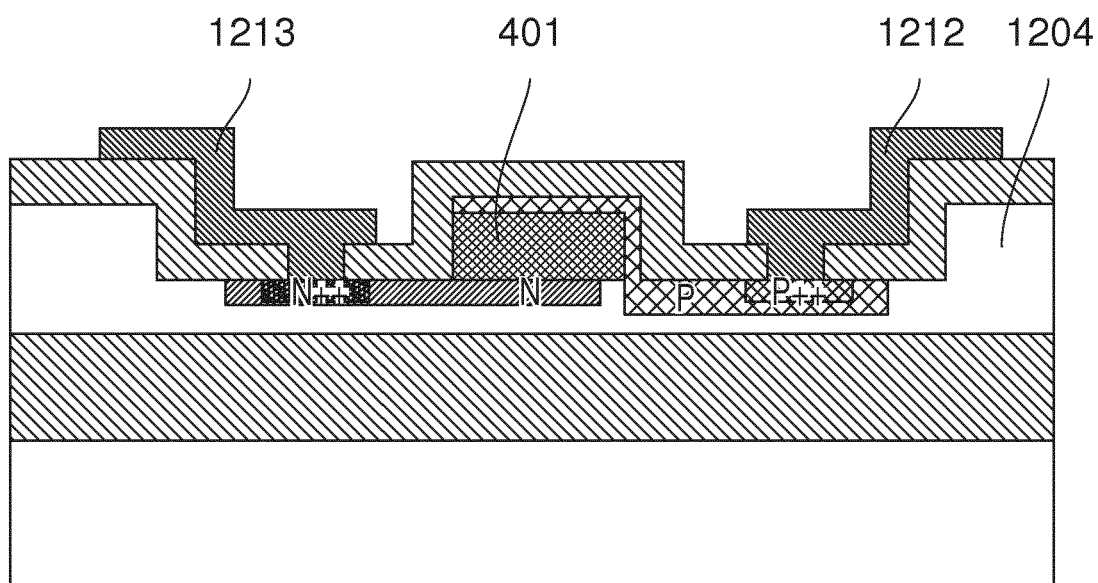
FIG. 12B shows a cross-sectional view of an 11th embodiment of an optoelectronic device, this embodiment may be formed on a 0.8 um SOI platform.

FIG. 12B shows an alternative to the embodiment of FIG. 12A, wherein the dopant species have been reversed. The lower doped regions are n-doped and the upper doped regions are p-doped in the embodiment shown in FIG. 12B, opposite to the embodiment shown in FIG. 12A.

Figure 13A:
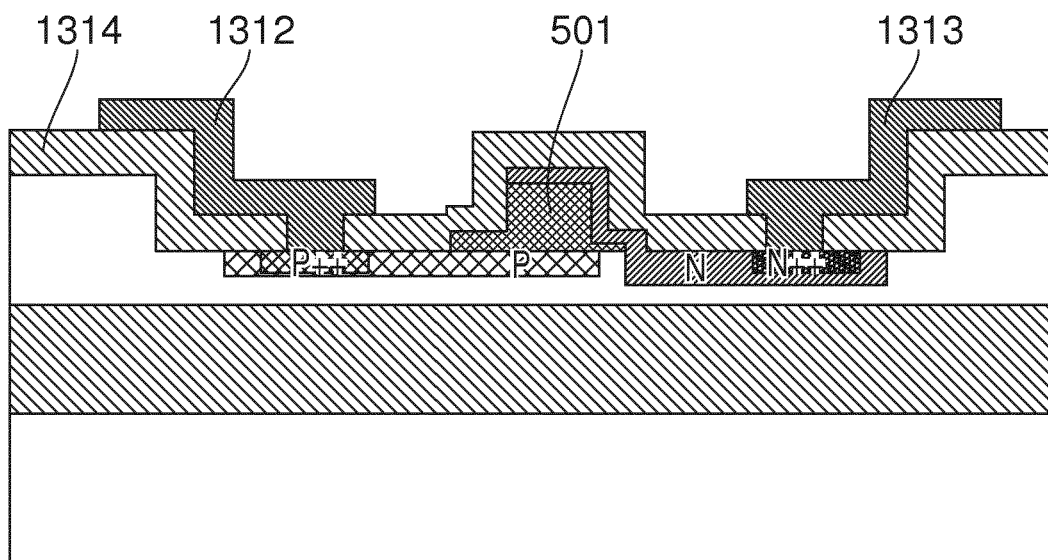
FIG. 13A shows a cross-sectional view of a 12th embodiment of an optoelectronic device, this embodiment may be formed on a 0.8 um SOI platform.

FIG. 13A shows a cross section through B-B' (see FIG. 1). The cross sectional view illustrates the components and regions and the architecture of the optoelectronic component.

The first difference between the embodiment shown in FIG. 13A and the embodiment shown in FIG. 5 is that the first electrode 1312 extends across the protective layer 1314 in a lateral direction away from the waveguide 1301. This means the source of the bias that is applied to the electrodes (and in turn to the doped regions) can be connected further away from the waveguide 1301. The source of the bias may be electronics. The lateral extension of the electrodes increases the ease of manufacture.

The first and second electrodes 1312, 1313 may be formed from aluminium. The embodiment shown in FIG. 13A may be formed on a 0.8 um SOI platform.

Figure 13B:
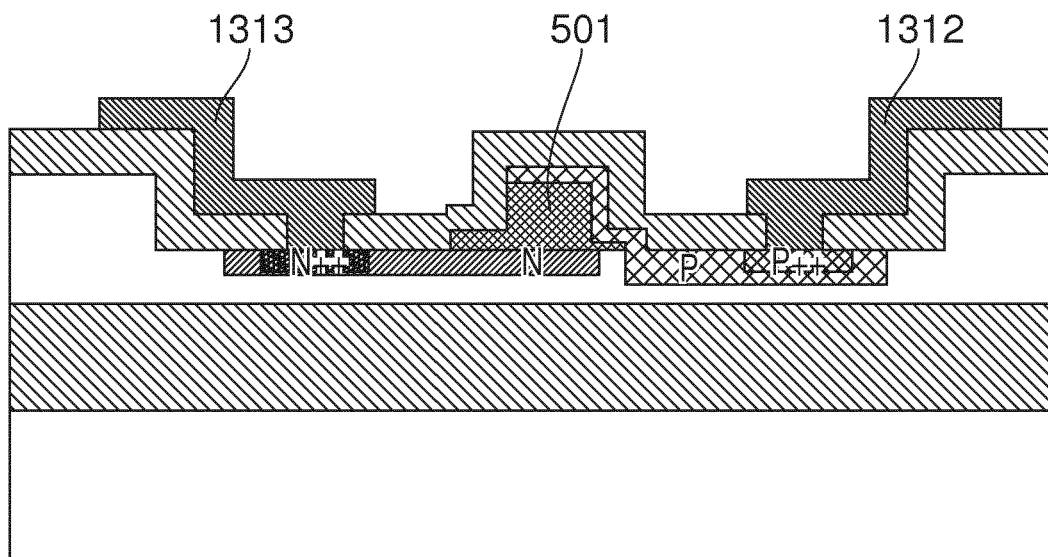
FIG. 13B shows a cross-sectional view of a 13th embodiment of an optoelectronic device, this embodiment may be formed on a 0.8 um SOI platform.

FIG. 13B shows an alternative to the embodiment of FIG. 13A, wherein the dopant species have been reversed. The lower doped regions are n-doped and the upper doped regions are p-doped in the embodiment shown in FIG. 13B, opposite to the embodiment shown in FIG. 13A.

FIG. 14A shows a cross section through B-B' (see FIG. 1). The cross sectional view illustrates the components and regions and the architecture of the optoelectronic component. The elements shown in FIG. 14A are numbered similarly to those in FIG. 2 (for example, element 211 in FIG. 2 corresponds to element 1411 in FIG. 14A).

The difference between the embodiment shown in FIG. 14A and the embodiment shown in FIGS. 2 and 10A is that the embodiment shown in FIG. 14A is formed on a 3 um SOI platform. The optoelectronic component is sunk into the 3 um SOI platform.

FIG. 14B shows an alternative to the embodiment of FIG. 14A, wherein the dopant species have been reversed. The lower doped regions are n-doped and the upper doped regions are p-doped in the embodiment shown in FIG. 14B, opposite to the embodiment shown in FIG. 14A.

FIG. 15A shows a cross section through B-B' (see FIG. 1). The cross sectional view illustrates the components and regions and the architecture of the optoelectronic component. The elements shown in FIG. 15A are numbered similarly to those in FIG. 3 (for example, element 311 in FIG. 3 corresponds to element 1511 in FIG. 15A).

The difference between the embodiment shown in FIG. 15A and the embodiment shown in FIGS. 3 and 11A is that the embodiment shown in FIG. 15A is formed on a 3 um SOI platform. The optoelectronic component is sunk into the 3 um SOI platform.

FIG. 15B shows an alternative to the embodiment of FIG. 15A, wherein the dopant species have been reversed. The lower doped regions are n-doped and the upper doped regions are p-doped in the embodiment shown in FIG. 15B, opposite to the embodiment shown in FIG. 15A.

Figure 16A:
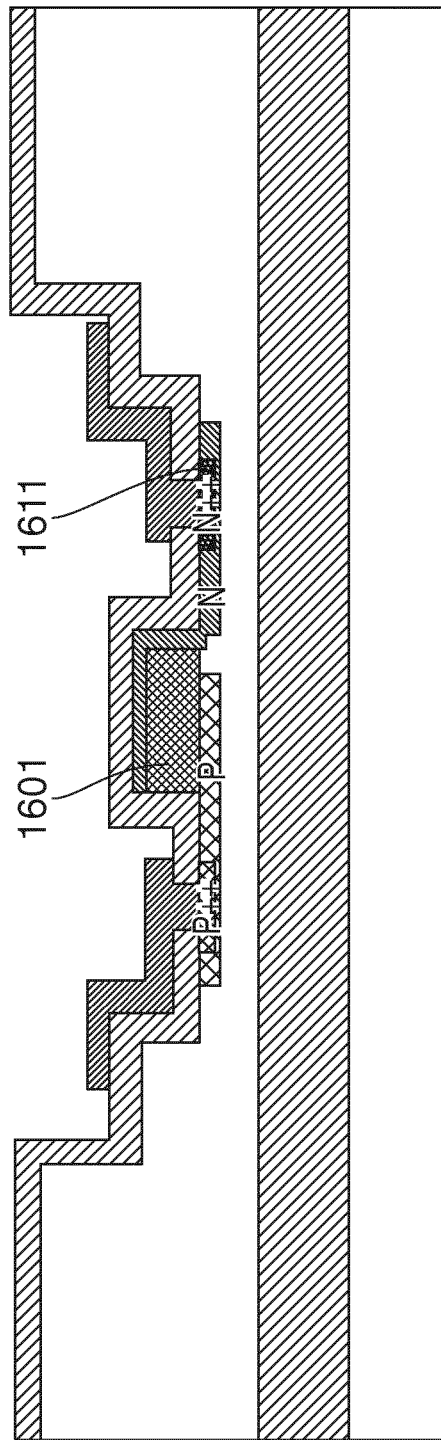
FIG. 16A shows a cross-sectional view of an 18th embodiment of an optoelectronic device, this embodiment may be is formed on a 3 um SOI platform.

FIG. 16A shows a cross section through B-B' (see FIG. 1). The cross sectional view illustrates the components and regions and the architecture of the optoelectronic component. The elements shown in FIG. 16A are numbered similarly to those in FIG. 4 (for example, element 412 in FIG. 4 corresponds to element 1612 in FIG. 16A).

The difference between the embodiment shown in FIG. 16A and the embodiment shown in FIGS. 4 and 12A is that the embodiment shown in FIG. 16A is formed on a 3 um SOI platform. The optoelectronic component is sunk into the 3 um SOI platform.

Figure 16B:
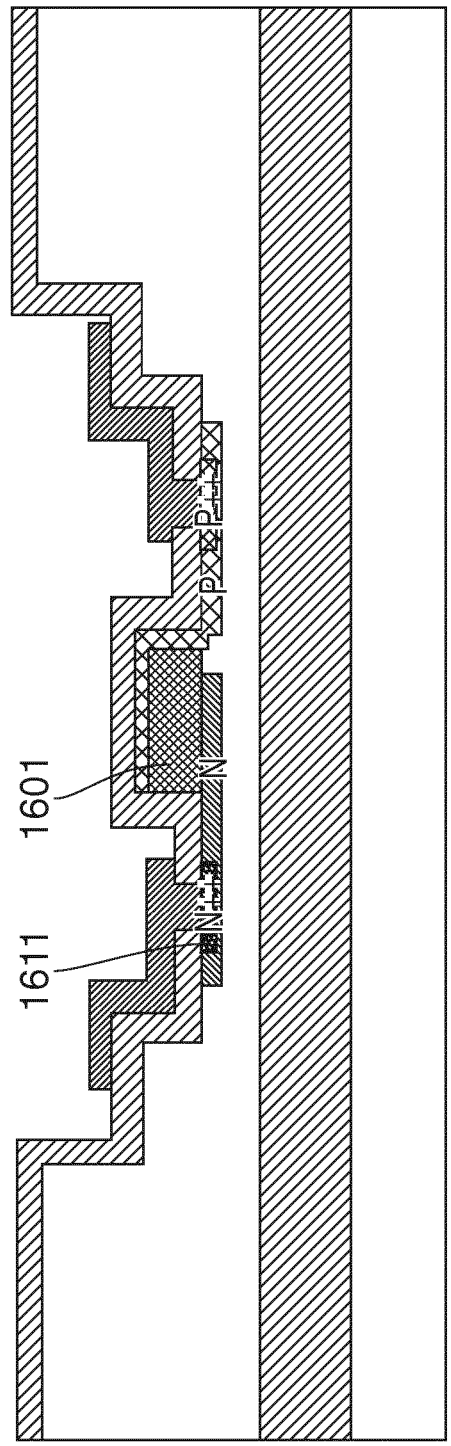
FIG. 16B shows a cross-sectional view of a 19th embodiment of an optoelectronic device, this embodiment may be formed on a 3 um SOI platform.

FIG. 16B shows an alternative to the embodiment of FIG. 16A, wherein the dopant species have been reversed. The lower doped regions are n-doped and the upper doped regions are p-doped in the embodiment shown in FIG. 16B, opposite to the embodiment shown in FIG. 16A.

FIG. 17A shows a cross section through B-B' (see FIG. 1). The cross sectional view illustrates the components and regions and the architecture of the optoelectronic component. The elements shown in FIG. 17A are numbered similarly to those in FIG. 4 (for example, element 512 in FIG. 5 corresponds to element 1712 in FIG. 17A).

The difference between the embodiment shown in FIG. 17A and the embodiment shown in FIGS. 5 and 13A is that the embodiment shown in FIG. 17A is formed on a 3 um SOI platform. The optoelectronic component is sunk into the 3 um SOI platform.

FIG. 17B shows an alternative to the embodiment of FIG. 17A, wherein the dopant species have been reversed. The lower doped regions are n-doped and the upper doped regions are p-doped in the embodiment shown in FIG. 17B, opposite to the embodiment shown in FIG. 17A.

Figure 18A:
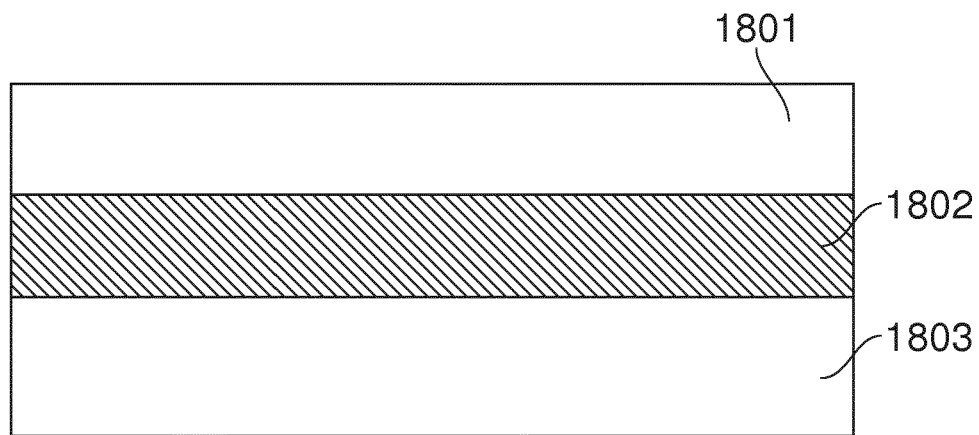
FIGS. 18a-18o illustrate steps of a method for forming an optoelectronic component. This method is suitable for forming an optoelectronic component on a 0.8 um SOI platform.

FIGS. 18a to 18o illustrate the steps of a method according to the second aspect of embodiments of the present invention.

FIG. 18a shows a cross section of an SOI platform suitable for use in the method according to the second aspect. An upper silicon layer 1801 is shown overlying a buried oxide (BOX) layer 1802. The BOX layer 1802 overlies a lower silicon layer 1803. The upper silicon layer may be a 0.8 μm thick intrinsic SOI layer.

In the substrate shown in FIG. 18a, the upper silicon layer 1801 has a thickness of 0.2-1 um.

Figure 18B:
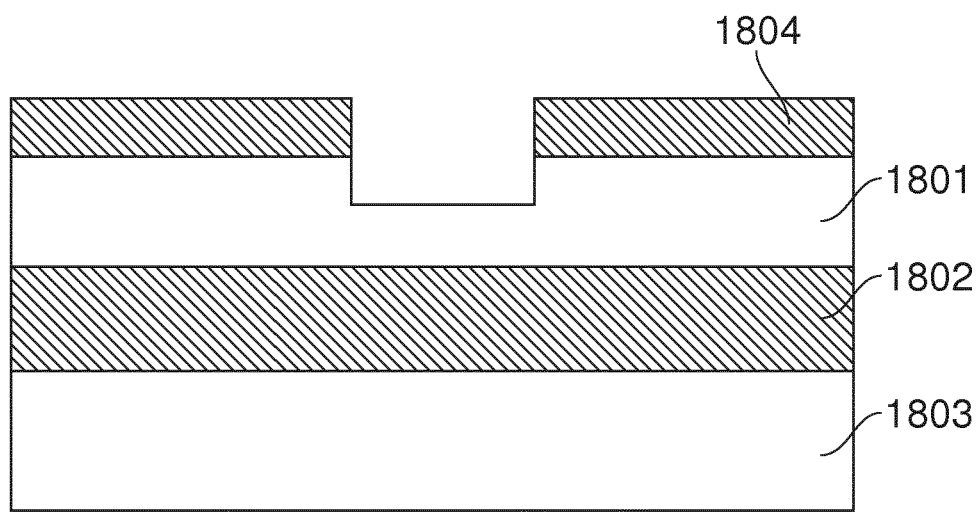

FIG. 18b shows a cross section of an SOI platform after a first hard mask 1804 has been applied. A gap formed in the first hard mask 1804 exposes the upper silicon layer 1801. In the exposed region, the upper silicon layer 1801 has been partially etched to form a first channel. The first channel does not extend completely through the upper silicon layer 1801.

Figure 18C:
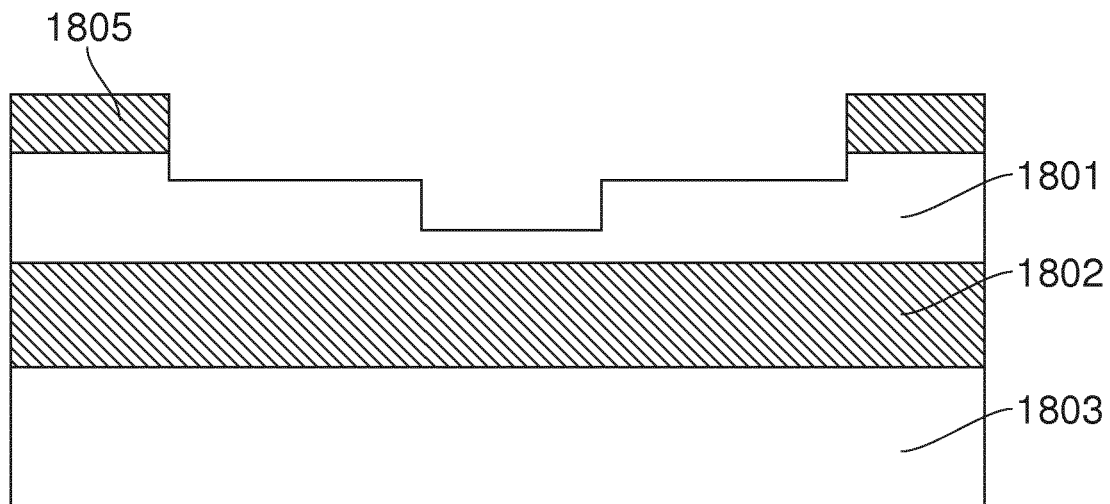

FIG. 18c shows a cross section of an SOI platform after a second hard mask 1805 has been applied, to expose portions of the upper silicon layer 1801 that were not exposed by the first hard mask (see FIG. 18b). A second etching step has been performed, thus forming a second channel. The first channel is within the base of the second channel, and the second channel is wider than the first channel. The first channel is located in the base of the second channel.

Figure 18D:
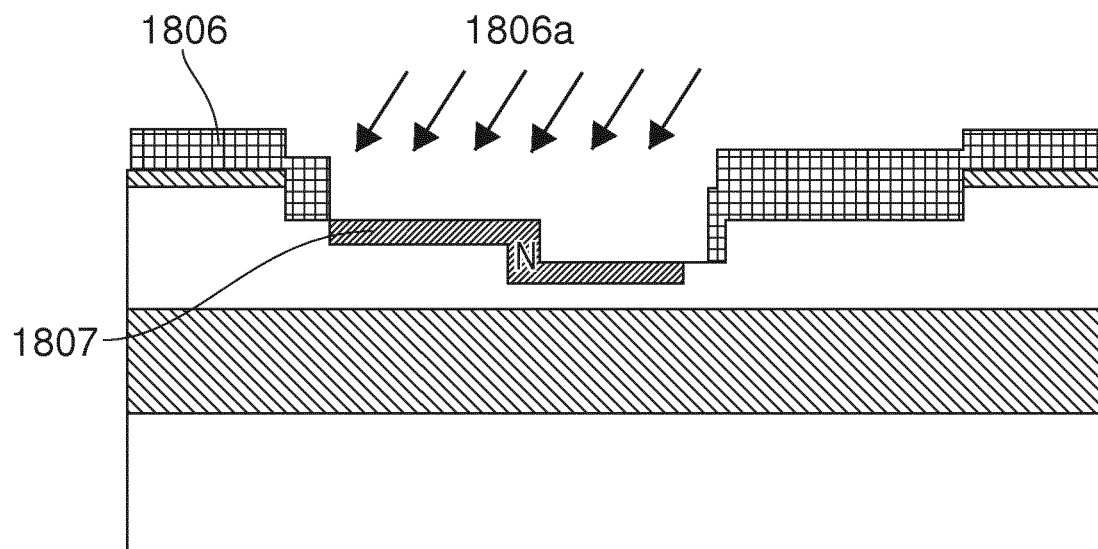

FIG. 18d shows the cross section of the SOI platform after the application of a first photo-resist (PR) mask 1806. Subsequent to the application of the first PR mask 1806, ions 1806a are implanted with an angle (for example an angle of 45 degrees or around 45 degrees) into a lower doped region 1807 in a first dopant implantation step. The first dopant implantation step dopant species is n-type.

Figure 18E:
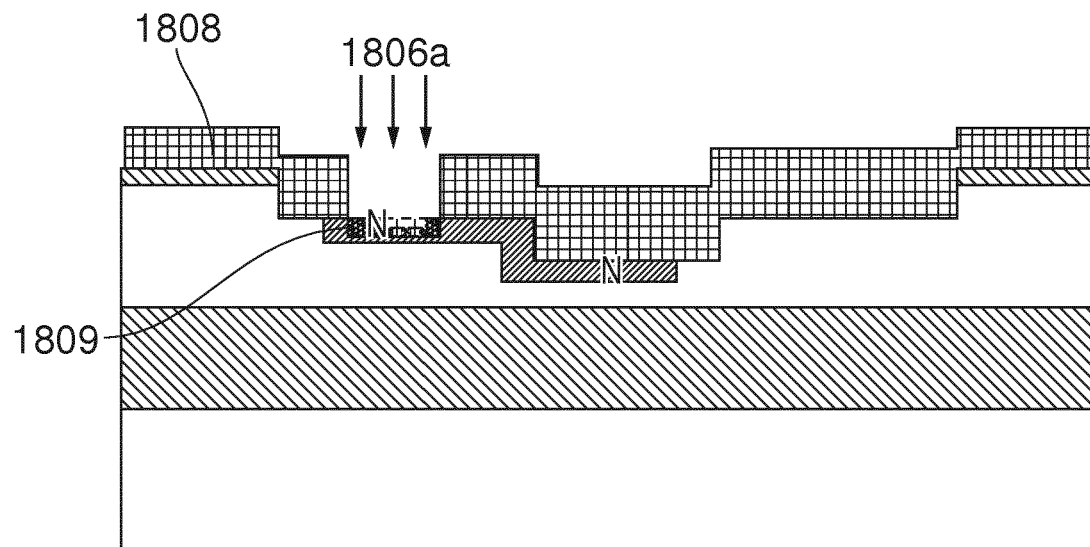

FIG. 18e shows the cross section of the SOI platform after the application of a second PR mask 1808. The second PR mask 1808 exposes a region of the lower doped region 1807. A second dopant implantation step is then performed. The dopant species in the second dopant implantation step is the same as the dopant species in the first dopant implantation step. The second implantation step thereby forms a lower super-doped region 1809. The second dopant implantation step dopant species is n-type.

Figure 18F:
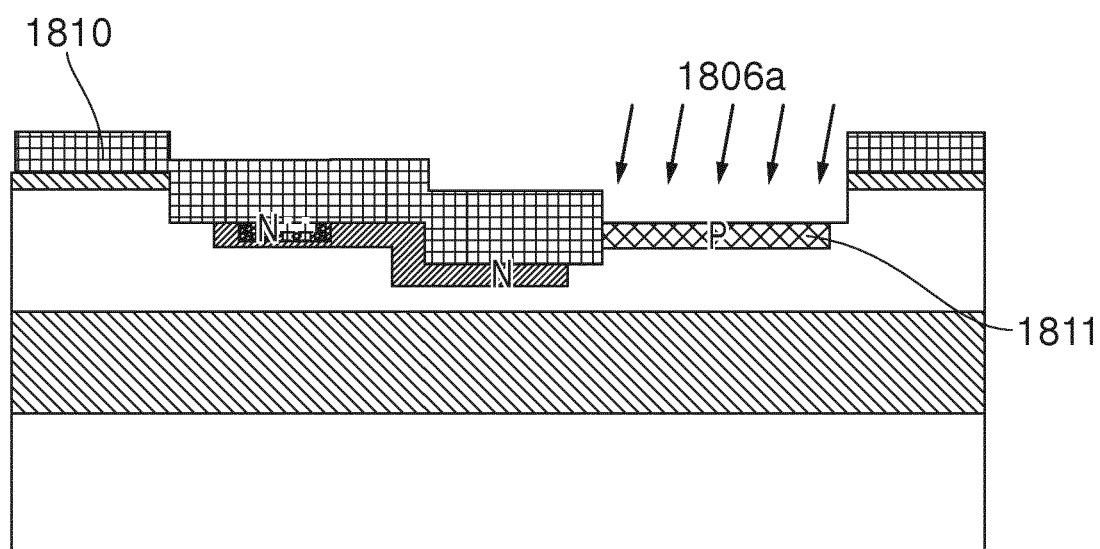

FIG. 18f shows the cross section of the SOI platform after the application of a third PR mask 1810. The third PR mask 1810 exposes an upper region of the upper silicon layer 1801. Subsequent to the application of the third PR mask 1810, ions are implanted into an upper lateral doped region 1811 in a third dopant implantation step. The third dopant implantation step dopant species is p-type.

Figure 18G:
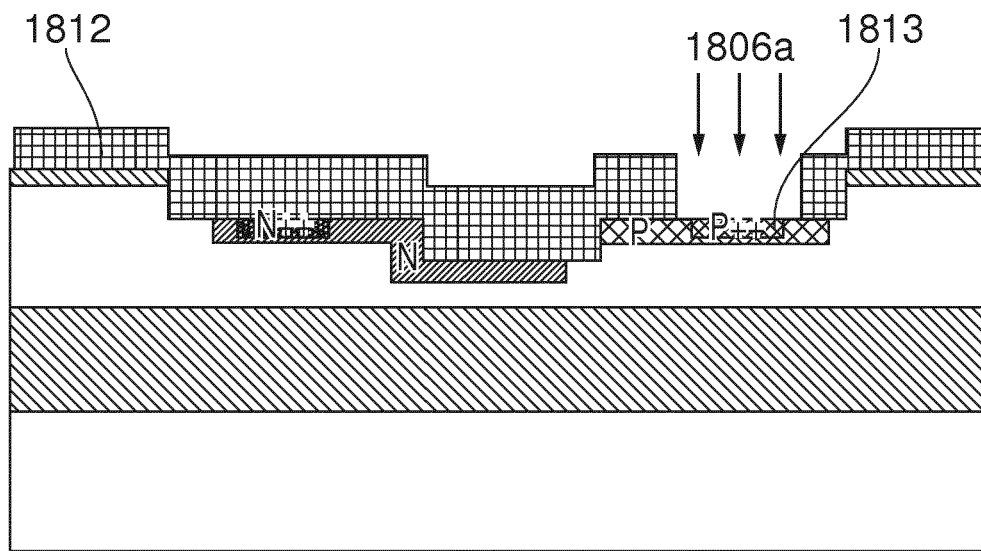

FIG. 18g shows the cross section of the SOI platform after the application of a fourth PR mask 1812. The fourth PR mask 1812 exposes a region of the upper lateral doped region 1811. A fourth dopant implantation step is then performed. The dopant species in the fourth dopant implantation step is the same as the dopant species in the third dopant implantation step. The fourth dopant implantation step thereby forms an upper super-doped region 1813. The fourth dopant implantation step dopant species is p-type.

Figure 18H:
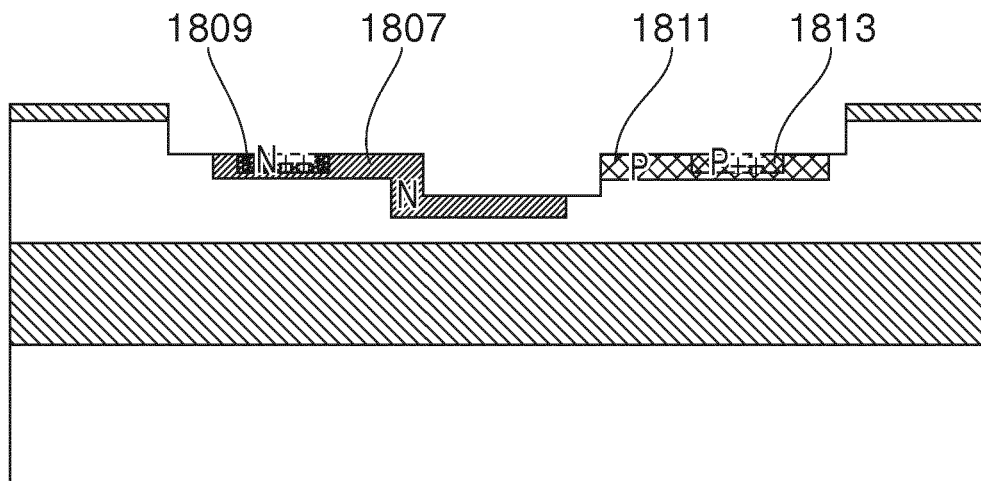

FIG. 18h shows the cross section of the SOI platform after the removal of the fourth PR mask and annealing which may be used with RTA (Rapid Thermal Annealing) at 1050~1100° C. for 10 seconds.

Figure 18I:
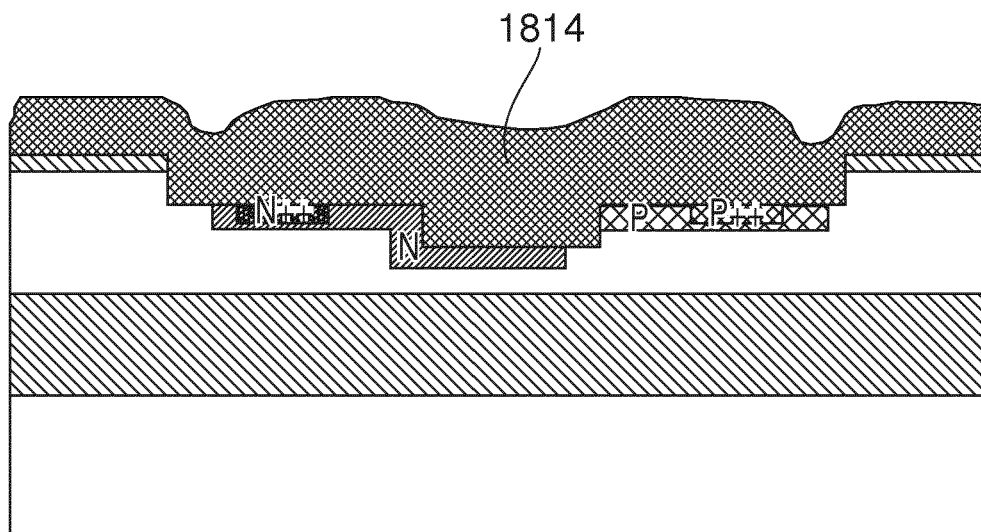

FIG. 18i shows the cross section of the SOI platform after the epitaxial growth of a SiGe layer 1814. Although the method is described below with respect to SiGe, it is envisaged that other optically suitable materials could also be used.

Figure 18J:
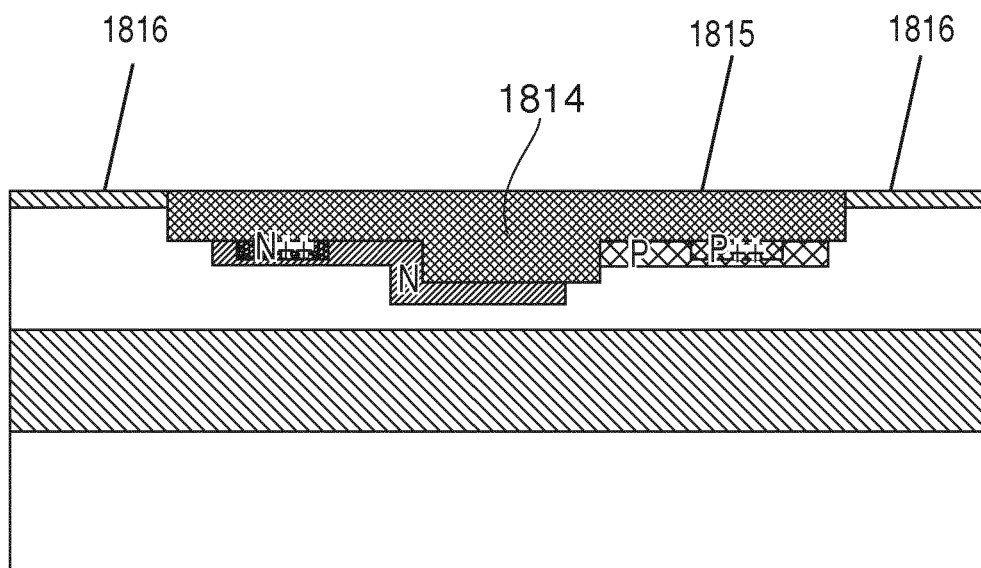

FIG. 18j shows the cross section of the SOI platform after a planarizing step, wherein the deposited SiGe 1814 is planarized by chemical mechanical planarization (CMP). The SiGe layer is planarized such that the top surface 1815 of the SiGe layer is level with the top surface 1816 of the protective upper most adjacent layer.

FIG. 18k shows two alternatives (1) and (2). The upper part of FIG. 18k shows a hard mask 1817 that extends across a lateral portion of the SiGe layer. The lateral portion of the SiGe that is covered by the hard mask 1817 corresponds to the full width of the channel in the Silicon layer 1801 (see FIG. 18b). The SiGe that remains exposed is then etched away, leaving a SiGe waveguide region 1818 with a rectangular cross sectional shape.

Additionally, as shown in the lower part of FIG. 18k, an alternative hard mask 1819 may be formed on the SiGe layer. When etched, the SiGe waveguide region will have an inverted-'T' shaped cross sectional shape 1819b.

FIG. 18l shows two alternatives, corresponding to the two alternatives shown in FIG. 18k. In each alternative, a first protective layer 1802 of $SiO_2$ (silicon dioxide) (20-100 nm) has been formed. In both cases, the first protective layer covers the uppermost surface of the device.

FIG. 18m shows two alternatives, corresponding to the two alternatives shown in FIGS. 18k and 18l.

In the first alternative (shown in the upper part of FIG. 18m), a fifth PR mask 1821 has been formed to expose the region of the device above the SiGe waveguide and the region adjacent to the lateral upper p-doped region 1811. An ion implantation step 1821b with 45 degree angle is then used to implant p-type dopant into the exposed regions. Thus an upper doped region 1822 overlying the SiGe waveguide is formed, and a contiguous doped region is formed between the upper doped region and the upper lateral doped region.

In the second alternative (shown in the lower part of FIG. 18m), a fifth PR mask 1821 has been formed to expose the region of the device above the SiGe waveguide and the region adjacent to the upper p-doped region 1811. An ion implantation step with 45 degree angle is then used to implant p-type dopant into the exposed regions. Thus an upper doped region 1822 overlying the SiGe waveguide is formed, and a contiguous doped region is formed between the upper doped region and the upper lateral doped region.

FIG. 18n shows two alternatives, corresponding to the two alternatives shown 18k, 18l and 18m. In each alternative, a second protective layer 1823 e.g. of $SiO_2$ (silicon dioxide) has been formed. In both cases, the second protective layer 1823 covers the uppermost surface of the device. The second protective layer 1823 has a greater thickness (around 500 nm) than the first protective layer 1820 (see FIG. 18l).

FIG. 18o shows two alternatives, corresponding to the two alternatives shown 18k, 18l, 18m, and 18n. In each alternative, a first electrode 1824 has been formed to contact the lower super-doped region 1809 on a first lateral side, and; a second electrode 1825 has been formed to contact the upper super-doped region 1813 on a second lateral side. The first electrode 1824 extends laterally away from the SiGe waveguide 1818 in the first lateral direction, and the second electrode 1825 extends laterally away from the SiGe waveguide 1818 in the second lateral direction. In other words, the first and second electrodes 1824, 1825 extend in opposite directions away from the SiGe waveguide 1818.

The first and second electrodes 1824, 1825 may each be formed from aluminium and may be deposited in a metallization step. The first and second electrodes 1824, 1825 can be formed simultaneously in their respective positions, thus such architecture of an optoelectronic device simplifies manufacture of such a device.

FIGS. 19a to 19f illustrate steps of a method according to the second aspect of embodiments of the present invention.

Figure 19A:
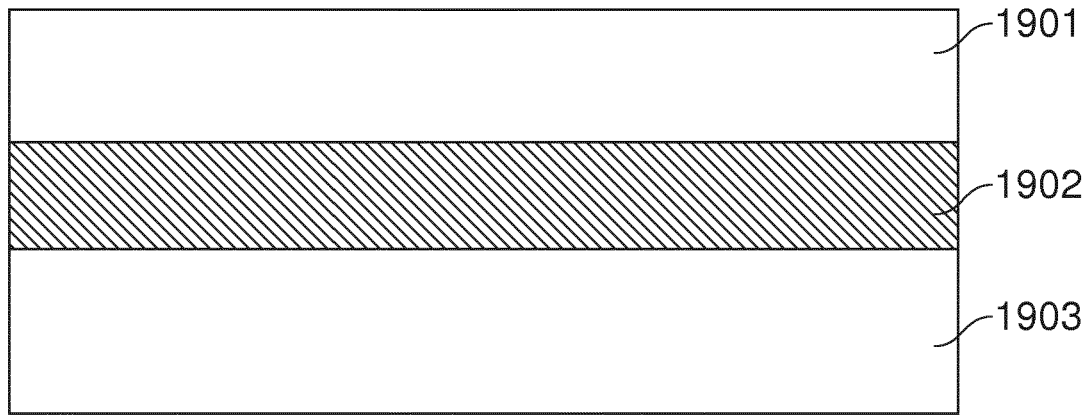
FIGS. 19a-19f illustrate steps of a further method for forming an optoelectronic component. This embodiment is suitable for forming an optoelectronic component on a 0.8 um SOI platform.

FIG. 19a shows a cross section of an SOI platform suitable for use in the method according to the second aspect. An upper silicon layer 1901 is shown overlying a buried oxide (BOX) layer 1902. The BOX layer 1902 overlies a lower silicon layer 1903.

In the substrate shown in FIG. 19a, the upper silicon layer 1901 may have a thickness of 0.2-1 um.

Figure 19B:
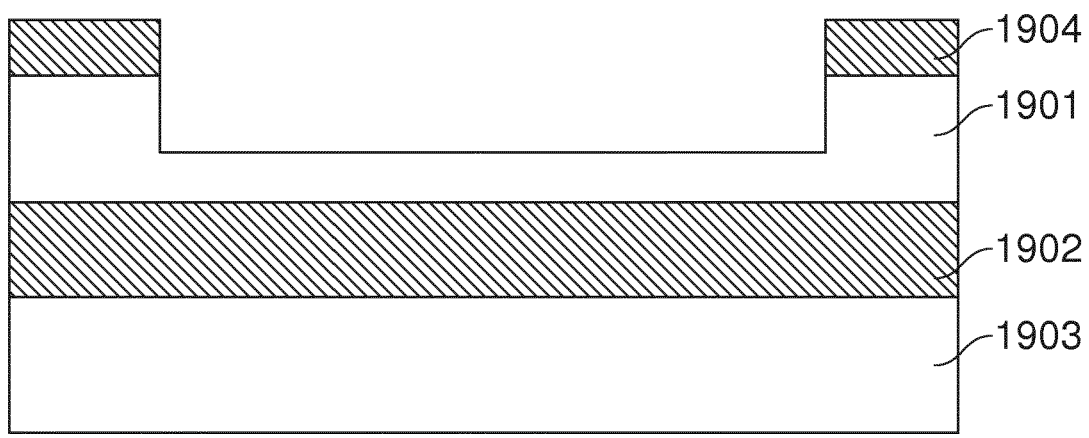

FIG. 19b shows a cross section of an SOI platform after a hard mask 1904 has been applied. A gap formed in the hard mask 1904 exposes the upper silicon layer 1901. In the exposed region, the upper silicon layer 1901 has been partially etched to form a first cavity. The first cavity does not extend completely through the upper silicon layer 1901.

Figure 19C:
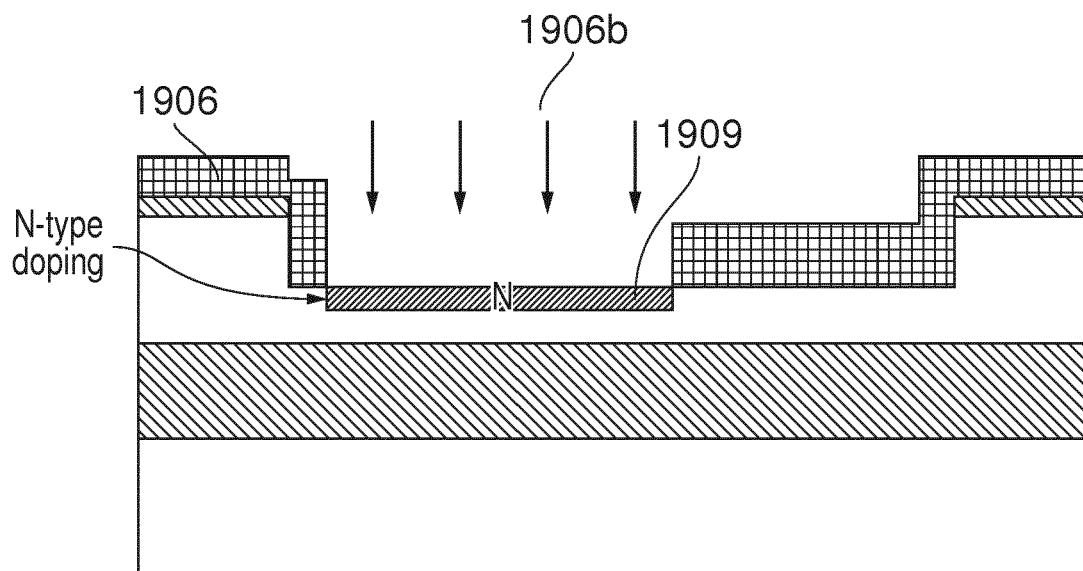

FIG. 19c shows the cross section of the SOI platform after the application of a first photo-resist (PR) mask 1906. Subsequent to the application of the first PR mask 1906, ions 1906b are implanted into a lower doped region 1909 in a first dopant implantation step. The first dopant implantation step dopant species is n-type. The lower doped region 1909 resulting from the first dopant implantation step is generally flat.

Figure 19D:
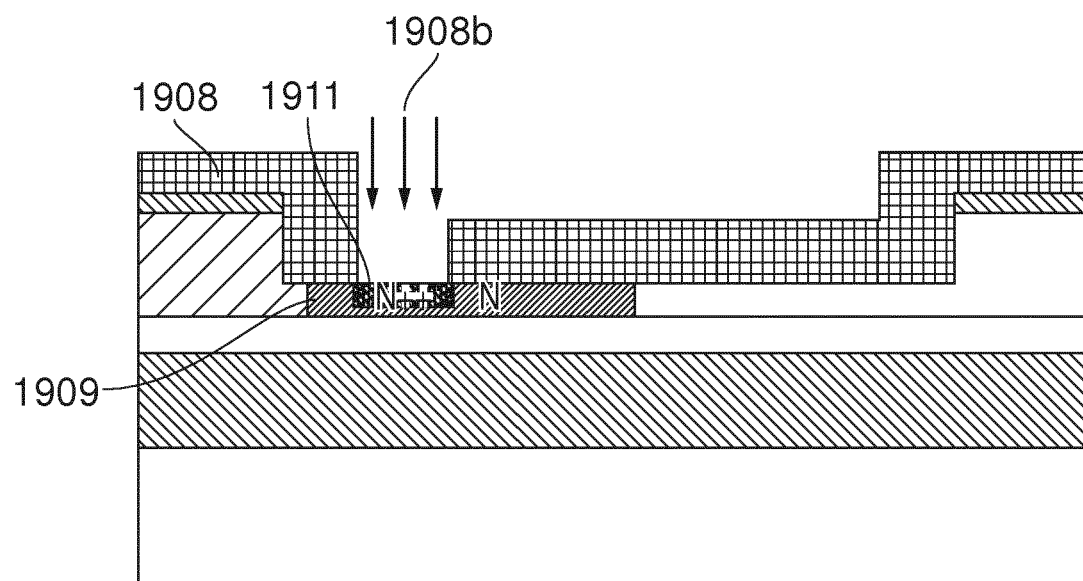

FIG. 19d shows the cross section of the SOI platform after the application of a second PR mask 1908. The second PR mask 1908 exposes a region of the lower doped region 1909. A second dopant implantation step 1908b is then performed. The dopant species in the second dopant implantation step is the same as the dopant species in the first dopant implantation step. The second implantation step thereby forms a lower super-doped region 19011. The second dopant implantation step dopant species is n-type.

Figure 19E:
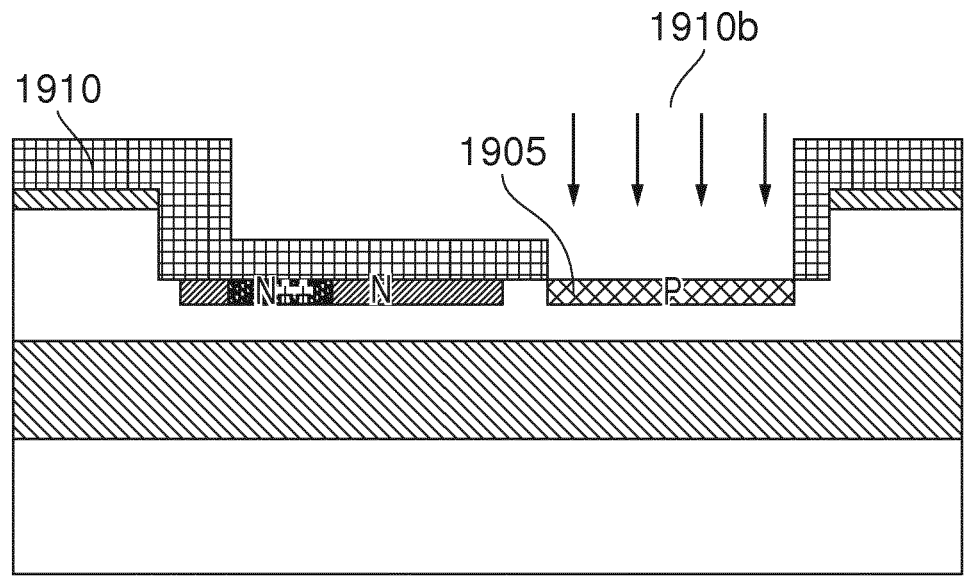

FIG. 19e shows the cross section of the SOI platform after the application of a third PR mask 1910. Subsequent to the application of the third PR mask 1910, ions 1910b are implanted into an upper lateral doped region 1905 in a third dopant implantation step. The third dopant implantation step dopant species is p-type.

Figure 19F:
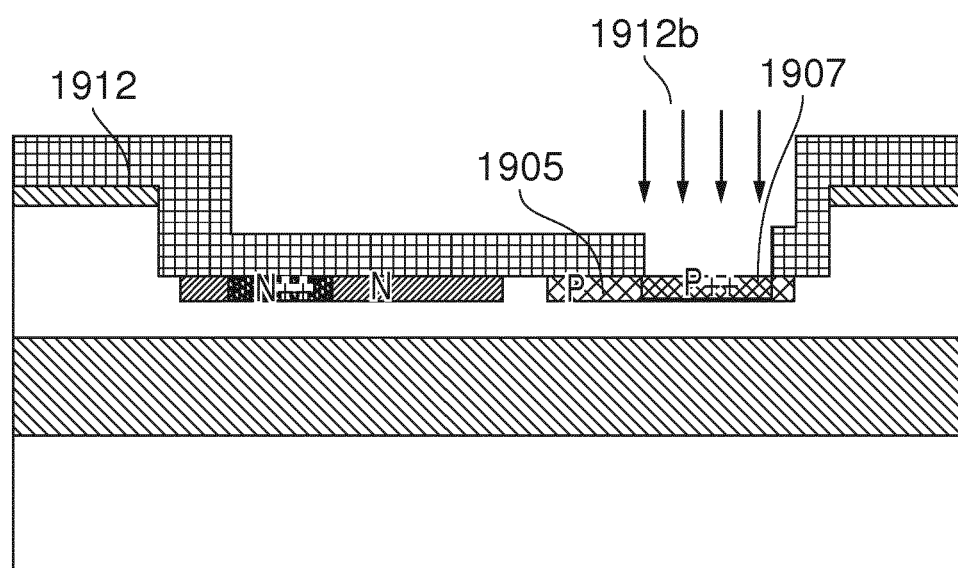

FIG. 19f shows the cross section of the SOI platform after the application of a fourth PR mask 1912. The fourth PR mask 1912 exposes a region of the upper lateral doped region 1905. A fourth dopant implantation step is then performed. The dopant species in the fourth dopant implantation step is the same as the dopant species in the third dopant implantation step 1912b. The fourth dopant implantation step thereby forms an upper super-doped region 1907. The fourth dopant implantation step dopant species is p-type. The remainder of the manufacturing process is as in previous examples.

Figure 20A:
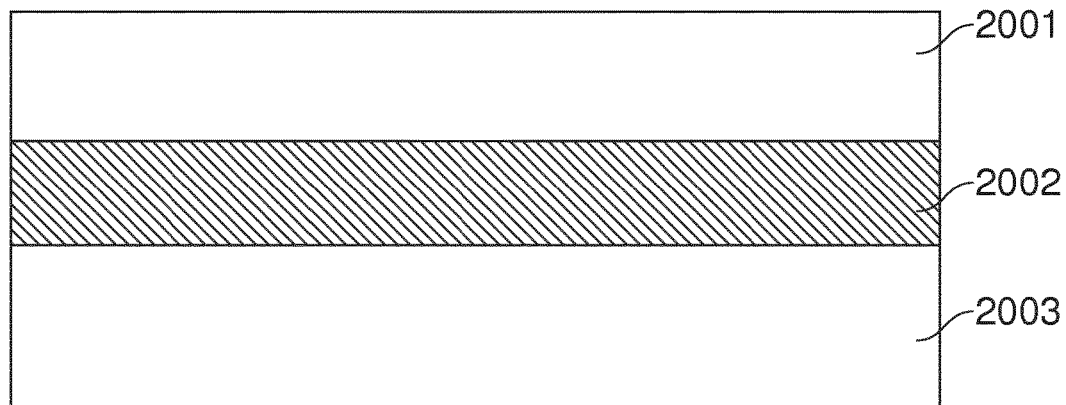
FIGS. 20a-20p illustrate steps of a further method for forming an optoelectronic component. This embodiment is suitable for forming an optoelectronic component on a 3 um SOI platform.

FIGS. 20a to 20p illustrate steps of a method according to the second aspect of embodiments of the present invention.

FIG. 20a shows a cross section of an SOI platform suitable for use in the method according to the second aspect. An upper silicon layer 2001 is shown overlying a buried oxide (BOX) layer 2002. The BOX layer 2002 overlies a lower silicon layer 2003.

In the substrate shown in FIG. 20a, the upper silicon layer 2001 may have a thickness of 3 μm or substantially 3 μm.

Figure 20B:
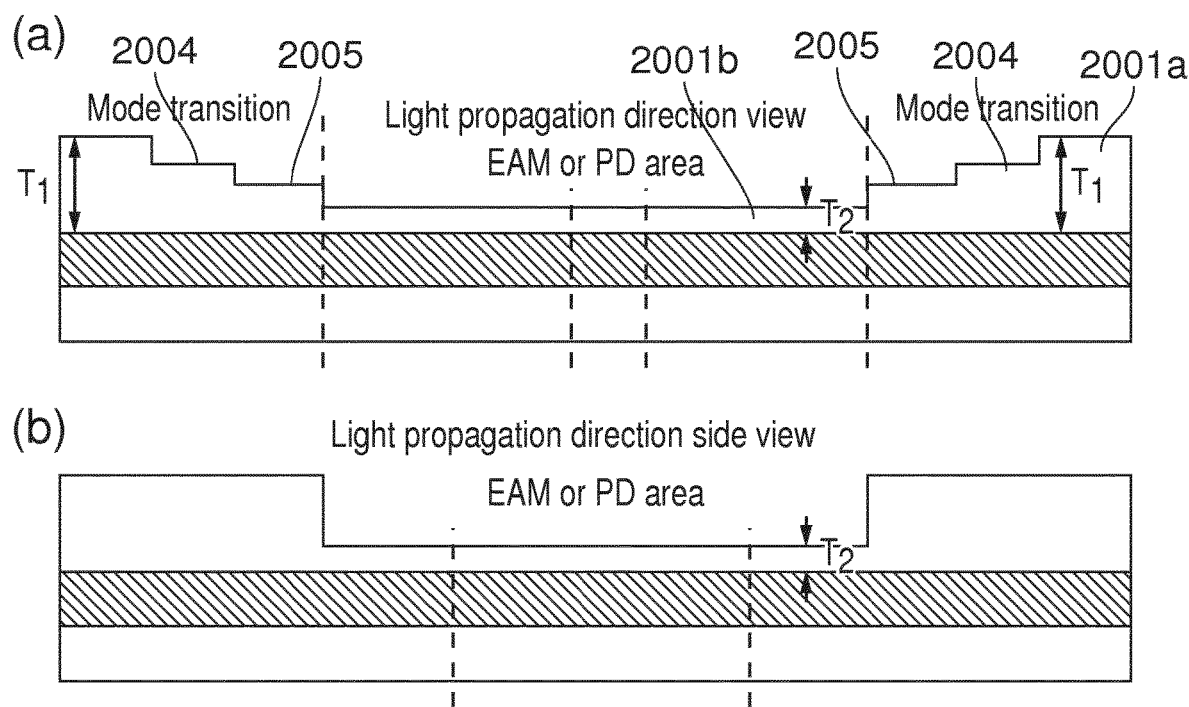

The upper part of FIG. 20b shows a cross section view along the length of an embodiment of the present invention. In this view, the light will either pass from left to right or right to left. The view generally illustrates a first mode transition zone 2004 and a second mode transition zone 2005. Between the left and right first and second mode transition zones 2004, 2005 there is an elongated waveguide region 2001b. It is in this elongate waveguide region 2001b that an optoelectronic device according to embodiments of the present invention will be located.

The maximum thickness $T_1$ of the upper silicon layer 2001a is greater than the maximum thickness $T_2$ of the waveguide region. For example, the maximum thickness $T_1$ may be 3 μm. The thickness of the upper silicon layer $T_2$ in the waveguide region 2001b may be 0.7-1 μm. Between these two thicknesses, it will be noted that the upper silicon region is stepped.

The lower part of FIG. 20b shows a cross sectional view of waveguide region 2001b through the SOI platform that is perpendicular to the direction of light travel.

Figure 20C:
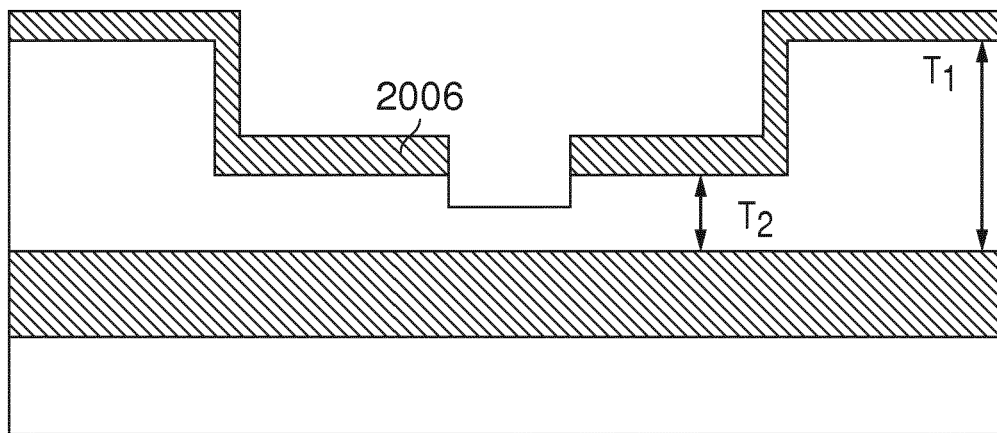

FIG. 20c shows a cross section of an SOI platform after a first hard mask 2006 has been applied. An opening formed in the hard mask 2006 exposes the upper silicon layer 2001. In the exposed region, the upper silicon layer 2001 has been partially etched to form a first cavity. The first cavity does not extend completely through the upper silicon layer 2001.

Figure 20D:
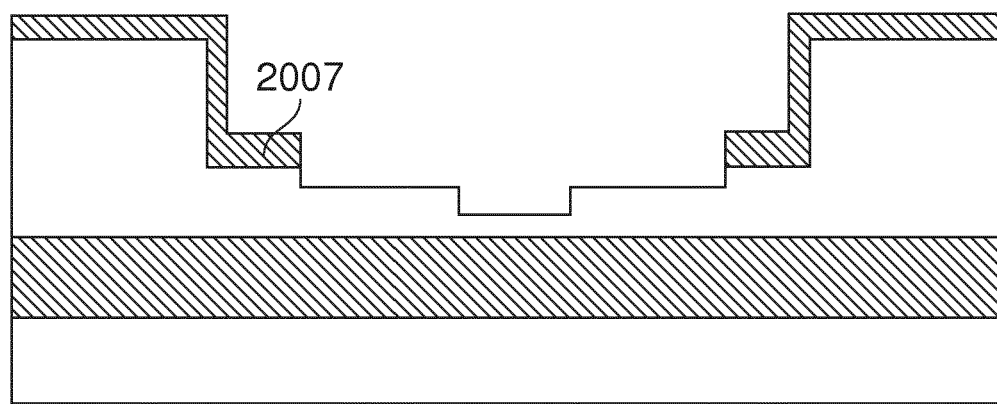

FIG. 20d shows a cross section of an SOI platform in which a second hard mask 2007 has been applied to expose portions of the upper silicon layer 2001 that were not exposed by the first hard mask 2006a (see FIG. 20c). A second etching step has been performed, thus forming a second cavity. The first cavity is within the base of the second cavity, and the second cavity is wider than the first cavity. The first cavity is centrally located in the base of the second cavity. It will be noted that the base of the first cavity is exposed (and therefore etched) during both the first and second etching steps.

Figure 20E:
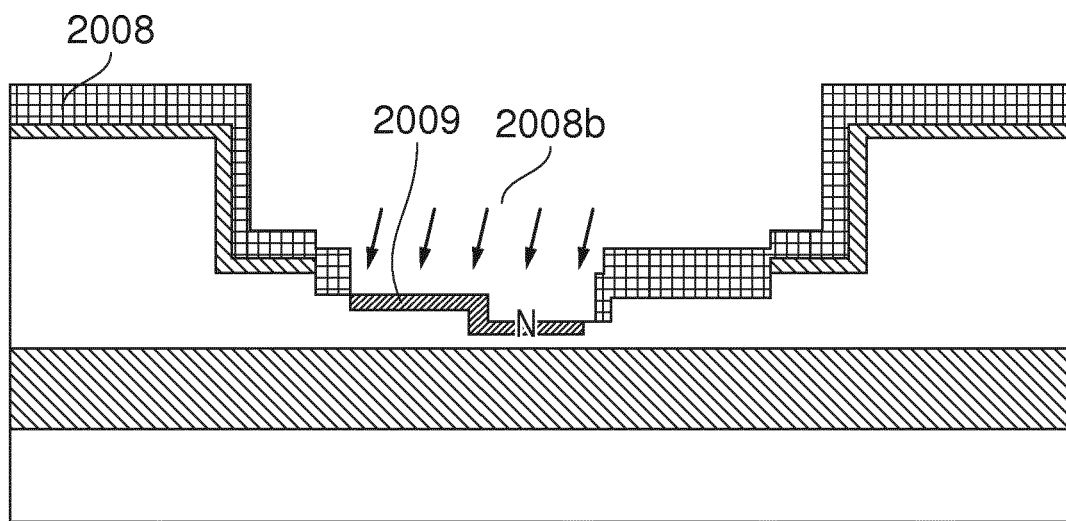

FIG. 20*e* shows the cross section of the SOI platform after the application of a first photo-resist (PR) mask 2008. Subsequent to the application of the first PR mask 2008, ions 2008*b* are implanted into a lower doped region 2009 in a first dopant implantation step with a tilt angle of 45 degree. The first dopant implantation step dopant species is n-type.

Figure 20F:
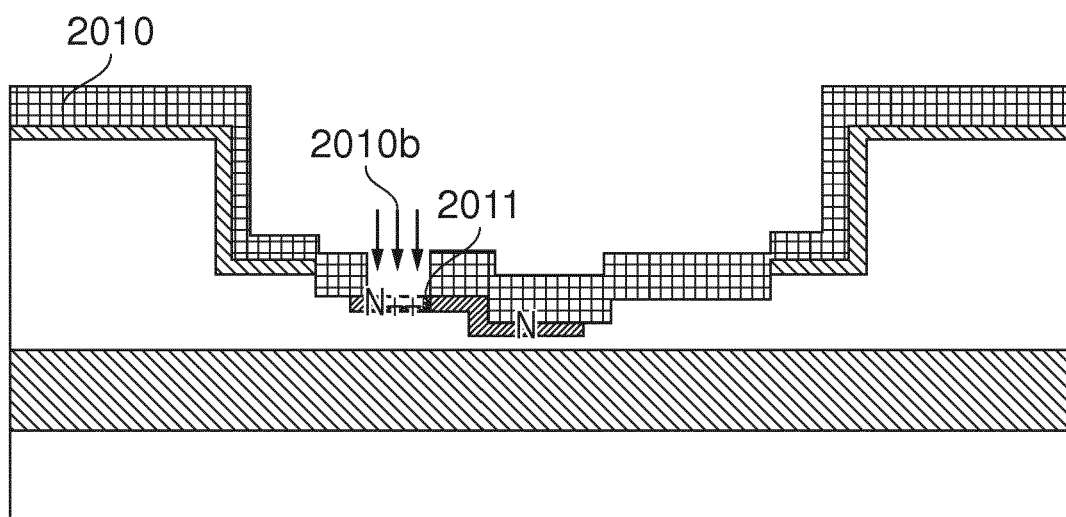

FIG. 20*f* shows the cross section of the SOI platform after the application of a second PR mask 2010. The second PR mask 2010 exposes a region of the lower doped region 2009. A second dopant implantation step is then performed. The dopant species in the second dopant implantation step is the same as the dopant species in the first dopant implantation step. The second implantation step thereby forms a lower super-doped region 2011. The second dopant implantation step dopant species is n-type.

Figure 20G:
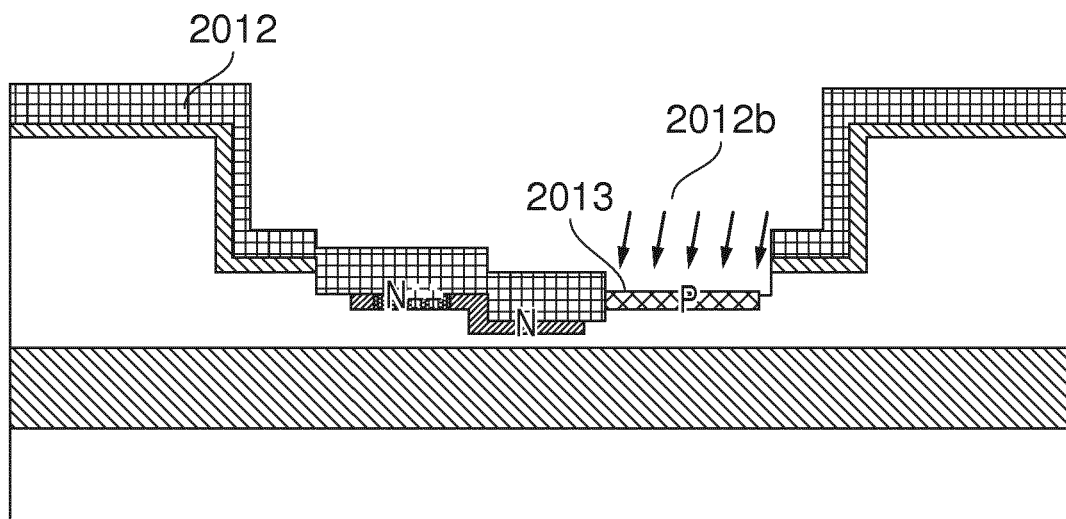

FIG. 20*g* shows the cross section of the SOI platform after the application of a third PR mask 2012. The third PR mask 2012 exposes an upper region of the upper silicon layer 2001. Subsequent to the application of the third PR mask 2012, ions 2012*b* are implanted into an upper lateral doped region 2013 in a third dopant implantation step. The third dopant implantation step dopant species is p-type.

Figure 20H:
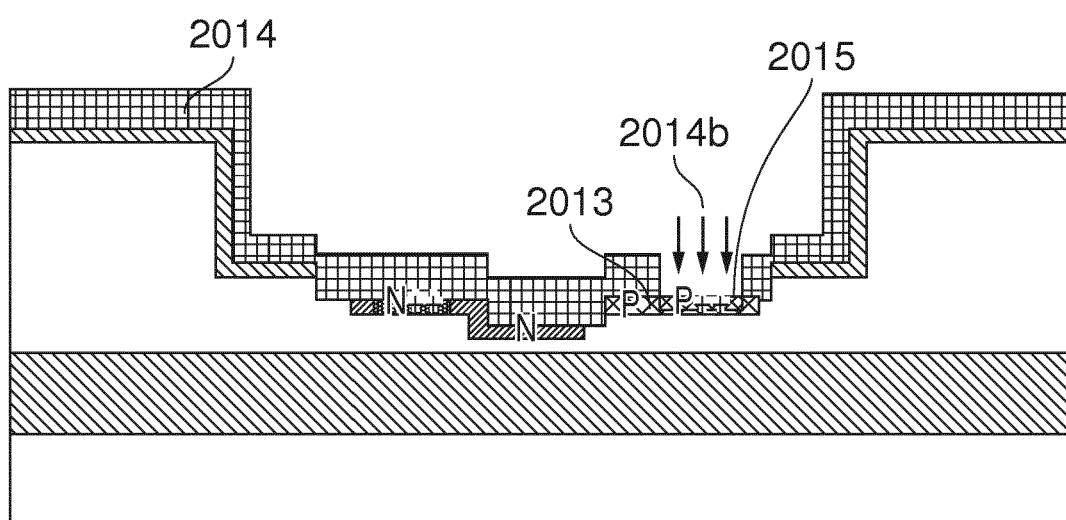

FIG. 20*h* shows the cross section of the SOI platform after the application of a fourth PR mask 2014. The fourth PR mask 2014 exposes a region of the upper lateral doped region 2013. A fourth dopant implantation step 2014*b* is then performed. The dopant species in the fourth dopant implantation step is the same as the dopant species in the third dopant implantation step. The fourth dopant implantation step thereby forms an upper super-doped region 2015. The fourth dopant implantation step dopant species is p-type.

Figure 20I:
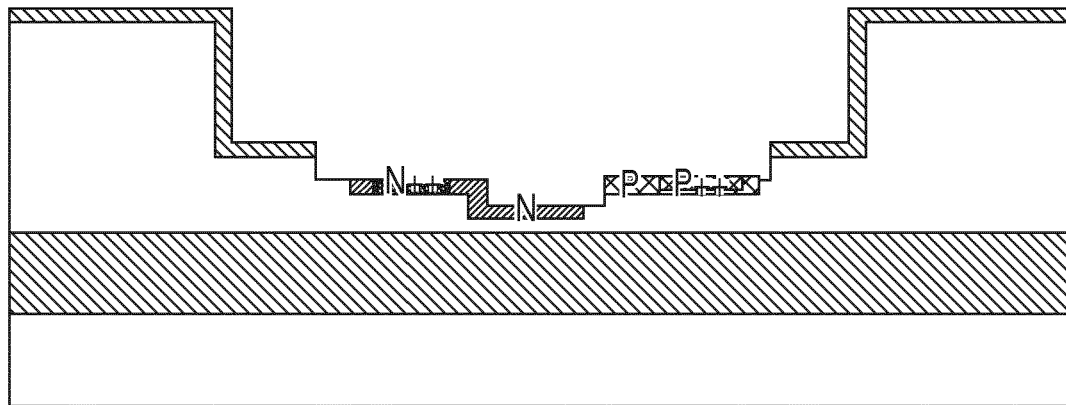

FIG. 20*i* shows the cross section of the SOI platform after the first, second, third, and fourth dopant implantation steps have been completed and the first, second, third and fourth PR masks have been removed, and RTA (rapid thermal annealing), for example at 1050~1100° C. for 10 seconds performed.

Figure 20J:
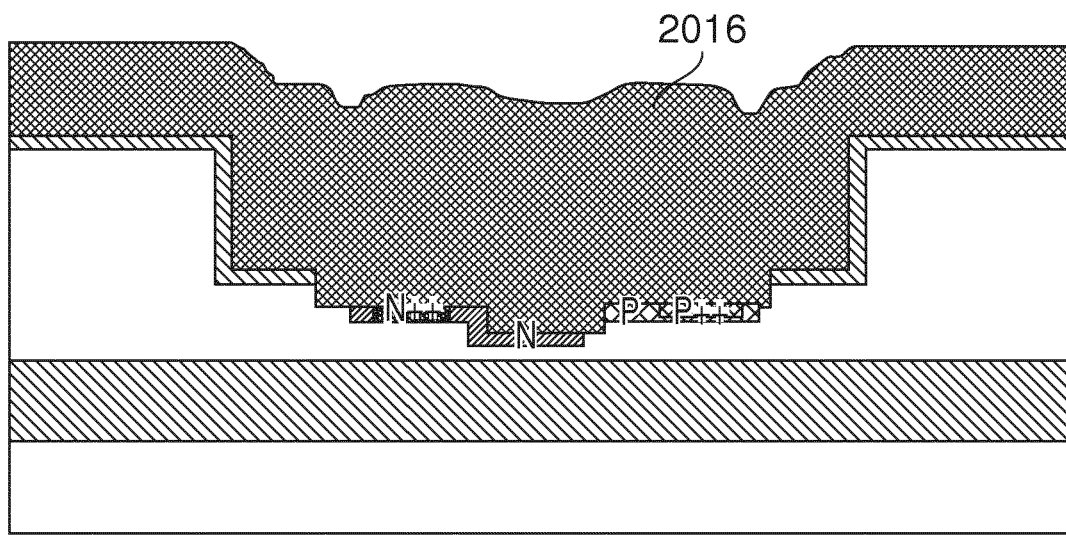

FIG. 20*j* shows the cross section of the SOI platform after the epitaxial growth of a SiGe layer 2016.

Figure 20K:
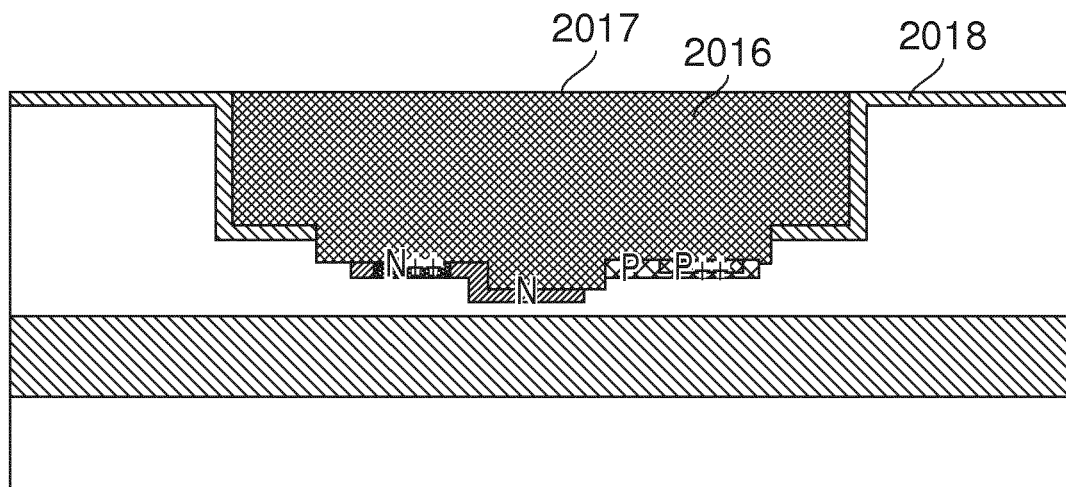

FIG. 20*k* shows the cross section of the SOI platform after a planarizing step, wherein the deposited SiGe 2016 is planarized by chemical mechanical planarization (CMP). The SiGe layer 2016 is smoothed such that the top surface of the SiGe layer 2017 is level with the uppermost surface 2018 of the protective upper most adjacent layer.

Figure 20L:
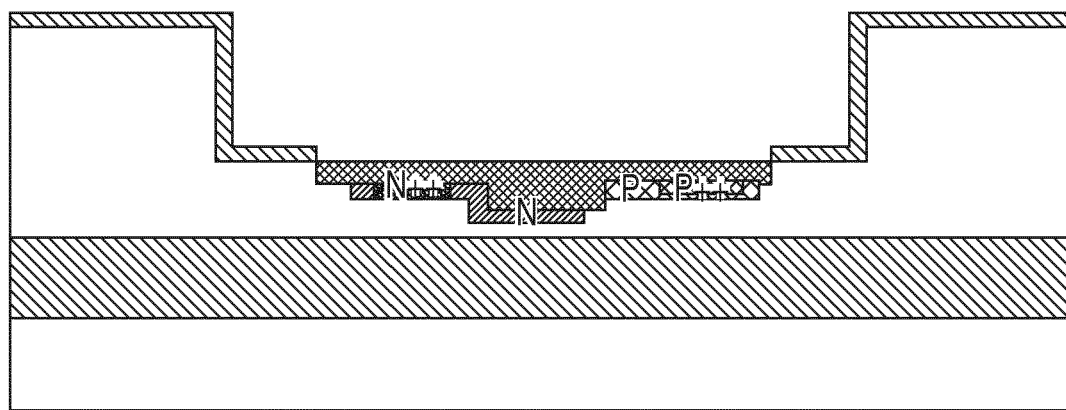

FIG. 20*l* shows the cross section of the SOI platform after the SiGe layer 2016 has been etched back. The SiGe layer has been etched back such that the SiGe fills the second cavity (see FIG. 20*d*).

FIG. 20*m* shows two alternatives labelled (1) and (2). The upper part of FIG. 20*m* shows a first hard mask 2019 that extends across a lateral portion of the SiGe layer. The lateral portion of the SiGe that is covered by the hard mask 2019 corresponds to the full width of the first channel. The SiGe layer that remained exposed has been etched away, leaving a SiGe waveguide region 2020 with a rectangular cross sectional shape.

Alternatively, as shown in the lower part of FIG. 20*m*, a second hard mask 2021 may be formed on top of the SiGe waveguide region, but not extend across the full width of the first cavity. In this alternative, when etched, the SiGe waveguide region 2020*b* has an inverted-'T' shaped cross sectional shape.

FIG. 20*n* shows two alternatives, corresponding to the next steps for the two alternatives shown in FIG. 20*m*. In each alternative, a first protective layer 2022 of SiO$_2$ (silicon dioxide) has been formed. In both cases, the first protective layer 2022 covers the uppermost surface of the device.

FIG. 20*o* shows two alternatives, corresponding to the two alternatives shown in FIGS. 20*m* and 20*n*.

In the upper part of FIG. 20*o*, the first alternative is shown. In this FIG, the cross section of the SOI platform after the application of the PR mask 2023 is shown. The PR mask 2023 exposes a region of the waveguide region 2020. A dopant implantation step 2023*b* is then performed with a tilt angle of 45 degree. The dopant species in the dopant implantation step is the same as the dopant species in the third and fourth dopant implantation steps. The dopant implantation step thereby forms an upper doped region 2024. Thus a doped region overlying the SiGe waveguide is formed, and a contiguous doped region is formed between the upper doped region 2024 and the upper lateral doped region 2013. The dopant implantation step dopant species is p-type. The dopant implantation step includes implanting dopant ions through the first protective layer into an upper region of the waveguide region 2020.

In the lower part of FIG. 20*o*, the second alternative is shown. In this FIG, the cross section of the SOI platform after the application of a PR mask 2023 is shown. The PR mask 2023 exposes a region of the waveguide region 2020. A dopant implantation step is then performed with a tilt angle of 45 degree. The dopant species in the dopant implantation step is the same as the dopant species in the third and fourth dopant implantation steps. The dopant implantation step thereby forms an upper doped region 2024. Thus a doped region overlying the SiGe waveguide is formed, and a contiguous doped region is formed between the upper doped region 2024 and the upper lateral doped region 2013. The dopant implantation step dopant species is p-type. The dopant implantation step includes implanting dopant ions through the first protective layer into an upper region of the waveguide region 2020.

In both alternatives shown in FIG. 20*o*, the dopant is implanted into an upper region of the material of the SiGe waveguide region (i.e. the SiGe itself) and RTA, for example at 630° C. for 10 seconds.

FIG. 20*p* shows two alternatives, corresponding to the two alternatives shown in FIGS. 20*m*, 20*n* and 20*o*. In each alternative, a second protective layer 2026 of SiO$_2$ (silicon dioxide) has been formed. In both cases, the second protective layer 2026 covers the uppermost surface of the device. The second protective layer 2026 has a greater thickness than the first protective layer (see FIG. 20*n*).

FIGS. 21*a* to 21*g* illustrate steps of a method according to the second set of embodiments of the present invention.

Figure 21A:
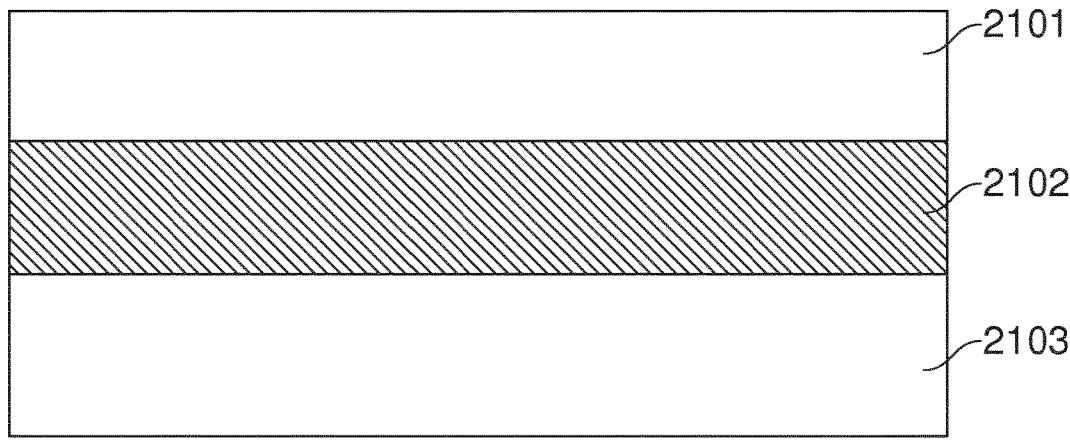
FIGS. 21a-21g illustrate steps of a further method for forming an optoelectronic component. This embodiment is suitable for forming an optoelectronic component on a 3 um SOI platform.

FIG. 21*a* shows a cross section of an SOI platform suitable for use in the method according to the second aspect. An upper silicon layer 2101 is shown overlying a buried oxide (BOX) layer 2102. The BOX layer 2102 overlies a lower silicon layer 2103. The upper silicon layer 2101 has an initial thickness of 3 um.

Figure 21B:
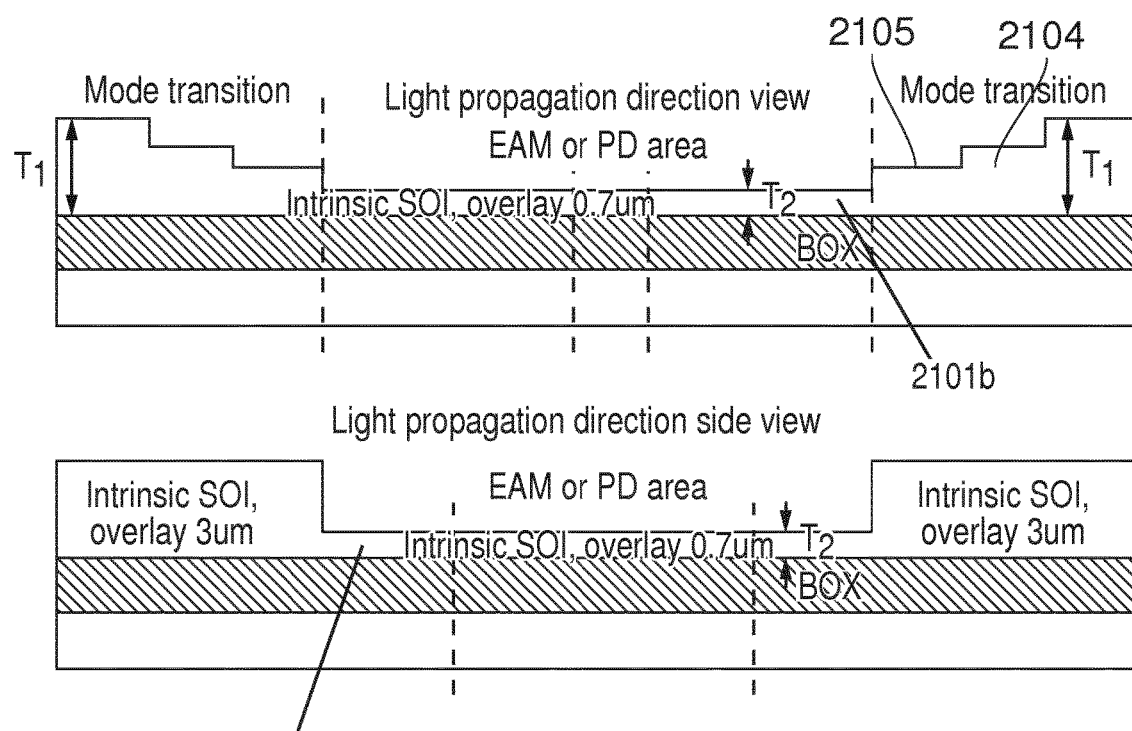

The upper part of FIG. 21*b* shows a cross section view along the length of an embodiment of the present invention. In this view, the light will either pass from left to right or right to left. The view generally illustrates a first mode transition zone 2104 and a second mode transition zone 2105. Between the left and right first and second mode transition zones 2104, 2105 there is an elongate waveguide region 2101b. It is in this elongate waveguide region 2101b that an optoelectronic device according to embodiments of the present invention will be located. The thickness $T_2$ of the intrinsic overlay (in this case Si) could take a value of 0.8 μm, or 0.7 μm.

The maximum thickness $T_1$ of the upper silicon layer 2101 is 3 um. The thickness $T_2$ of the upper silicon layer 2101 in the waveguide region 2101b is 0.2-1 um. Between these two thicknesses, it will be noted that the upper silicon region 2101 is stepped.

The lower part of FIG. 21b shows a cross sectional view of waveguide region 2101b through the SOI platform that is perpendicular to the direction of light travel.

Figure 21C:
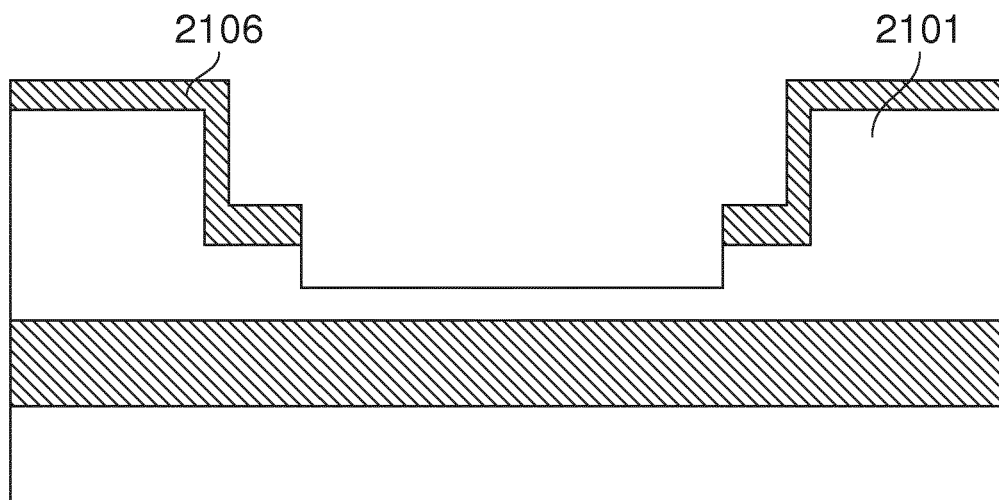

FIG. 21c shows a cross section of an SOI platform after a first hard mask 2106 has been applied. An opening formed in the hard mask 2106 exposes the upper silicon layer 2101. In the exposed region, the upper silicon layer 2101 has been partially etched to form a first cavity. The first cavity does not extend completely through the upper silicon layer 2101.

Figure 21D:
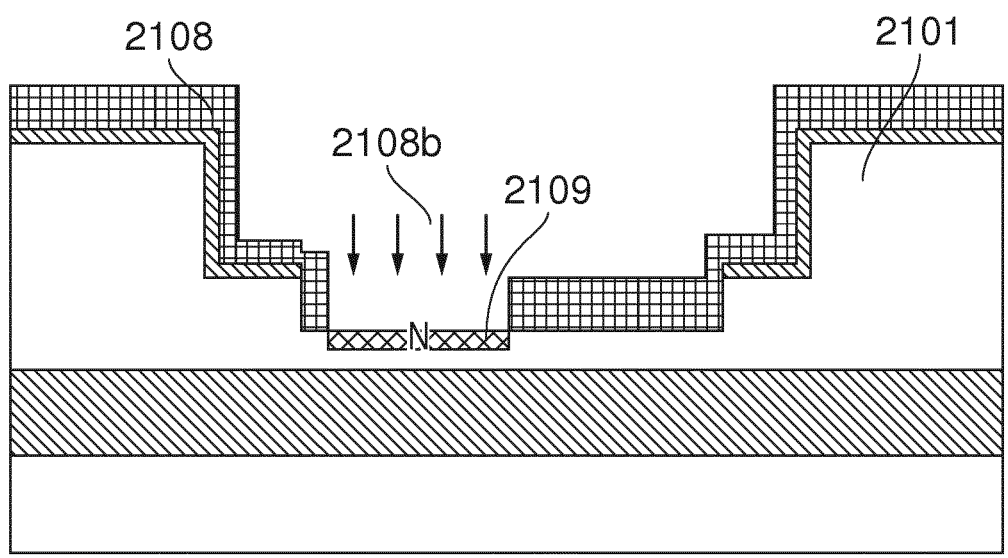

FIG. 21d shows the cross section of the SOI platform after the application of photo-resist (PR) mask 2108. Subsequent to the application of the PR mask 2108, ions 2108b are implanted into a lower doped region 2109 in a first dopant implantation step. The first dopant implantation step dopant species is n-type. The lower doped region 2109 resulting from the first dopant implantation step is generally flat.

Figure 21E:
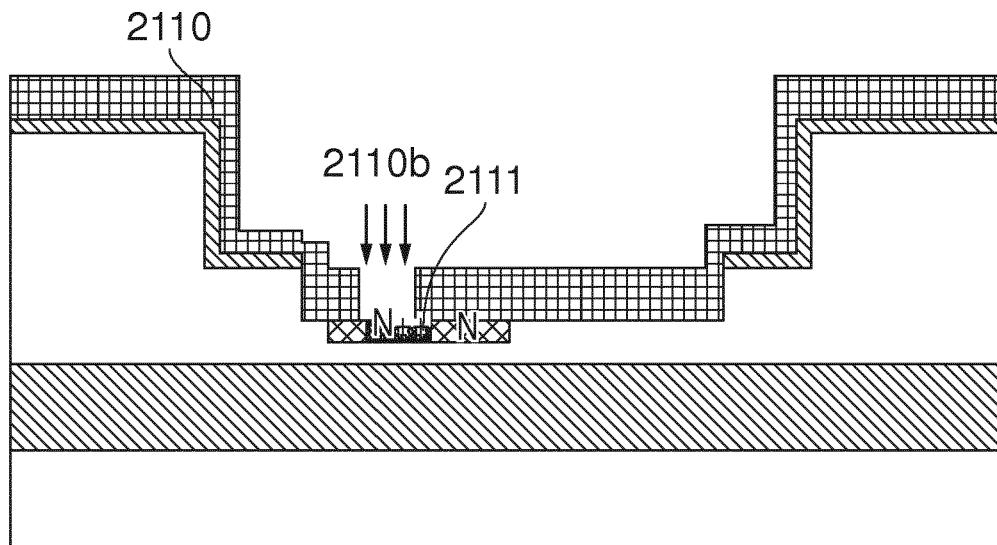

FIG. 21e shows the cross section of the SOI platform after the application of PR mask 2110. The PR mask 2110 exposes a region of the lower doped region 2109. A second dopant implantation step 2110b is then performed. The dopant species in the second dopant implantation step is the same as the dopant species in the first dopant implantation step. The second implantation step thereby forms a lower super-doped region 2111. The second dopant implantation step dopant species is n-type.

Figure 21F:
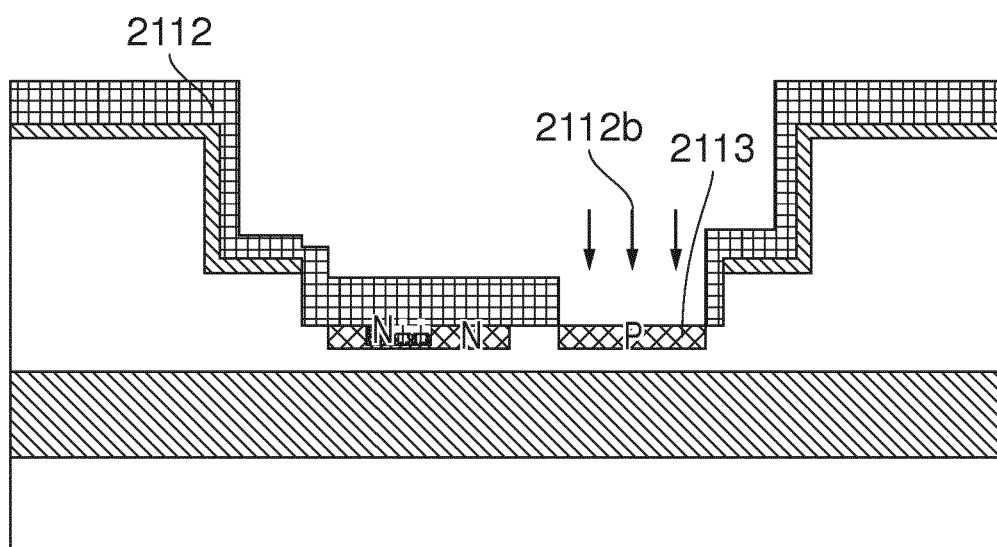

FIG. 21f shows the cross section of the SOI platform after the application of PR mask 2112. Subsequent to the application of the PR mask 2112, ions 2112b are implanted into an upper lateral doped region 2113 in a third dopant implantation step. The third dopant implantation step dopant species is p-type.

Figure 21G:
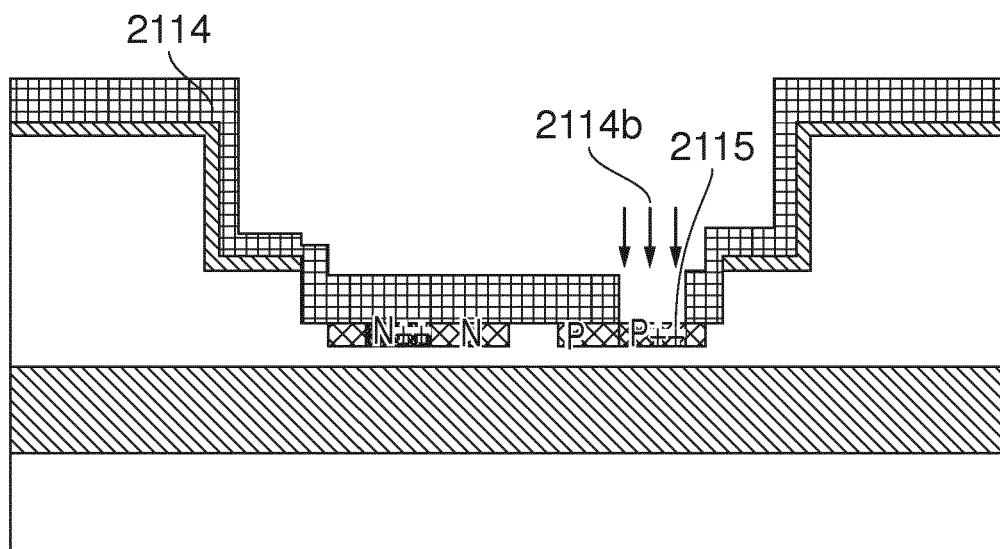

FIG. 21g shows the cross section of the SOI platform after the application of PR mask 2114. The PR mask 2114 exposes a region of the upper lateral doped region 2113. A fourth dopant implantation step is then performed. The dopant species in the fourth dopant implantation step is the same as the dopant species in the third dopant implantation step. The fourth dopant implantation step thereby forms an upper super-doped region 2115. The fourth dopant implantation step dopant species is p-type. The remainder of the manufacturing process is as in previous examples.

Figure 22:
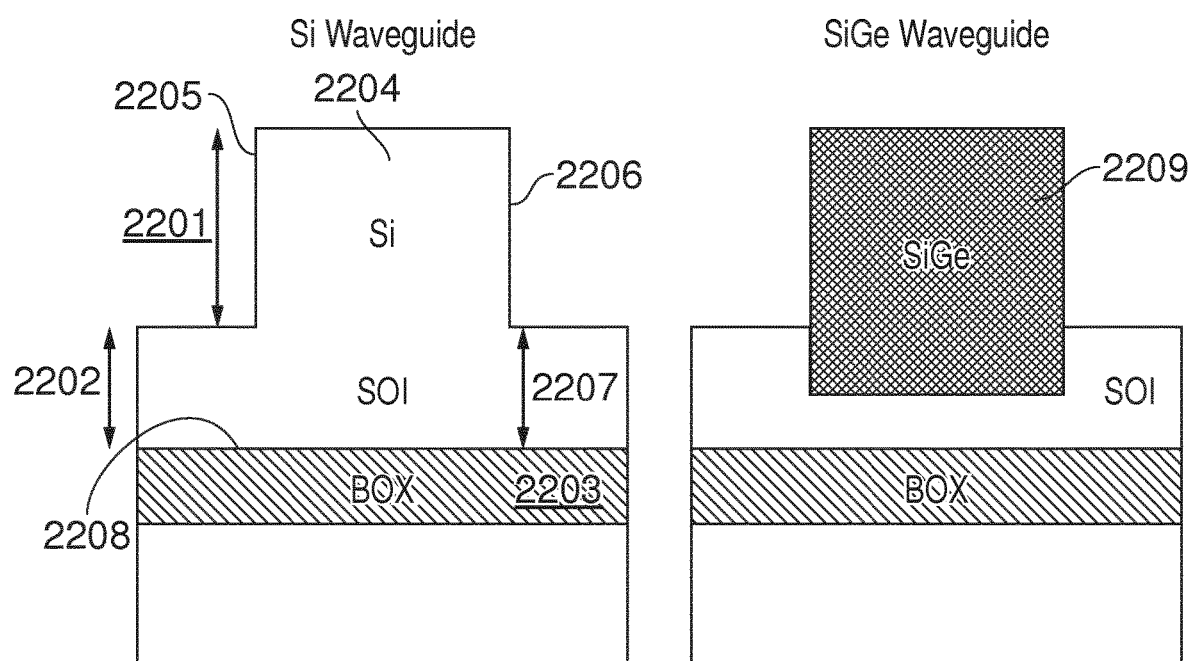
FIG. 22 shows an example Si waveguide cross-section (for example, an input or output waveguide) and a SiGe waveguide cross-section (for example, the waveguide of optoelectronic component according to the first aspect of embodiments of the invention) at the point at which the Si waveguide and SiGe waveguide may contact.

FIG. 22 illustrates two alternative cross sections through input and/or output waveguides (see FIG. 1).

In the left hand example, the waveguide is formed by the upward extension 2201 of the Si from the wide base 2202. Although the example is described in relation to Si waveguides, it should be understood that the geometry could equally be applied to other suitable waveguide materials. The region in which the light is contained is defined by effective changes in refractive index. In this left hand example, changes in refractive index occur at the upper surface 2204 of the upward extension 2201, and the left 2205 and right 2206 surfaces of the upward extension. Effective changes in refractive index also occur because of the relatively small thickness 2207 of the base 2202 relative to the height of the extension 2201. There is also a change in refractive index at the interface 2208 between the base 2202 and the buried oxide layer 2203.

In the right hand example, the waveguide is formed of SiGe 2209. The changes in refractive index that contain the light occur at the edges of the SiGe region. These changes in refractive index may occur at a SiGe-air or SiGe—Si boundary (or indeed a SiGe—SiO$_2$ boundary). Again, this example shows a waveguide formed from SiGe. It is envisaged that other suitable optical materials could be used to form a waveguide of the same geometry.

A further embodiment of an optoelectronic device such as an electro absorption modulator (EAM) or a photodiode is described below in relation to FIG. 23 and FIG. 24a-n. In the embodiment shown in FIGS. 23 and 24a-n, it is the lower doped region which exhibits a multilayer structure. The multilayer structure comprises a first doped zone (i.e. a first layer) 2304 formed from an implanted doped portion of the SOI located directly below the OAR. A second doped zone (i.e. a second layer) is formed by implanting dopants into the OAR itself at a region of the OAR located directly above the first doped zone. The second doped zone 2307 has a dopant concentration greater than that of the first doped zone. The lower surface of the second doped zone forms the interface between the first doped zone 2304 and second doped zone 2307. The upper surface of the second doped zone forms the contact surface for the corresponding electrode 2312.

Figure 23:
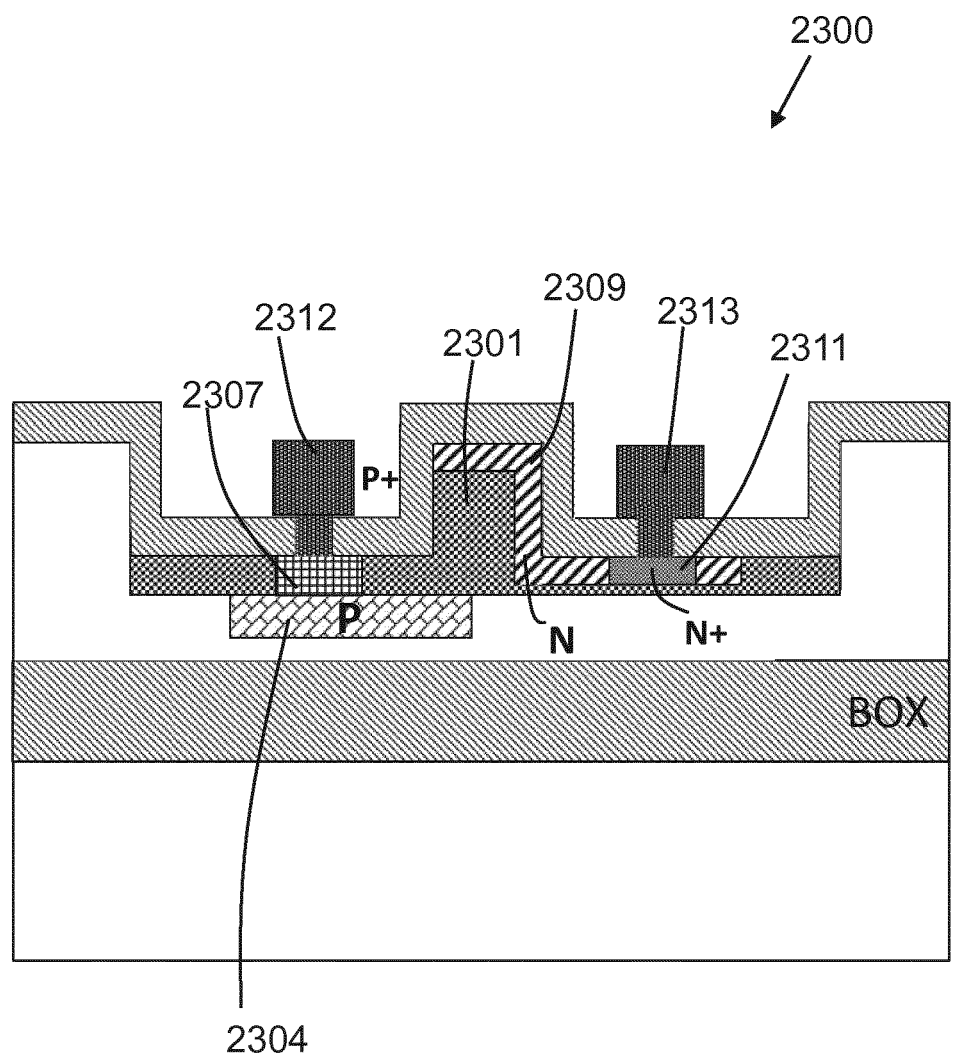
FIG. 23 shows a cross-sectional view taken through line B-B' shown in FIG. 1 of a further embodiment of an optoelectronic device.
Figure 24A:
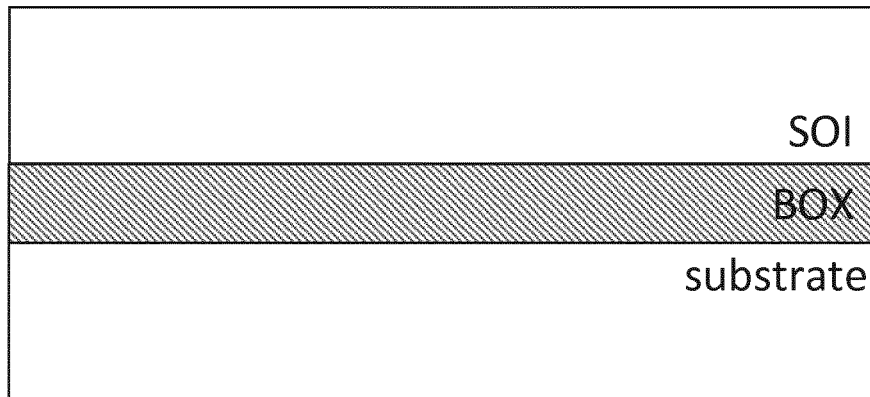
FIG. 24a-n shows a method suitable for fabricating the optoelectronic device of FIG. 23.
Figure 24B:
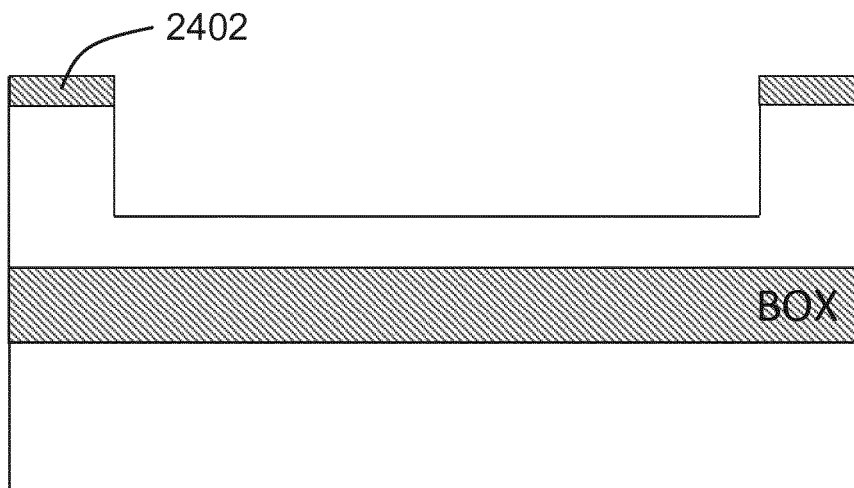
Figure 24C:
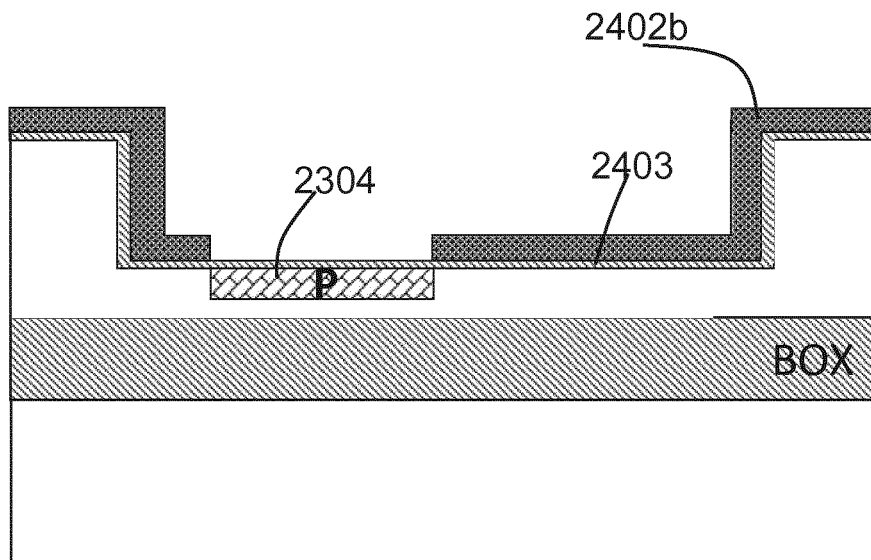
Figure 24D:
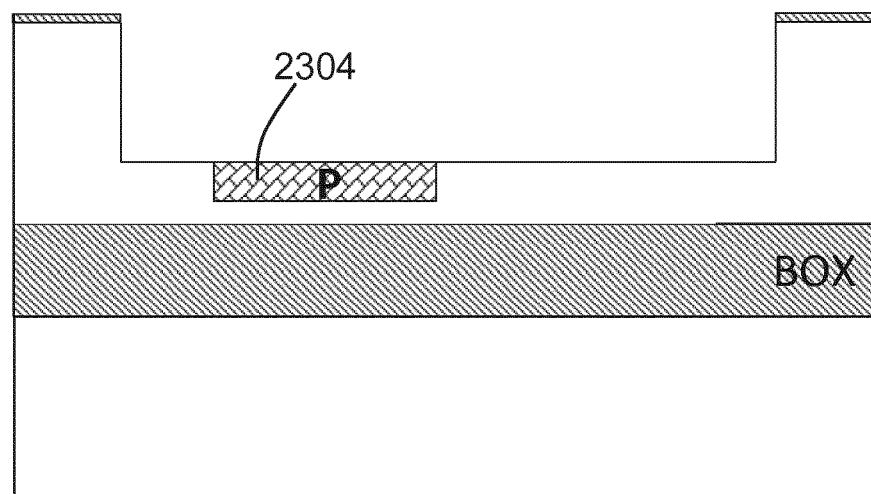
Figure 24E:
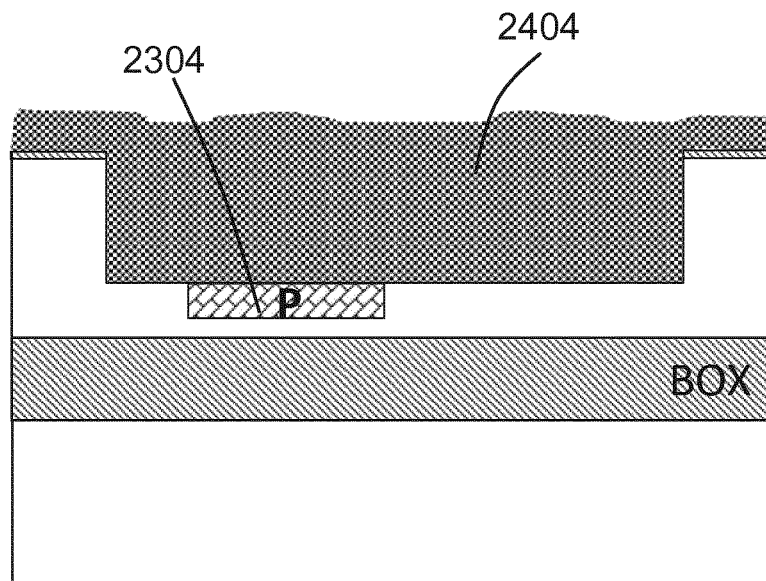
Figure 24F:
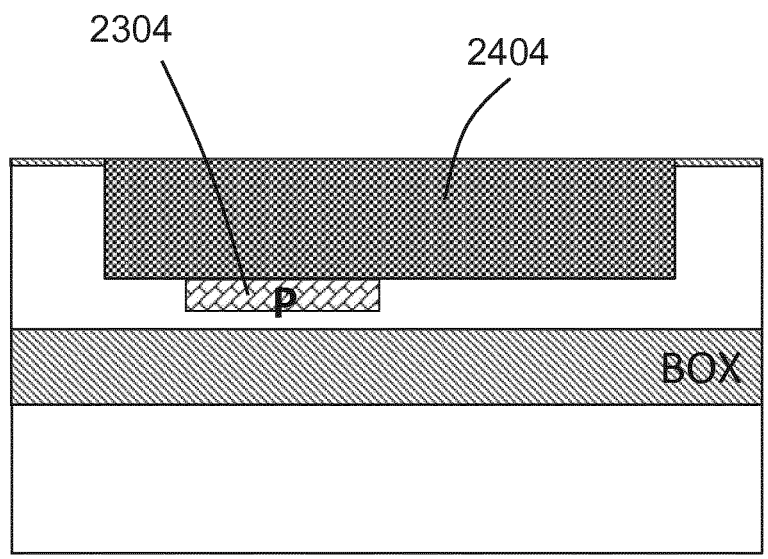
Figure 24G:
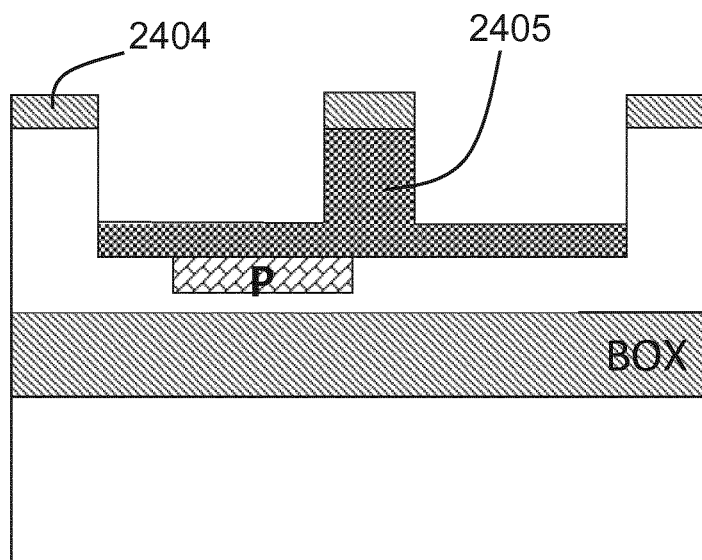
Figure 24H:
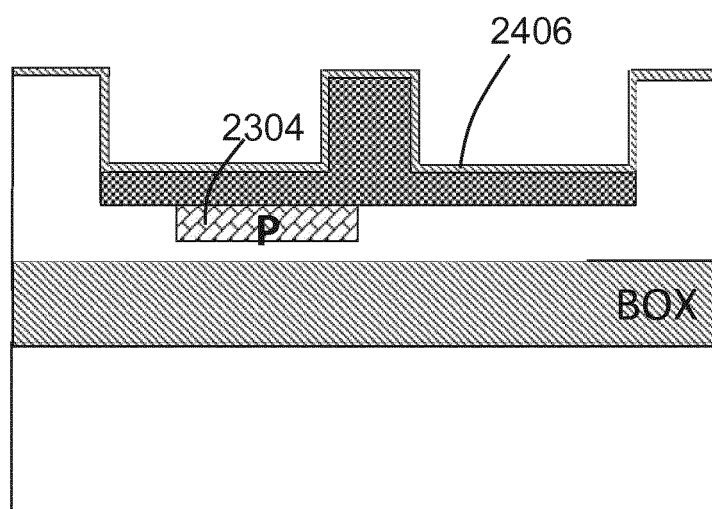
Figure 24I:
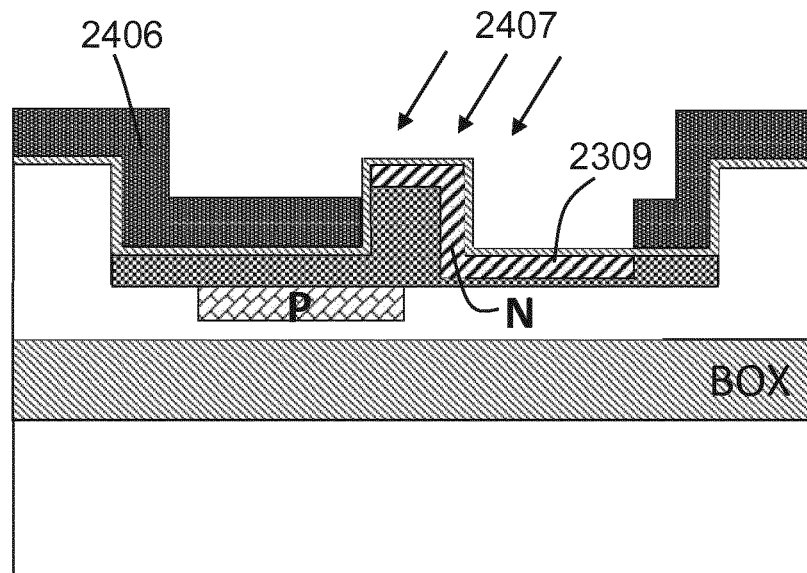
Figure 24J:
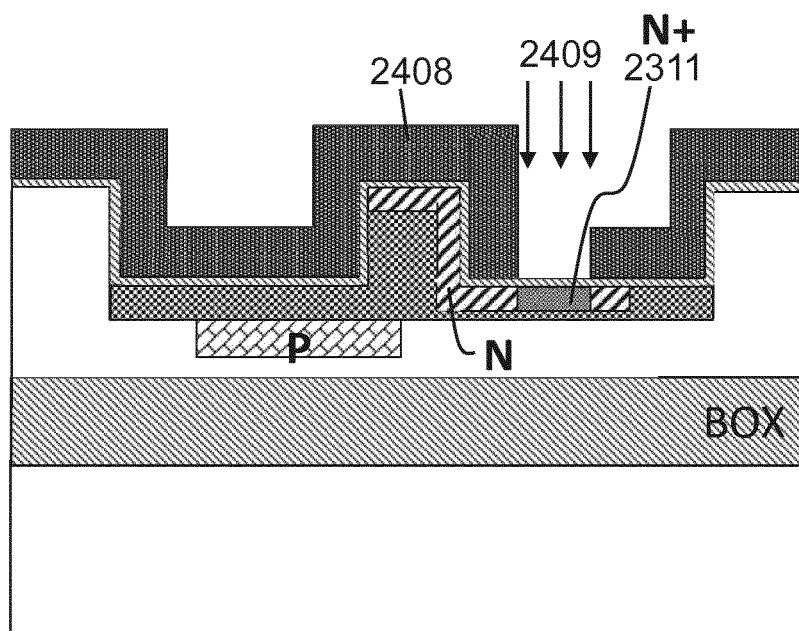
Figure 24K:
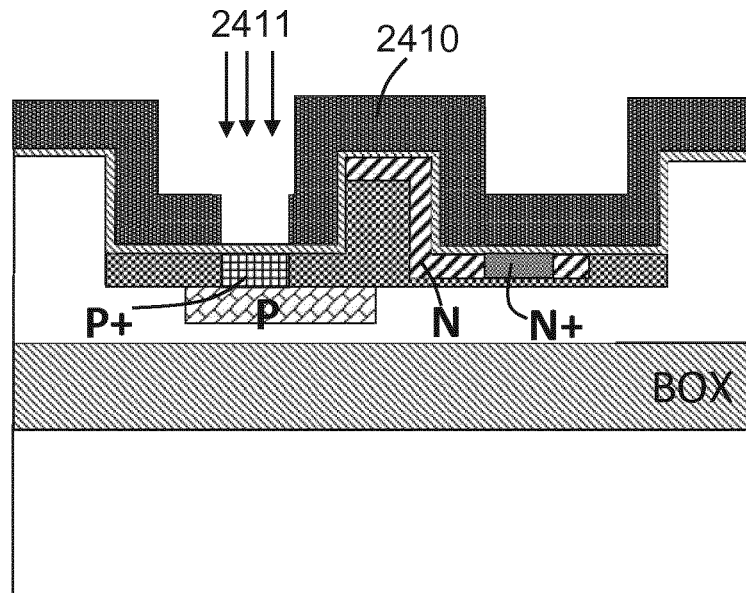
Figure 24L:
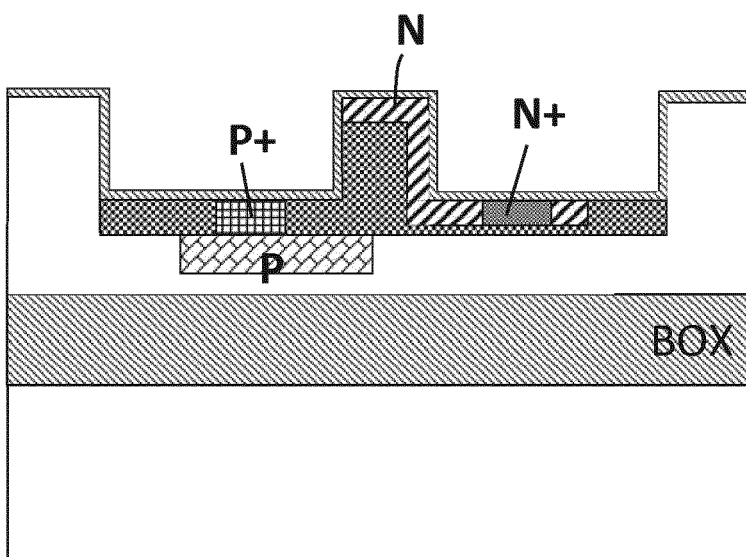
Figure 24M:
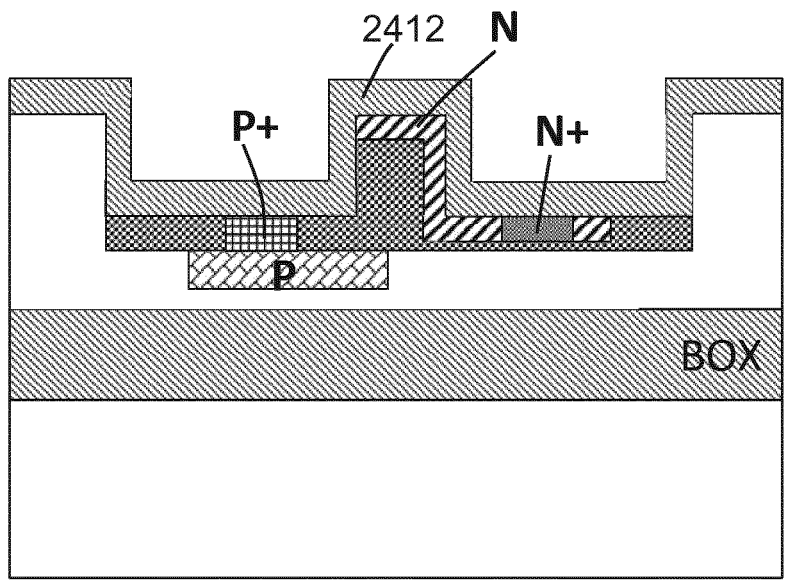
Figure 24N:
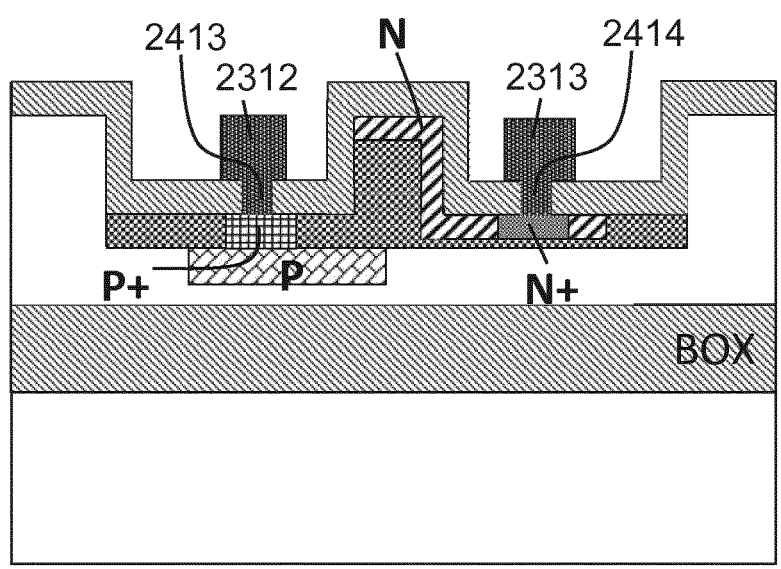

In the embodiment described in FIGS. 23 and 24a-n, the first doped zone of the lower doped region is p doped, and the second doped zone of the lower doped region is p+ doped (where p+ denotes a p doped region with a greater concentration of p dopants). The upper doped region contains an upper doped region in the form of an n doped region 2309 which comprises: an upper n doped waveguide region extending across the upper surface of the OAR waveguide; a lateral n doped region which extends outwards away from the waveguide; and a connecting n doped region which extends vertically along a side of the waveguide to connect the upper n doped waveguide region with the upper lateral n doped region. The connecting n doped region, the upper lateral n doped region and the upper n doped waveguide region form a single contiguous n doped region. The OAR comprises the waveguide ridge and slab regions at either side of the waveguide so that the OAR has an inverted T-shape cross section (the cross section taken transverse to the longitudinal axis of the waveguide). The p+, n and n+ doped regions are all located within the OAR material, whilst the n region extends along the top and the side of the waveguide ridge as well as the slab, the n+ and p+ regions are only found within the slab sections of the OAR, either side of the waveguide ridge.

An upper super-doped region is formed in the upper lateral n doped region. The upper super-doped region is also n doped. However, the dopant concentration in the upper super-doped region is higher than the dopant concentration in the upper lateral n doped region (denoted as an n+ region).

In other embodiments (not shown) the p and n doped regions are reversed so that the lower doped region contains an n doped zone and n+ doped zone and so that the upper doped region is p doped and p+ doped.

The fabrication of the optoelectronic device of FIG. 23 is described below in relation to the steps depicted in FIGS. 24a-n.

As shown in FIG. 24a, a silicon-on-insulator (SOI) waveguide platform is provided; the platform comprising: an underlying substrate, in this case a silicon substrate, an insulator (BOX) layer, and an intrinsic SOI overlay. In the example, the SOI overlay may have a height (i.e. a thickness) of 0.8 µm.

Next, as shown in FIG. 24b, a hard mask of 0.5 um SiO$_2$ 2402 is applied to the top surface of the SOI and the unmasked region(s) etched to form a cavity whose depth is 0.7 um. The cavity is designed to receive a piece of an alternative optical material such a SiGe which will form the optically active region of the optoelectronic component (e.g. a modulation region of a modulator). However, before the cavity is filled, the first zone of the lower doped region, in this case the p doped region, is formed within the SOI layer.

As shown in FIGS. 24c and d, the p doped region can be formed by application of a photoresist 2403 to form a mask and subsequent implantation of the dopant via ion implantation (e.g. boron) in the unmasked region. A protection layer of 20 nm-50 nm SiO$_2$ will be formed before application of the photoresist. Once the photoresist has been removed, an annealing process is carried out to activate the dopant. An example of suitable annealing parameters are 1050° C.-1100° C. for 10 seconds.

Once annealing has taken place, the SiO$_2$ protection layer is also removed.

As shown in FIGS. 24e and f, the cavity can then be filled by growing the epi layer 2404 (formed, for example from SiGe or Ge) using standard procedures known in the art. Chemical mechanical planarization (CMP) is used to create a flat upper surface.

A waveguide ridge is etched into the epi layer (FIG. 24g) using a hard mask, before a protective layer of SiO$_2$ is applied (FIG. 24h). The waveguide ridge may have a width of 1.5 um and a depth of 0.4 um. The protective layer may have a thickness of 20 nm-50 nm.

Using a photoresist applied on top of the protective layer to mask off all but the desired area, ion implantation is carried out to create the upper doped region (in this case the n doped region). In the embodiment shown in FIGS. 24i and j, the connecting n doped region, the upper lateral n doped region and the upper n doped waveguide region are formed in a single implantation step.

Also in the embodiment shown in FIG. 24i, an implantation angle of 45 degrees is chosen for the implantation 2407 of dopants. In this way, the doping of the top surface and the sidewall of the ridge waveguide can be carried out in a single step.

Once the first zone 2309 of the upper doped region has been implanted to create an n doped region 2309, a further photoresist layer 2408 is applied, the further photoresist leaving a subsection of the n doped region exposed. This subsection is then implanted with further ions (e.g. phosphorus) in a further ion implantation step to create the second zone of the upper doped region; an n+ doped region within the slab of the OAR. This implantation step may be carried out vertically as shown in FIG. 24j.

Next, a further photoresist 2410 is applied and ion implantation 2411 carried out to form a p+ doped region in the slab of the OAR (SiGe, in this example), at the opposite side of the waveguide from the n+ doped region. The p+ doped region is located directly above the p doped region and extends the entire way through the height of the slab forming a p/p+ interface with the p doped SOI at its lower surface and a contact surface for contact with the electrode 2312 at its upper surface.

An annealing step is then carried out (FIG. 24l) to activate the dopants. Suitable annealing parameters may be at 630° C. for 10 seconds.

As shown in FIG. 24m, a passivation step is carried out by depositing a cladding layer of 0.5 µm SiO$_2$ onto the top surface of the waveguide platform.

Open vias are created using standard techniques (e.g. etching) and a metallization step carried out to create electrodes either side of the waveguide ridge. In the embodiment shown, the electrodes are positioned equidistant from the respective side walls of the waveguide ridge. The electrodes may be formed from aluminium with a thickness of 1 um.

In some embodiments, the p doped region extends at least half way along the width of the OAR so that it is positioned underneath at least half of the waveguide ridge. The extent to which the p doped region extends along the OAR depends upon the diffusion length of the p dopant as well as other factors such as alignment tolerance. In one example embodiment, the waveguide ridge has a width of 1.5 µm and the p doped region extends underneath 0.9 µm of this width.

Figure 25:
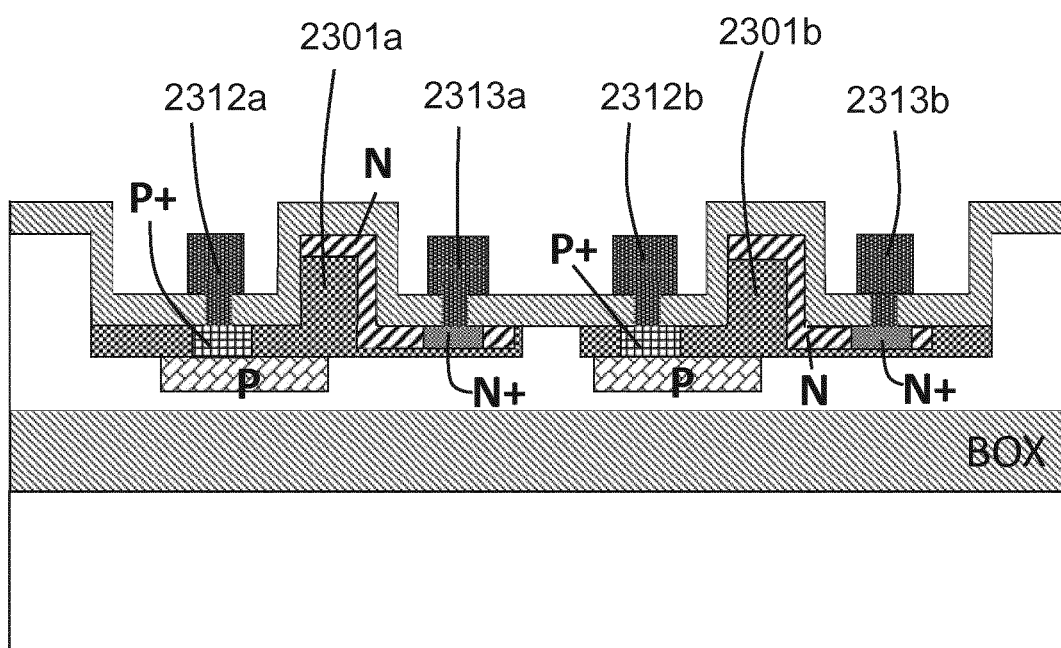
FIG. 25 shows a Mach-Zehnder modulator incorporating optoelectronic devices according to embodiments of the present invention. The Mach-Zehnder modulator may be operated as a differential drive.

FIG. 25 shows a cross section of a Mach-Zehnder modulator incorporating optoelectronic devices as described above in relation to FIGS. 23 and 24a-n. The Mach-Zehnder is formed from a waveguide coupler which splits an incoming waveguide into two waveguide arms 2301a, 2301b, each arm containing an optoelectronic device as shown in FIG. 25. A further waveguide coupler then couples the two arms back together. Application of a bias via the electrodes to the PIN junctions of the optoelectronic devices can be used to control the phase of light in the respective arms. By controlling the relative phase, it is possible to control the interference of light when the two arms recombine and therefore the modulation of light outputted.

In the embodiment shown in FIG. 25, each arm contains an optoelectronic device (in this case an electro absorption modulator, EAM) which is separate from the optoelectronic device (in this case the EAM) of the other arm. Each EAM has its own PIN junctions, which are separate from one another. The doped regions are arranged such that the central region between the two arms of the Mach-Zehnder modulator contains the p doped (and p+ doped) region of one arm and the n doped (and n+ doped) region of the other arm. Each waveguide arm also has its own positive electrode 2312a, 2312b (contacting the p+ doped region) and negative electrode 2313a, 2313b (contacting the n+ doped region).

The Mach-Zehnder modulator of FIG. 25 may therefore be operated as a differential drive. Alternatively, if an external connection to connect the two n electrodes or the two p electrodes is made, this would enable the Mach-Zehnder modulator to be operated as a push-pull drive.

Figure 26:
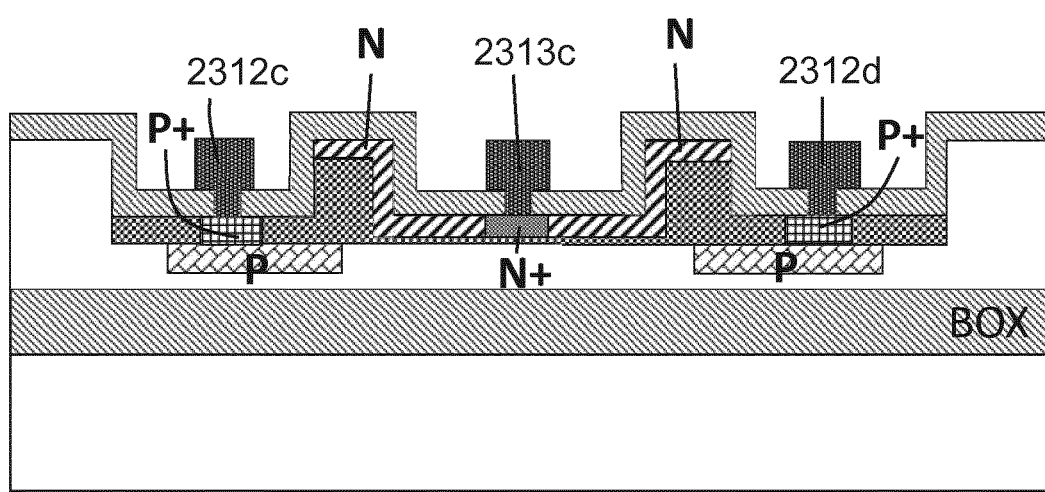
FIG. 26 shows a Mach-Zehnder modulator incorporating optoelectronic devices according to embodiments of the present invention. The Mach-Zehnder modulator may be operated as a push-pull drive.

FIG. 26 shows an alternative Mach-Zehnder modulator incorporating optoelectronic devices such as those described in relation to FIGS. 23 and 24a-n. The Mach-Zehnder modulator shown in FIG. 26 differs from that for FIG. 25 in that the two arms share a common electrode. This means that the Mach-Zehnder modulator is operated as a push-pull drive.

In more detail a single doped portion contains both the upper doped portion of the optoelectronic device of a first arm and also the upper doped portion of the optoelectronic device of the second arm. The single doped portion is formed within a single piece of optically active material (OAM), the single OAM including the OARs of both the first arm and second arm.

The single doped portion comprises a first doped zone which includes doped portions at the top and sidewall of each waveguide as well as a lateral portion extending from one waveguide to the other. The single doped portion also includes a second doped zone with a greater dopant concentration than the first doped zone. In the embodiment shown in FIG. 26, the second dopant zone is located midway between the first waveguide arm and the second waveguide arm. The common electrode is located directly above the second dopant zone.

In the embodiment shown in FIG. 26, the shared upper doped portion is an n doped region, and each arm exhibits its own p doped regions located underneath the OAR of that waveguide. However, it is envisaged that the p and n doped regions could be reversed.

Figure 27:
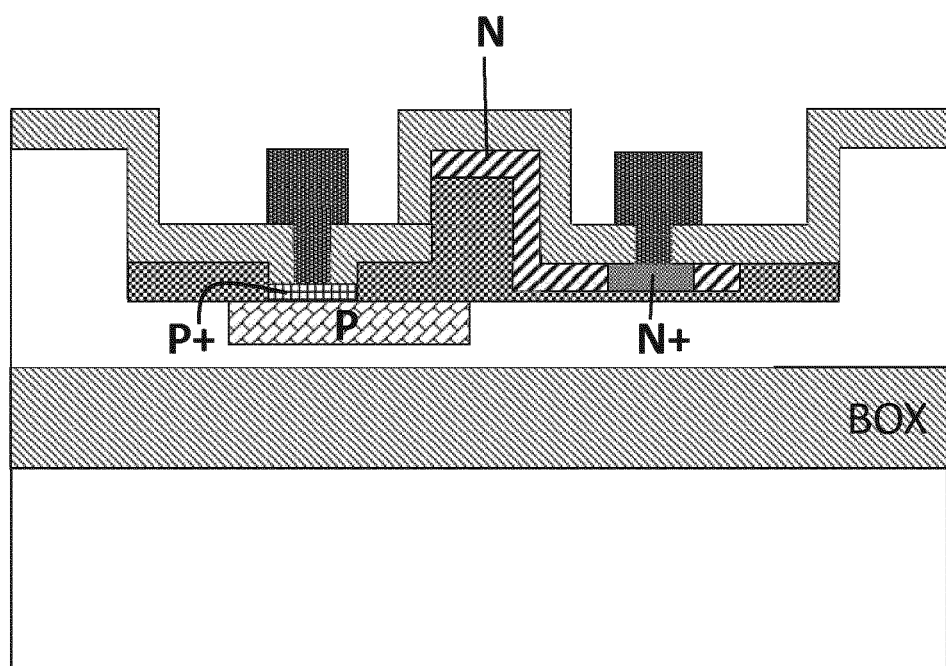
FIG. 27 shows a cross-sectional view taken through line B-B' shown in FIG. 1 of a further embodiment of an optoelectronic device.

A further embodiment of an optoelectronic device such as an EAM or photodiode is described below with reference to FIG. 27 and FIG. 28a-o. This embodiment differs from that of FIG. 23 and FIG. 24a-n in that it the fabrication method includes an extra step of etching a region of the OAR (e.g. SiGe) before that region is implanted to form a p+ doped region. This etching process creates a p+ region of the OAR which has a reduced height as compared to the slab within which it is located.

By etching the slab region of the OAR before p+ doping takes place, it is easier to ensure that the p and p+ doped regions are connected; that is to say that the p+ dopant region (the second zone of the multilayer lower doped portion) reaches through the thickness of the slab from the contact surface at the top surface to the p doped region at the bottom surface. The thickness of the second zone of the multilayer lower doped portion is 0-0.2 um. Where the thickness has a value of 0 um, this should be understood to mean that the p+ dopant region is completely inside of the p region.

Figure 28A:
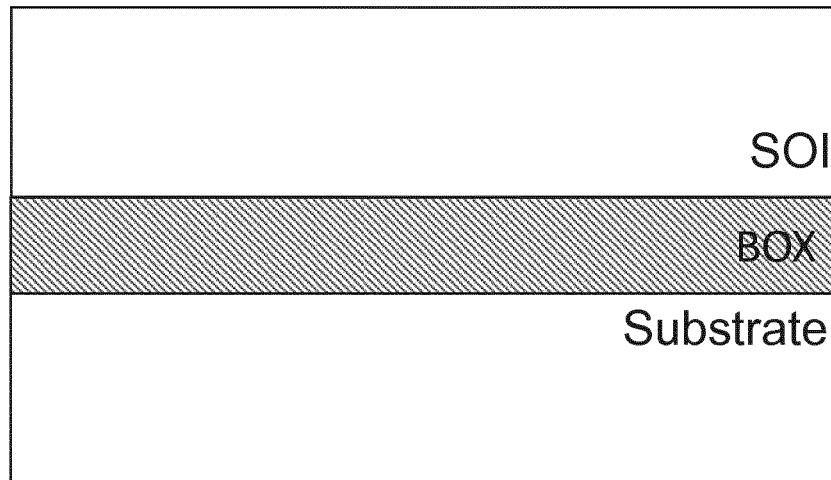
FIG. 28a-o shows method steps suitable for fabricating the optoelectronic device of FIG. 27.
Figure 28B:
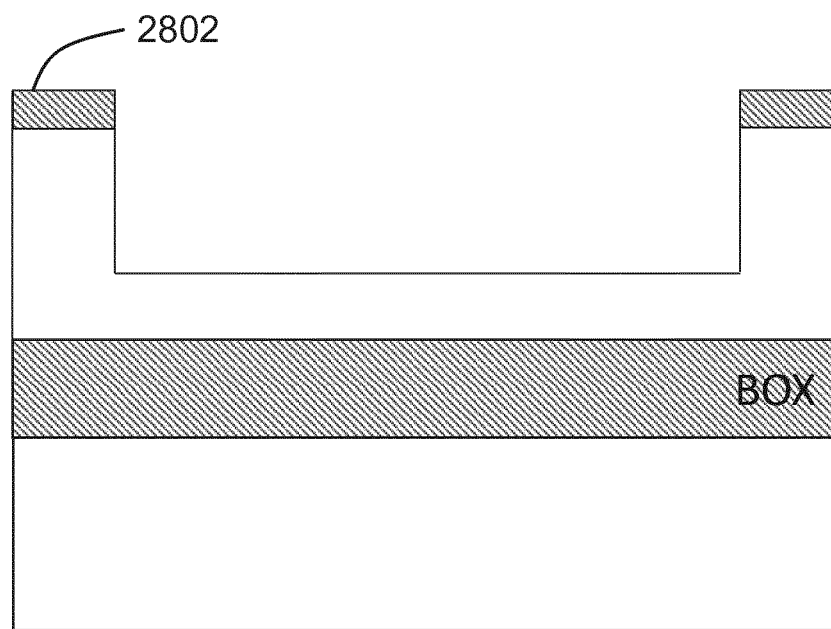
Figure 28C:
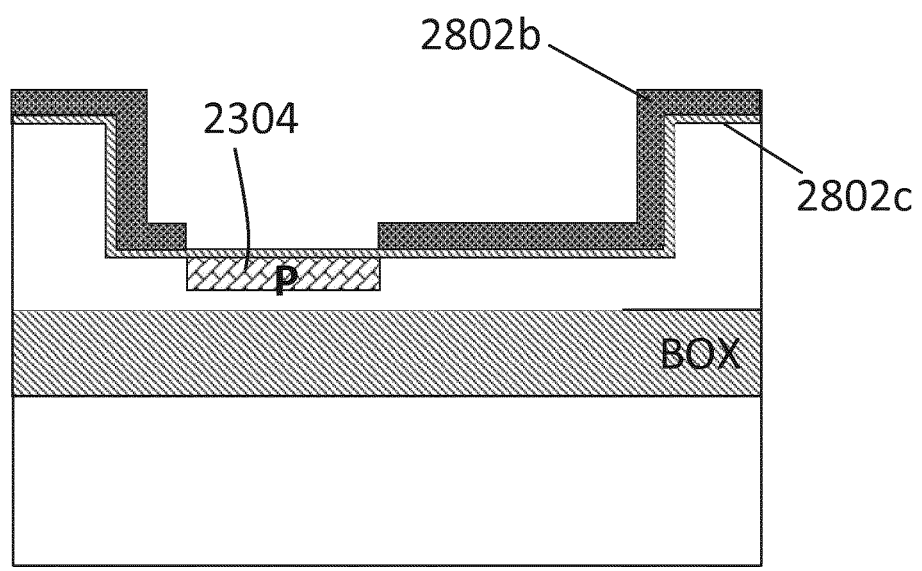
Figure 28D:
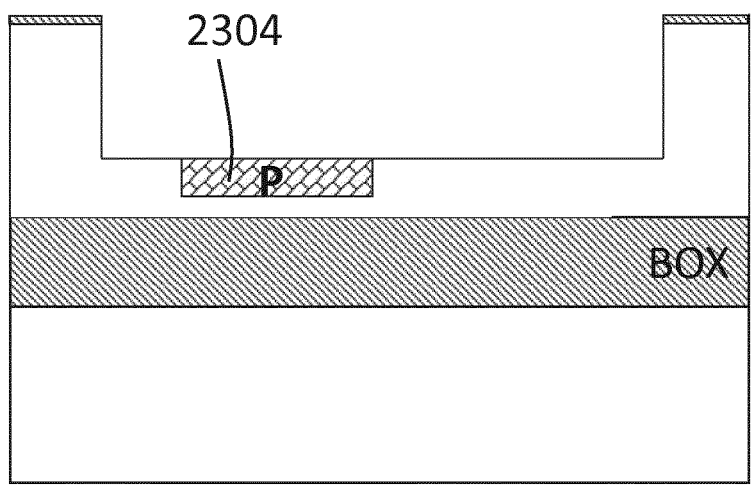
Figure 28E:
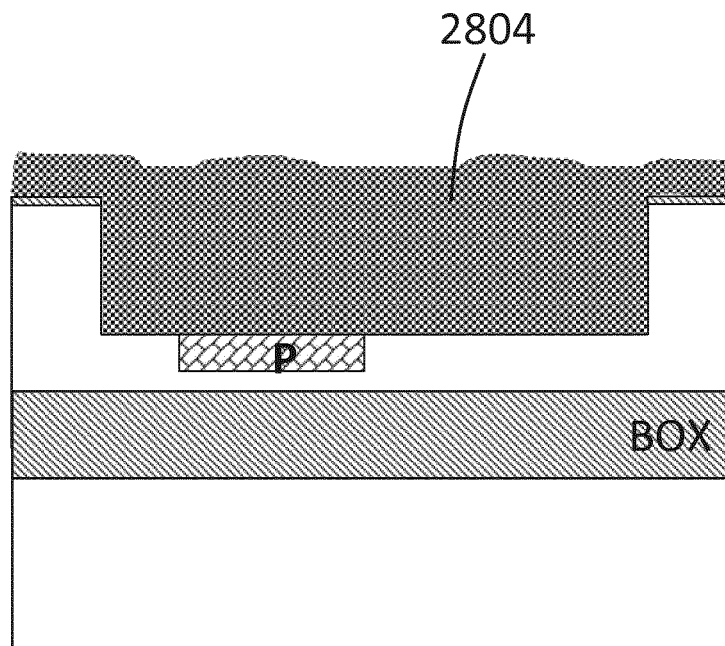
Figure 28F:
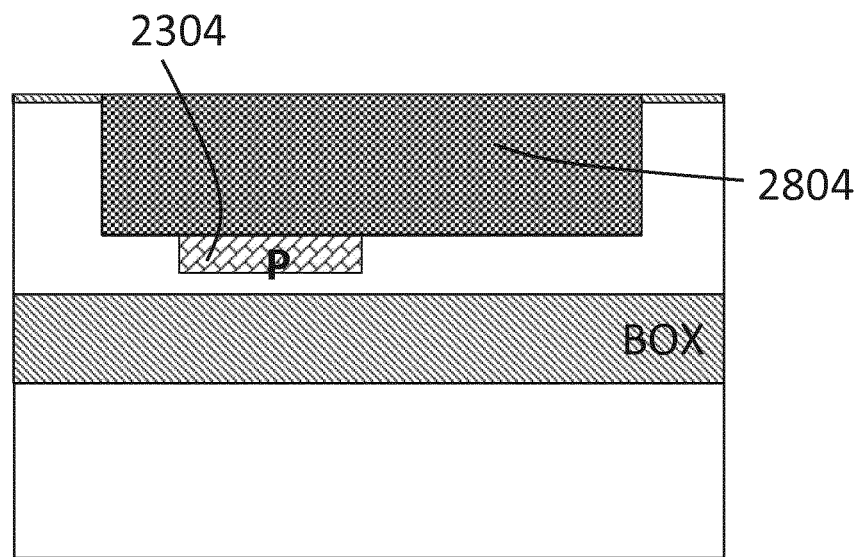
Figure 28G:
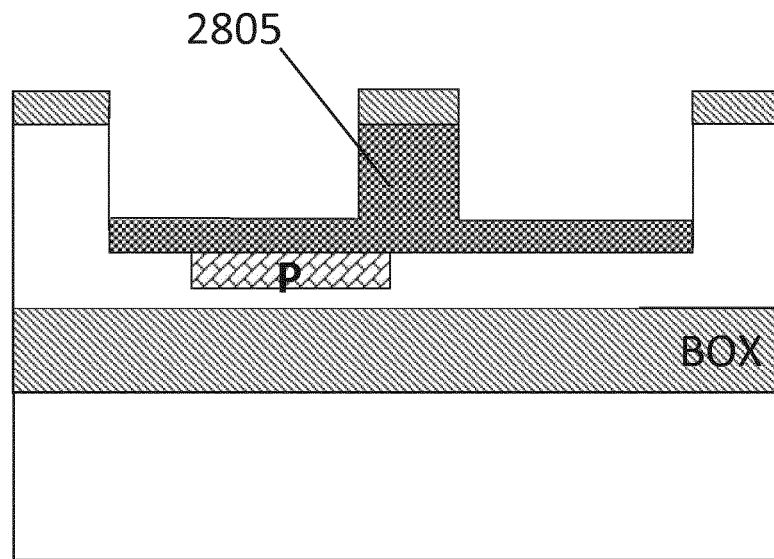
Figure 28H:
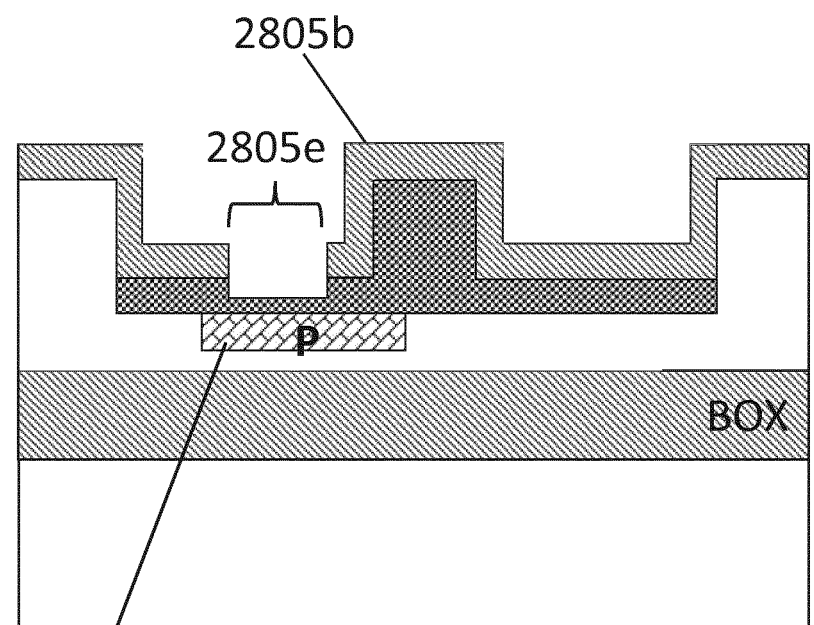
Figure 28I:
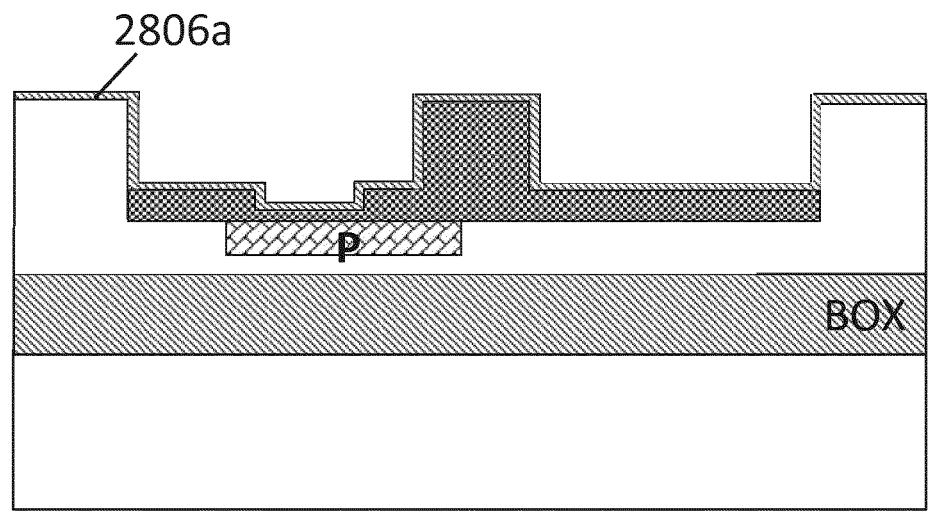
Figure 28J:
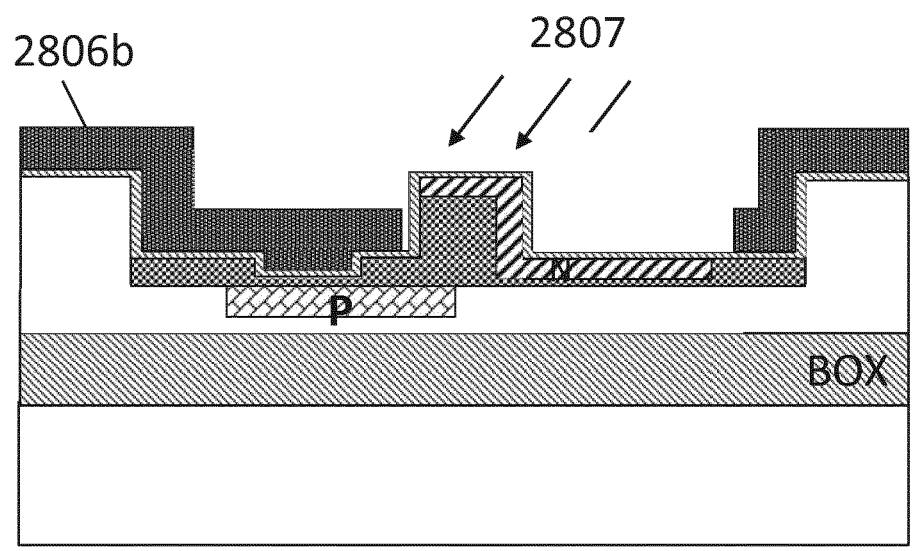
Figure 28K:
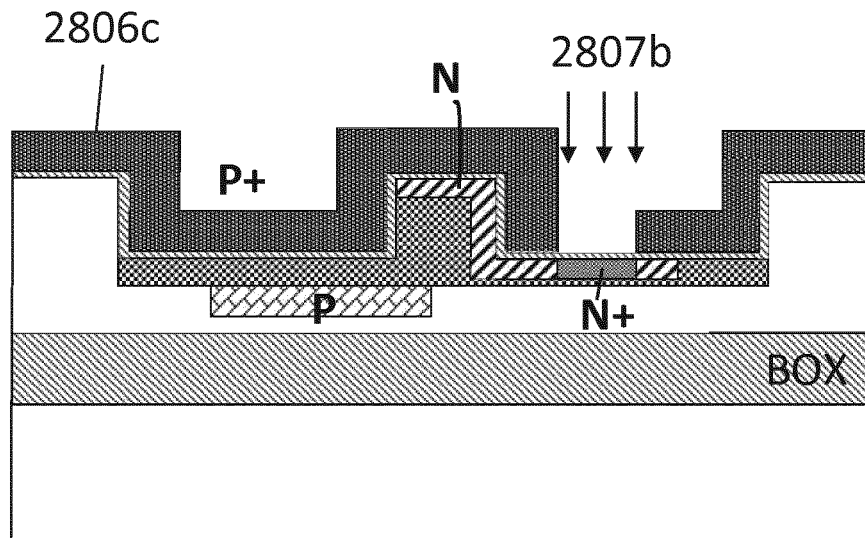
Figure 28L:
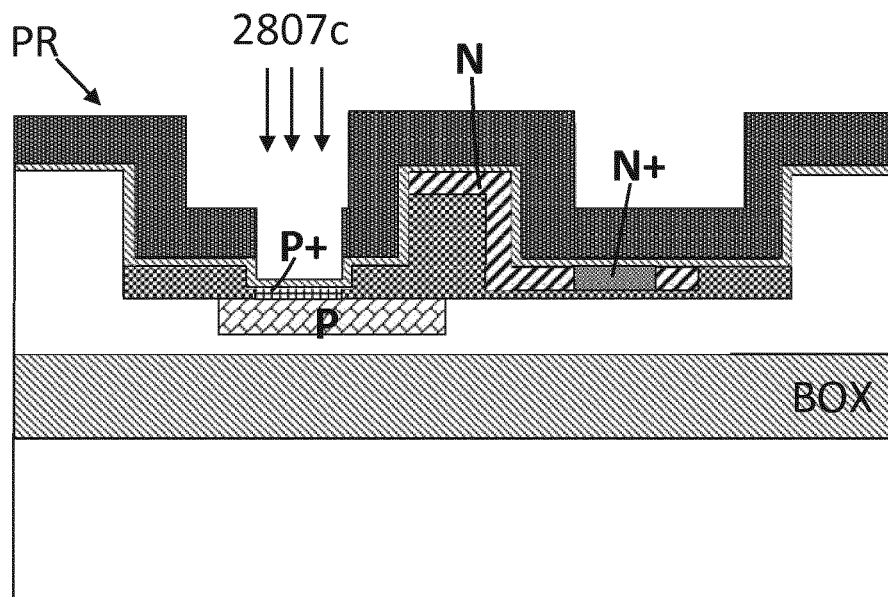
Figure 28M:
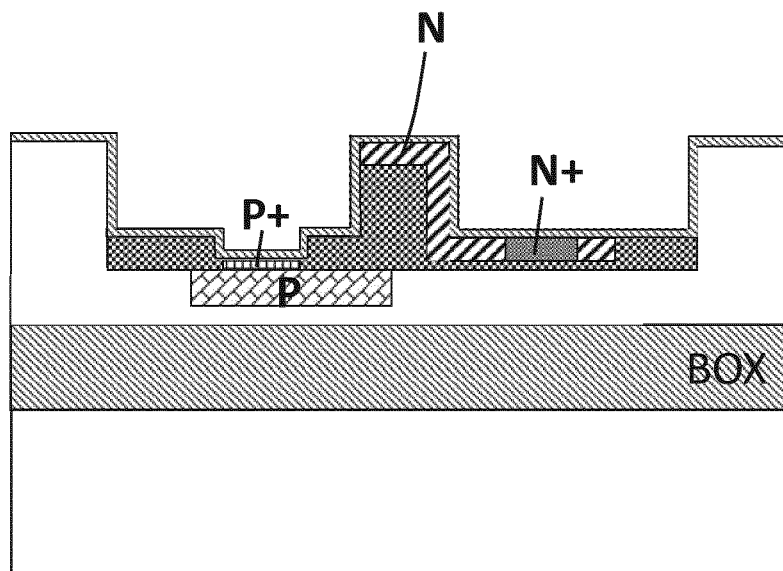
Figure 28N:
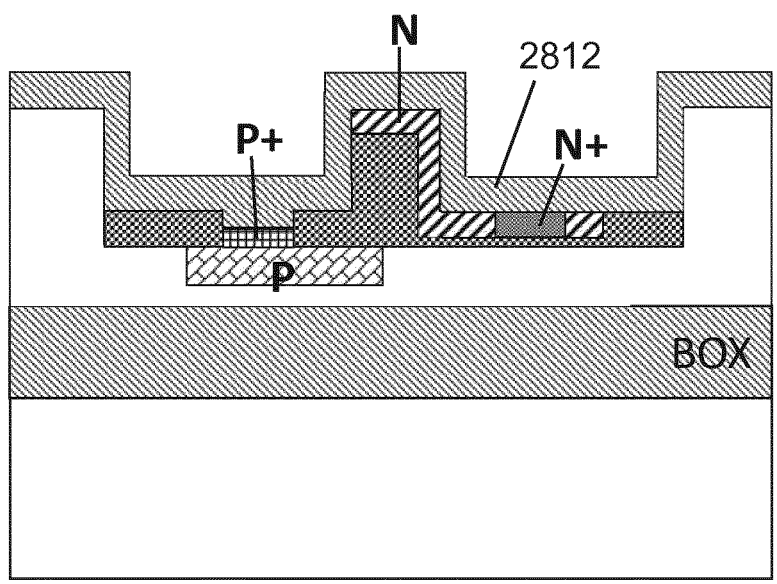
Figure 28O:
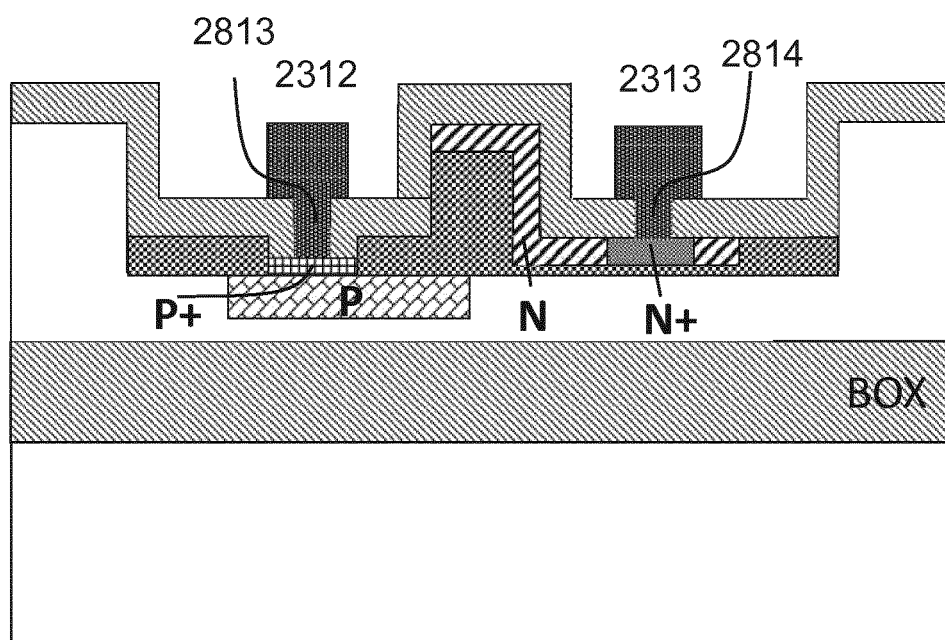

The fabrication process can be better understood with reference to FIG. 28a-o.

As shown in FIG. 28a, the starting structure is an upper silicon layer (Silicon on Insulator layer, SOI) 2401 overlying a buried oxide (BOX) layer. The BOX layer overlies a lower silicon layer 2403. In this embodiment, the intrinsic SOI overlay may have a thickness of 0.8 μm.

As shown in FIG. 28b, a hard mask 2802 is applied and etch carried out to create a cavity.

Within the cavity, as shown in FIG. 28c: the lower doped region 2304 of the optoelectronic component is created via ion implantation, a photo resist mask 2802b being used to cover all areas other than the desired implantation site. The mask would be deposited on top of a protection layer 2802c (in this case a protection layer of $SiO_2$, typical thicknesses of which could be 20-50 nm). In this embodiment, the lower doped region is p doped in character, but it is envisaged that this could be reversed (in which case the lower doped region would be n doped). As shown in FIG. 28d an annealing step would be carried out to activate the dopant of the implanted region. Typical parameters for this anneal could be: 1050° C. for 10 sec.

As shown in FIG. 28e, an epitaxial (epi) layer 2804 of an optically active material such as SiGe or Ge is grown within the cavity and then planarized, typically via Chemical-mechanical planarization, CMP (as shown in FIG. 28f).

As shown in FIG. 28g a waveguide 2805 is etched out of the OAM to create the optically active region (OAR) of the device and a protection layer formed. The OAR comprises of a waveguide portion with a slab portion either side. The waveguide and slabs are therefore formed of a single piece of epitaxially grown material such as SiGe or Ge.

A further mask 2805b is applied and a further etch carried out to etch a portion of the slab of the OAR so that a region 2805e of the slab of the OAM has a reduced height. The region of the OAM having the reduced height is located directly above at least a portion of the lower doped region 2304 which was implanted into the SOI itself.

As shown in FIG. 28i, a protective layer 2806a (typically $SiO_2$ is formed over the entire surface of the device).

As shown in FIG. 28j, a further mask 2806b is applied before ion implantation 2407 of the upper doped region (in this case an n doped region) is carried out. The ion implantation is implantation of the dopant species into the OAM itself and the resulting implanted region extends along the top of the waveguide, the side of the waveguide, and along a lateral portion 2309 extending outwards laterally away from the sidewall of the waveguide. The implantation of these regions is typically carried out in one step, by implanting at an angle to the direction of the sidewall of the waveguide. A suitable angle would be 45° or substantially 45°.

As shown in FIG. 28k, a further mask 2806c and implantation step 2807b is carried out to create a second zone of the upper doped region, the second zone having a greater dopant concentration than the first zone. In this case, the greater dopant concentration corresponds to an n+ doped region. This ion implantation is typically carried out at a vertical orientation (i.e. in a direction parallel to the sidewall of the waveguide).

As shown in FIG. 28l, a further implantation step 2807c (implanting a dopant of the opposite type to that deposited in the previous step) may be carried out to generate a second dopant zone of the lower doped region, in this case, a p+ zone within the slab of the OAM. This p+ region is located in the region of the OAM which has been etched to have a reduced height. It therefore lies directly on top of the p doped region implanted within the SOI and is in contact with the p doped area.

The dopant of the second zone of the lower doped region may be activated by annealing, for example at 630° C. for 10 sec (FIG. 28m).

Finally, as shown in FIGS. 28n and 28o, a passivation step is carried out and top cladding 2812 deposited. An open via 2813, 2814 is etched above each of the second zones (i.e. the p+ and n+ doped regions). Respective electrodes 2312, 2313 for contacting the respective second zones are formed by metallization.

A further embodiment of an optoelectronic device such as an EAM or photodiode is described below with reference to FIG. 29 and FIG. 30a-q. This embodiment differs from that of FIG. 27 and FIG. 28a-o in that the starting point is a SOI chip with a SOI overlay which is greater than the height of the waveguide. Initial steps are therefore carried out to create a transition taper from a first height $T_1$ (i.e. a first, larger, thickness of SOI overlay) to a second height $T_2$ (i.e. a second, smaller, thickness of SOI overlay). In the embodiments shown the first height $T_1$ may have a value of 3 μm and the second height $T_2$ may have a value of 0.8 μm.

Figure 30A:
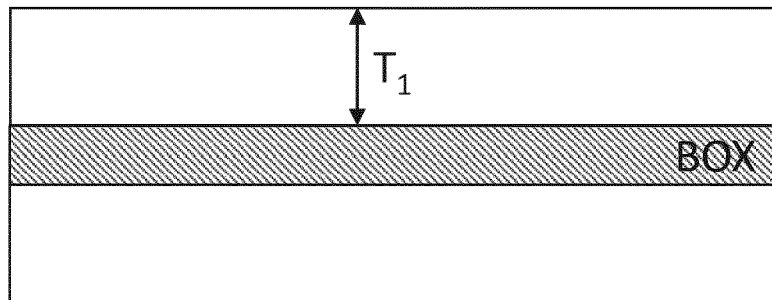
FIG. 30a-q shows method steps suitable for fabricating the optoelectronic device of FIG. 29.
Figure 30B:
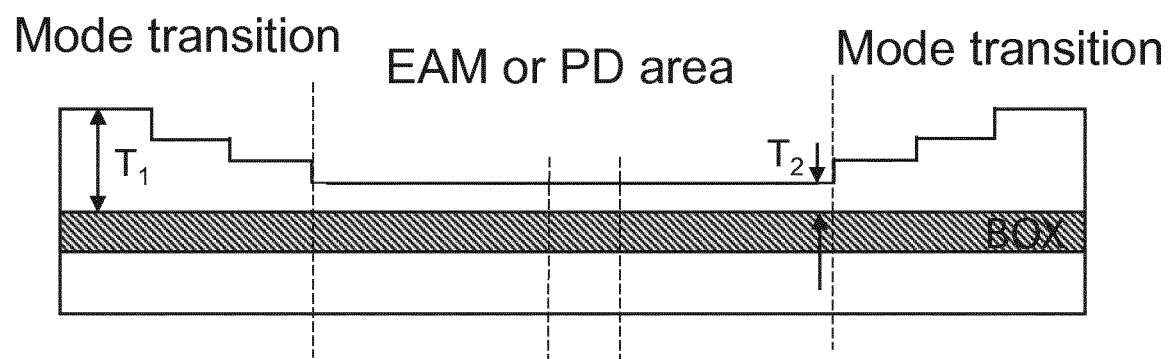
Figure 30C:
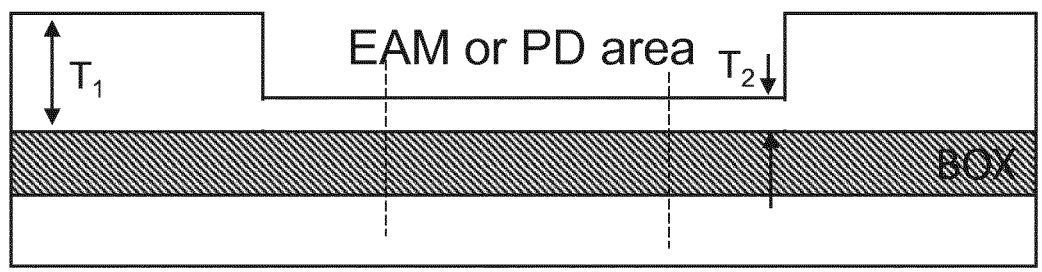
Figure 30D:
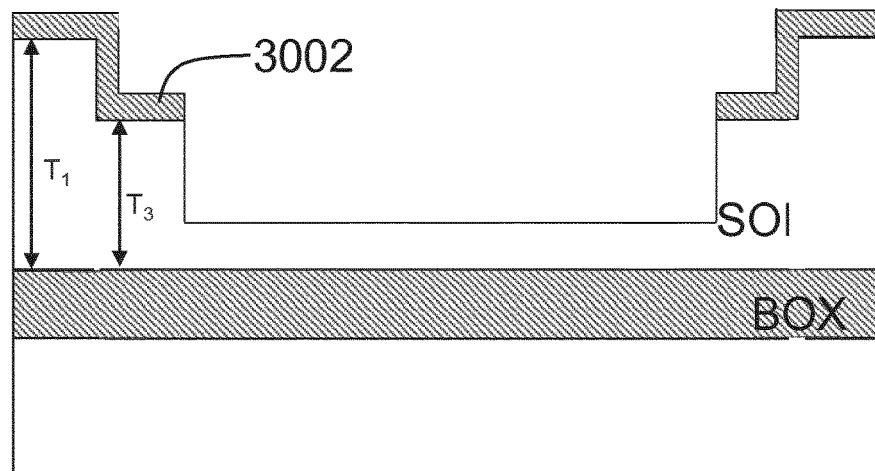
Figure 30E:
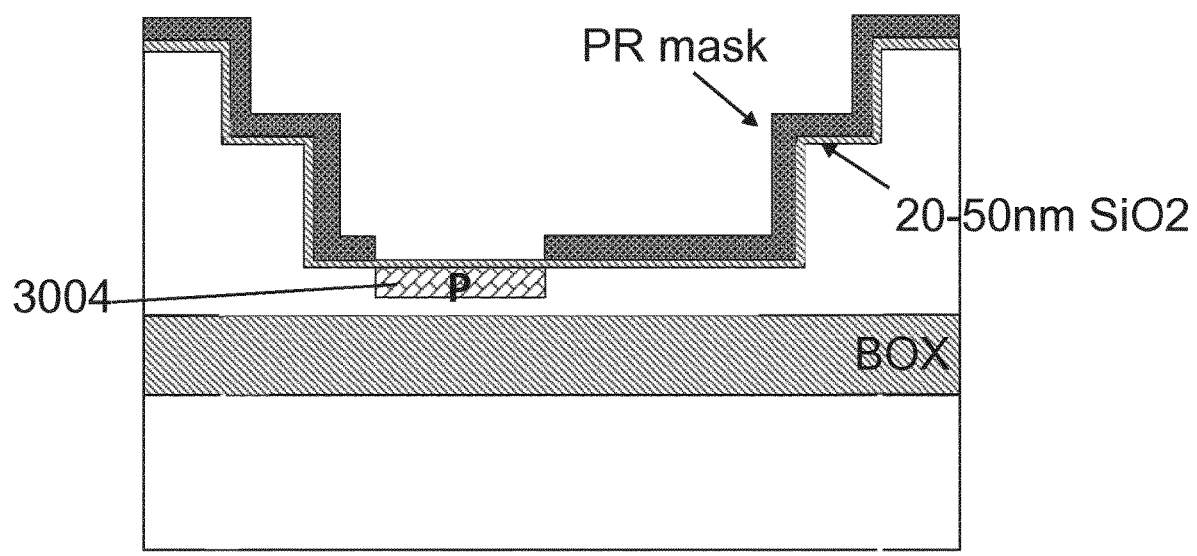
Figure 30F:
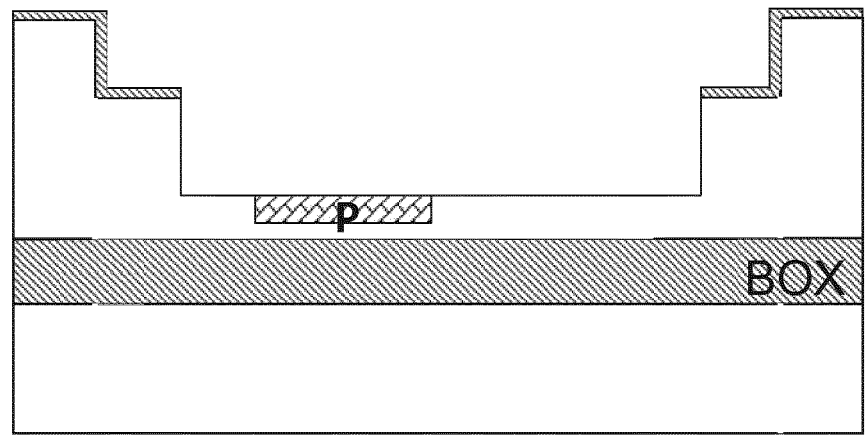
Figure 30G:
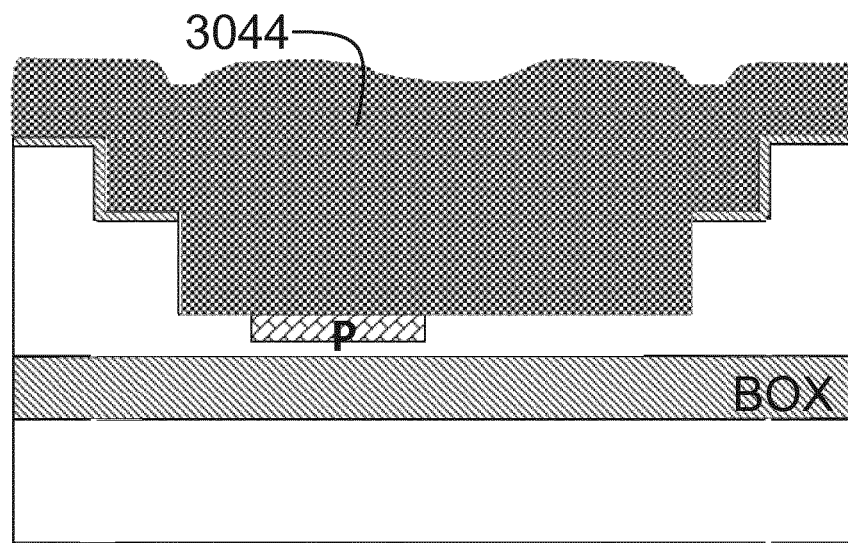
Figure 30H:
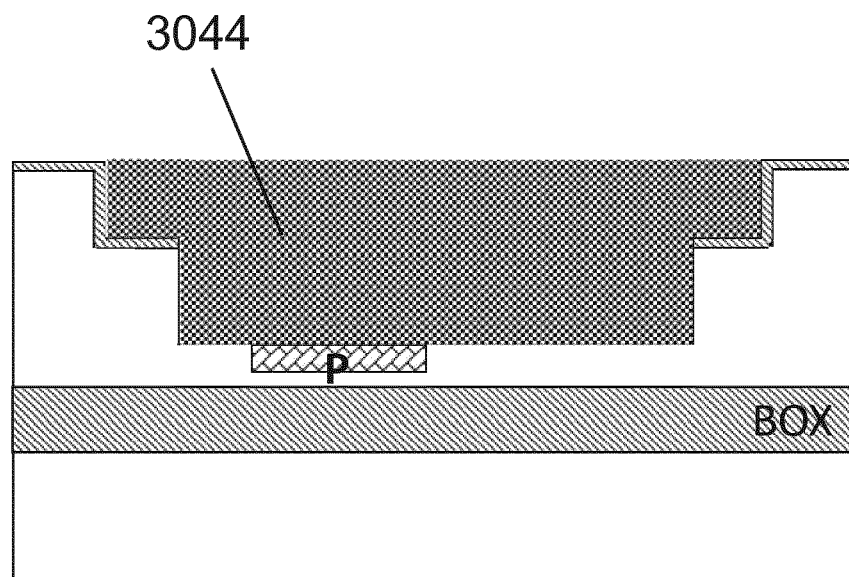
Figure 30I:
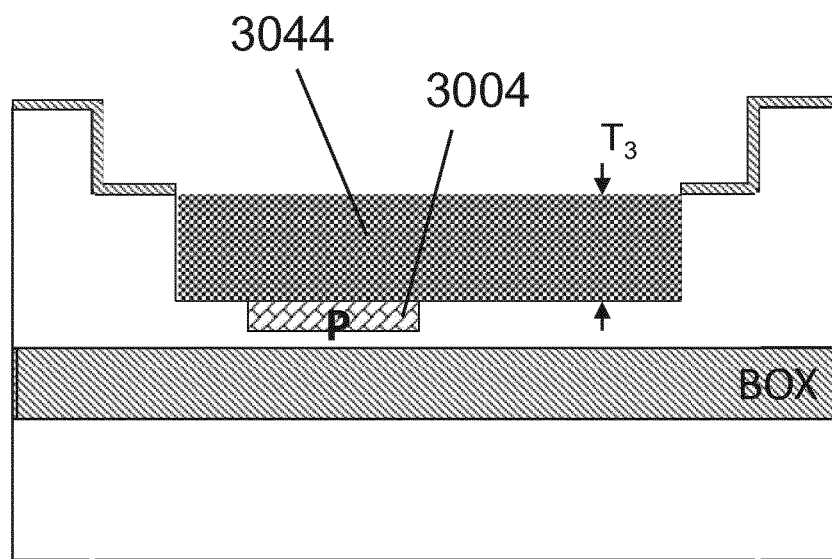
Figure 30J:
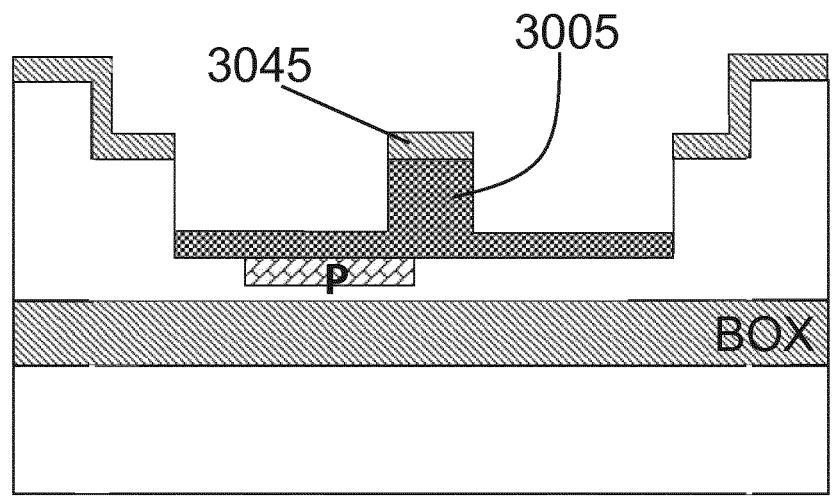
Figure 30K:
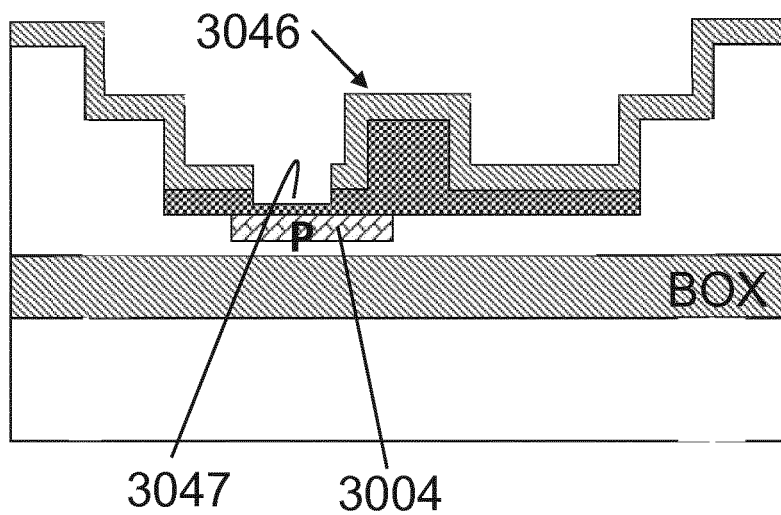
Figure 30L:
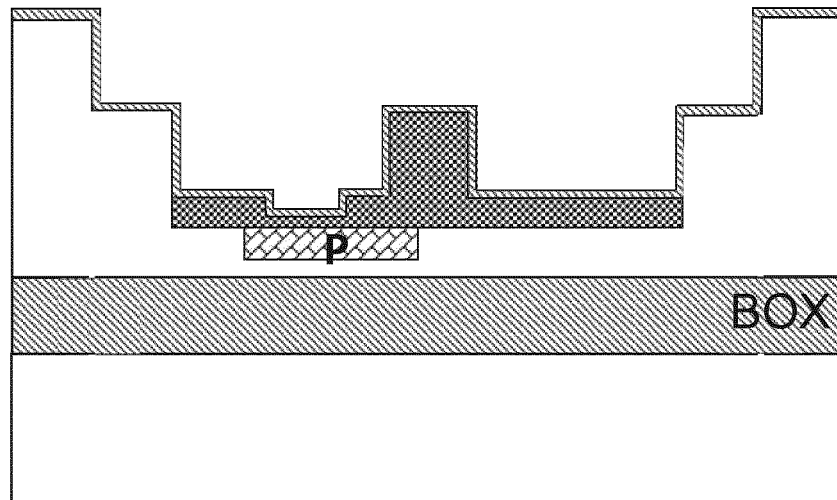
Figure 30M:
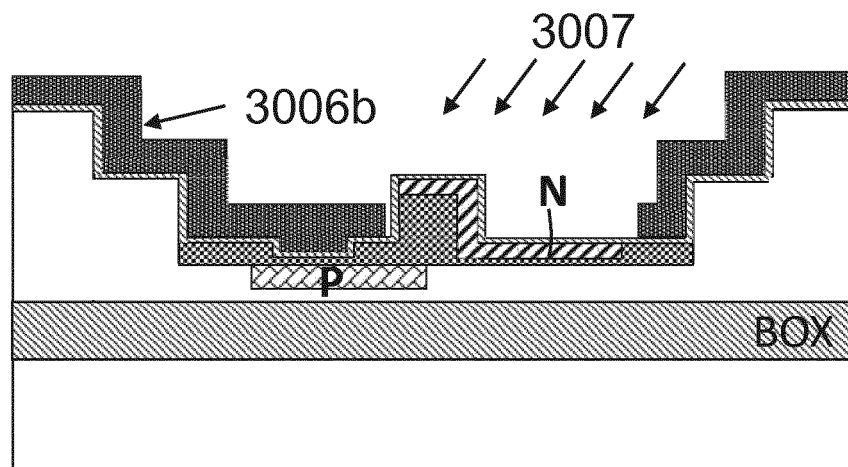
Figure 30N:
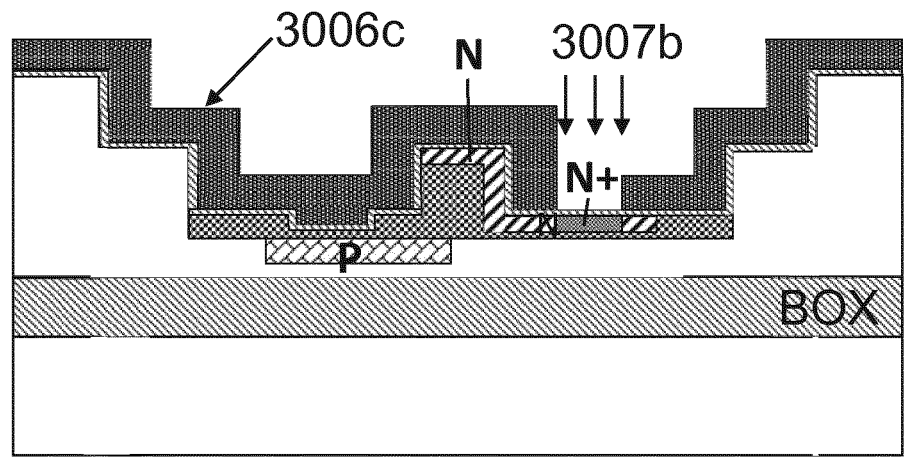
Figure 30O:
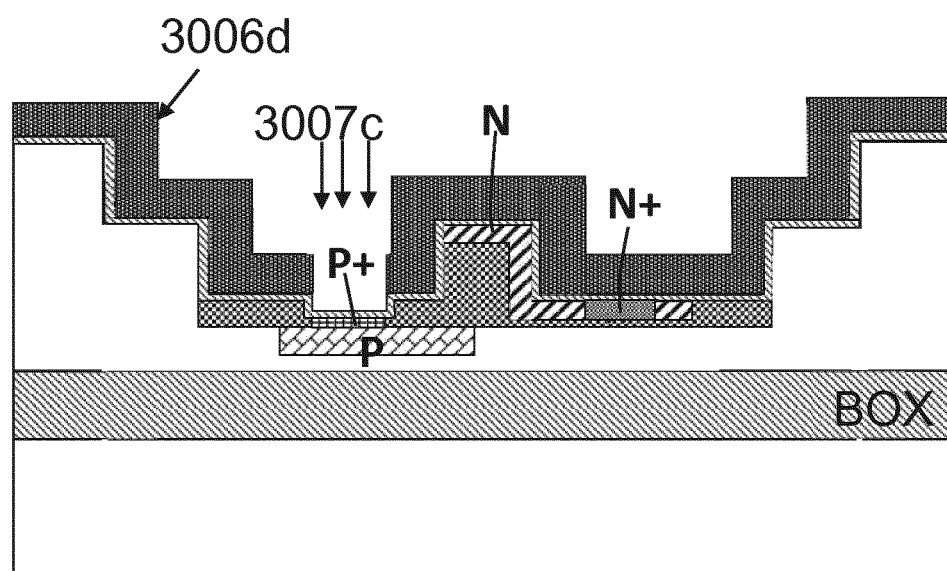
Figure 30P:
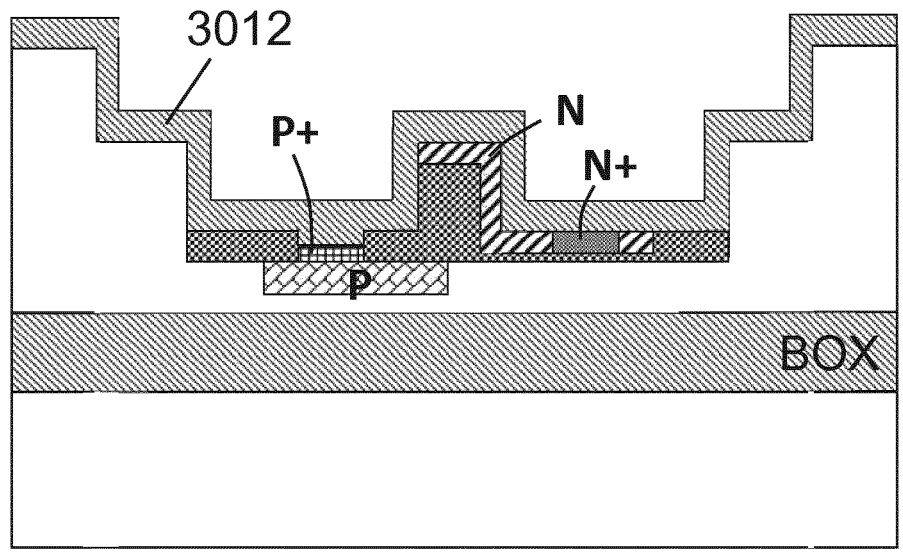
Figure 30Q:
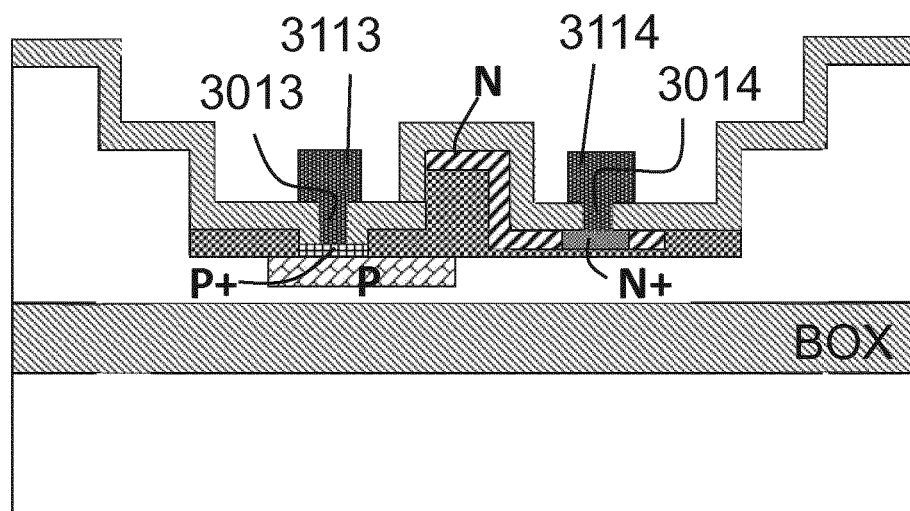

The fabrication process can be better understood with reference to FIG. 30a-q.

As shown in FIG. 30a the fabrication process starts from a platform having a first SOI thickness $T_1$ (i.e. a first height above the BOX). In the embodiment shown, a typical value would be 3 μm, although it is envisaged that other thicknesses would be possible.

As shown in FIG. 30b (which shows a light propagation view) and FIG. 30c (which shows a section view), a transition taper is fabricated from the first height $T_1$, to the second height $T_2$ via a stepped region $T_3$. The embodiments described herein describe a transition with three stepped heights. However, it is envisages that more steps could be added.

The remaining steps are carried out as described in more detail above in relation to FIG. 28. Briefly: FIG. 30d shows the application of hard mask 3002 and etch of SiGe cavity (etch not to scale in figure); and FIG. 30e: shows doping by ion implantation of the lower doped region 3004. In the embodiment described in FIG. 30, this lower doped region corresponds to a p-type doped region. However, it is envisaged that the p and n regions could be swapped.

FIG. 30f shows an annealing step (for example 1050° C., 10 sec) and the removal of the protection layer.

FIGS. 30g and 30h show the growth of an epitaxial layer of an OAM such as SiGe or Ge and then subsequent planarization respectively.

FIG. 30i depicts an additional etching step, not carried out in the embodiment of FIG. 28 in which the epitaxially grown OAM 3044 is etched to a height corresponding to the desired height of the waveguide above the SOI layer.

As shown in FIG. 30j, a waveguide 3005 is etched out of the OAM, once a hard mask 3045 has been applied, the etching being carried out to create the waveguide ridge of the device, and a protection layer formed.

The OAR comprises of a waveguide ridge portion with a slab portion either side. The waveguide and slabs are therefore formed of a single piece of epitaxially grown material 3044 such as SiGe or Ge.

Typically, the waveguide ridge may have a ridge width of 1.5 um and depth 0.4 um.

A further mask 3046 is applied, as shown in FIG. 30k to enable etching of a contact window, the contact window being a region 3047 of the slab of the OAR having a reduced height. The region of the OAM having the reduced height is located directly above at least a portion of the lower doped region 3004 which was implanted into the SOI itself.

In alternative embodiments (not shown), the etching could be continued until a via is formed, passing through the entire slab to the SOI layer underneath. That is to say, a hole would be formed in the slab, exposing the lower doped region underneath.

FIG. 30l: depicts a subsequent step in which a surface protection layer is formed. In some embodiments, this may be a layer of SiO$_2$, the thickness of which may be 20-50 nm.

FIG. 30m depicts deposition of a photoresist mask 3006b and ion implantation 3007 which provides doping of the upper doped region onto the waveguide ridge of the OAR and also a portion of the adjacent slab of the OAR. This is described in more detail in relation to FIG. 28j above.

As shown in FIG. 30n, a further mask 3006c and implantation step 3007b is carried out to create a second zone of the upper doped region, the second zone having a greater dopant concentration than the first zone. The second doped zone is located within a slab of the OAR, at a location laterally displaced from the waveguide ridge of the OAR. In this case, the greater dopant concentration corresponds to an n+ doped region. This ion implantation is typically carried out at a vertical orientation (i.e. in a direction parallel to the sidewall of the waveguide).

As shown in FIG. 30o, a further resist 3006d and implantation step 3007c (implanting a dopant of the opposite type to that deposited in the previous step) may be carried out to generate a second dopant zone of the lower doped region, in this case, a p+ zone within the slab of the OAM. This p+ region is located in the region of the OAM which has been etched to have a reduced height. It therefore lies directly on top of the p doped region implanted within the SOI and is in contact with the p doped area.

This doping of the second zone of the lower doped region is carried out on a slab of the OAR; the slab at the opposite side of the waveguide ridge to the slab onto which the second zone of the upper doped region was formed.

In the embodiment shown in FIG. 30o, the second zone of the lower doped region corresponds to a p+ doped region, so it may be followed by an annealing process at 630° C. for 10 seconds.

Finally, as shown in FIGS. 30p and 30q, a passivation step is carried out and top cladding 3012 deposited. An open via 3013, 3014 is etched above each of the second zones (i.e. the p+ and n+ doped regions). Respective electrodes 3113, 3114 for contacting the respective second zones are formed by metallization.

Figure 31:
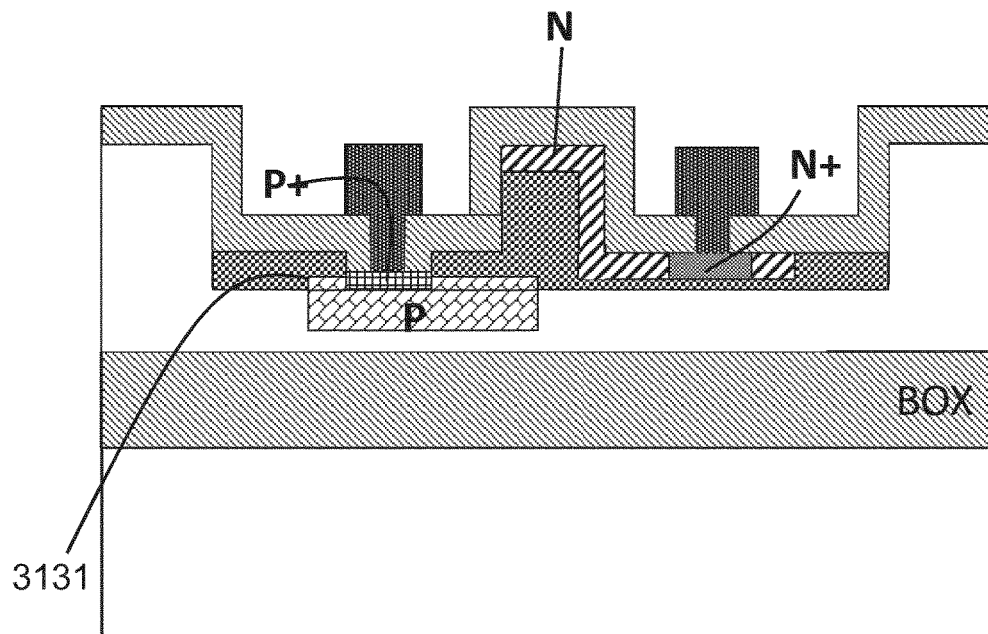
FIG. 31 depicts an embodiment in which the lower doped region migrates upwards into the OAR.

A further embodiment of an optoelectronic component is shown in FIG. 31.

This embodiment differs from that of FIG. 29 in that, during the growth of the epitaxial layer and later annealing processes, the dopant of the lower doped region (in this case p doped) diffuses from the bottom of the Si cavity into the OAR. The diffused area 3131 may have a thickness within a range of 10-200 nm. This "migrated" area caused by the dopant diffusion may reduce the series resistance and, where the device is a modulator, increase the modulator's bandwidth.

Figure 29:
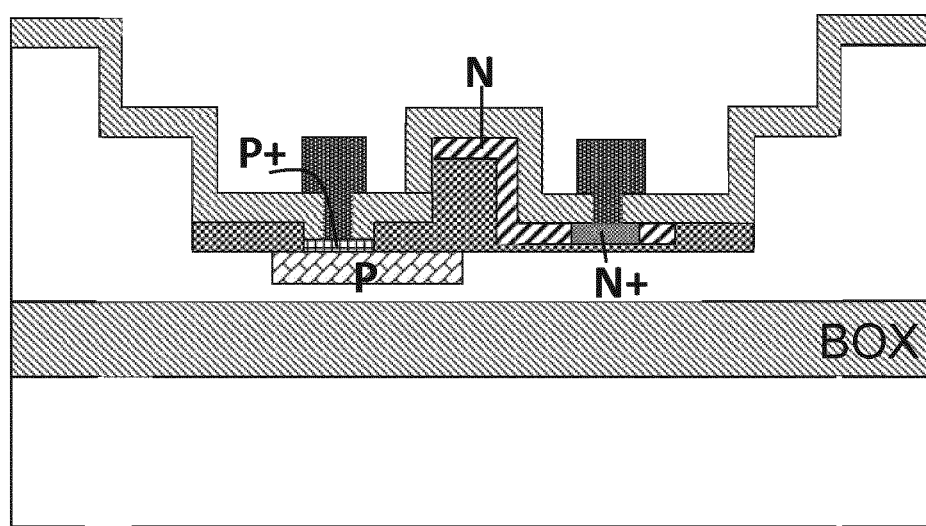
FIG. 29 shows a cross-sectional view taken through line B-B' shown in FIG. 1 of a further embodiment of an optoelectronic device on a 3-μm SOI platform.

This diffusion is shown as an adapted version of the embodiment of FIG. 29. However the additional diffusion step could be applied to any one or more of the embodiments described herein.

Figure 32:
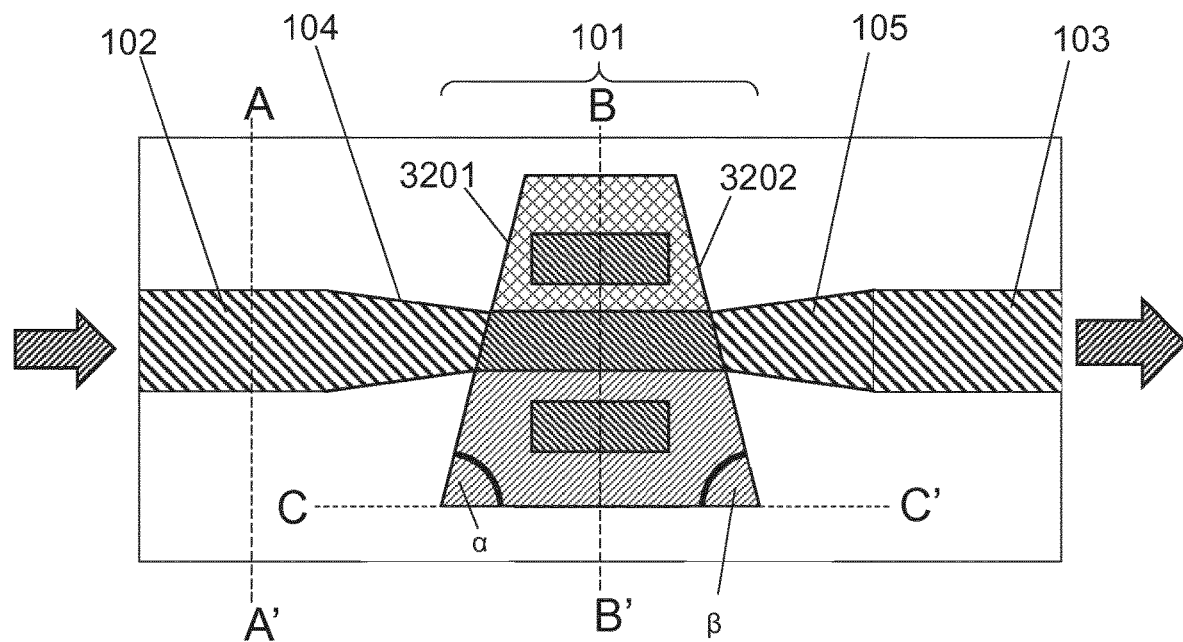
FIG. 32 shows a top down view of optoelectronic component, also shown is an input waveguide with an input taper waveguide region and an output waveguide with an output waveguide taper region.

Unlike the embodiment shown in FIG. 1, the embodiments discussed in relation to FIGS. 2-31 may be arranged to have angled interfaces (or angled facets) between the OAR and waveguides. In such angled embodiments, the cross-section along B-B' would be the same or substantially the same as that shown in FIGS. 2-31, but the device as viewed from above would exhibit angled interfaces. An example of such a further embodiment of an optoelectronic component is shown in FIG. 32.

This embodiment differs from the previous embodiments in that a first interface 3201 and second interface 3202 (or first and second angled facets) of the optoelectronic component 101 are respectively angled relative to a line C-C' which is parallel to the direction of light propagation through the device (indicated by the arrows) i.e. it is aligned with the guiding direction of the input waveguide 102 and output waveguide 103. The guiding direction is the direction along which the waveguides transmit light. In this example, the guiding direction of input waveguide 102 is from the left most surface (indicated by the left most arrow) towards the first interface 3201 in a direction generally perpendicular to the plane A-A'. The optoelectronic component can be described has having a trapezoidal geometry.

The first interface 3201 is the interface between the input taper region 104 of the input waveguide and the optoelectronic component 101. In comparison to the corresponding interface in, for example, FIG. 1, this first interface is at an angle α relative to the guiding direction of the input waveguide. α may take values of between 89° and 80°, and is in some examples 81°. Said another way, the vector of a plane coincident with the interface would be non-parallel with respect to the guiding direction of the input waveguide (whereas, in FIG. 1, the vector would be parallel).

The second interface 3202 is the interface between the output taper region 105 of the output waveguide 103 and the optoelectronic component 101. In comparison to the corresponding interface in, for example, FIG. 1, this second interface is at an angle β relative to the direction of light through the device. β may take values of between 89° and 80°, and is in some cases 81°. Said another way, the vector of a plane coincident with the second interface would be non-parallel to the guiding direction of the output waveguide (whereas, in FIG. 1, the vector would be parallel).

The angles α and β may be equal or may be different. In the example shown in FIG. 32, the angles are equal but have an opposite sense i.e. one is measured clock-wise and the other anti-clockwise such that they are not parallel. The interfaces may be parallel, and in which case they would have the same sense. It may be that only one of the angles has a value which is not equal to 90°.

Figure 33:
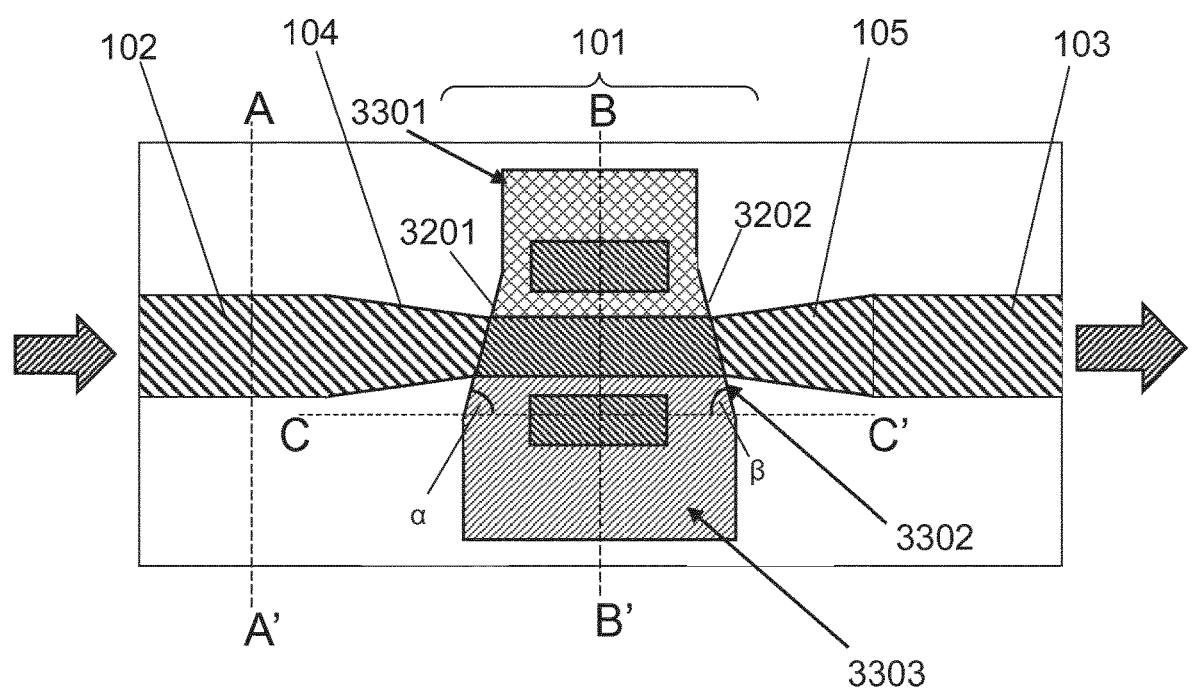
FIG. 33 shows a top down view of an optoelectronic component, also shown is an input waveguide with an input taper waveguide region and an output waveguide with an output waveguide taper region where a part of the optoelectronic component has a trapezoidal geometry.

A further embodiment of an optoelectronic component is shown in FIG. 33.

This embodiment differs from the embodiment shown in FIG. 32 in that, whilst a first interface 3201 and second interface 3202 are still angled relative to the line C-C', the entire geometry of the component is not trapezoidal. Instead, the optoelectronic component can be generally discussed as having three regions: a first and second rectangular region 3301 and 3303, and a trapezoidal region 3302 between the first and second rectangular regions. Therefore, the angled interfaces are provided by trapezoidal region 3302 whilst the first and second rectangular regions may provide electrical contacts that may be easier to form. In this embodiment the waveguide interfaces can be provided at non-perpendicular angles with respect to the direction of propagation of light through the device, and can also minimize the portion of the walls of the optically active material interface that are non-parallel to each other, and not parallel to the crystal planes of the Si wafer. This can be helpful because if the cavity within the which the optically active material is grown has non-parallel walls, has walls that are not parallel to the crystal planes of the Si wafer, or has corner that are non-90°, the optical or electronic quality of the material could degrade during or after epitaxial growth of the material.

Figure 34:
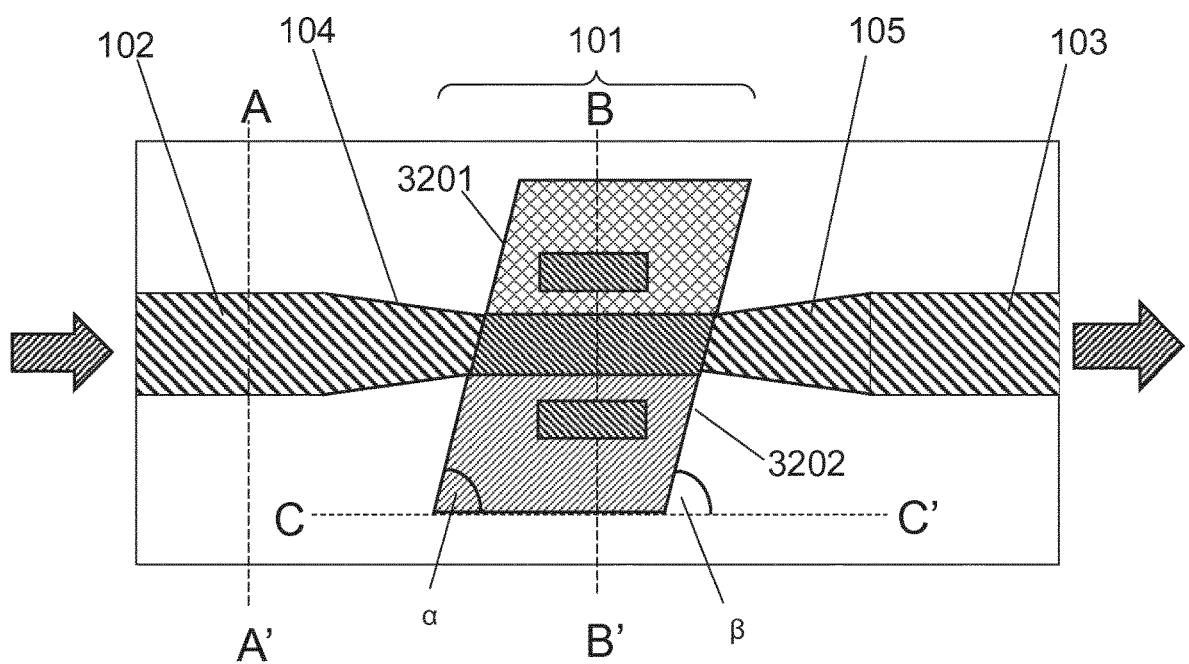
FIG. 34 shows a top down view of an optoelectronic component, also shown is an input waveguide with an input taper waveguide region and an output waveguide with an output waveguide taper region where the optoelectronic component has a parallelogramal geometry.

A further embodiment of an optoelectronic component is shown in FIG. 34.

This embodiment differs from the embodiments shown in FIG. 32 and FIG. 33 in that the optoelectronic component has a generally parallelogramal geometry. Therefore the first and second interface 3201 and 3202 are provided by the parallel sides of the parallelogram which intersect the first and second tapered waveguides 104 and 105. In this embodiment the walls of the cavity within the optically active material may be grown to be parallel along their entire lengths whilst still having the waveguide interfaces at non-perpendicular angles with respect to the direction of propagation of light through the device, but the corners of the cavity are not 90°, and two sides are not parallel to the crystal planes of the Si wafer.

Figure 35:
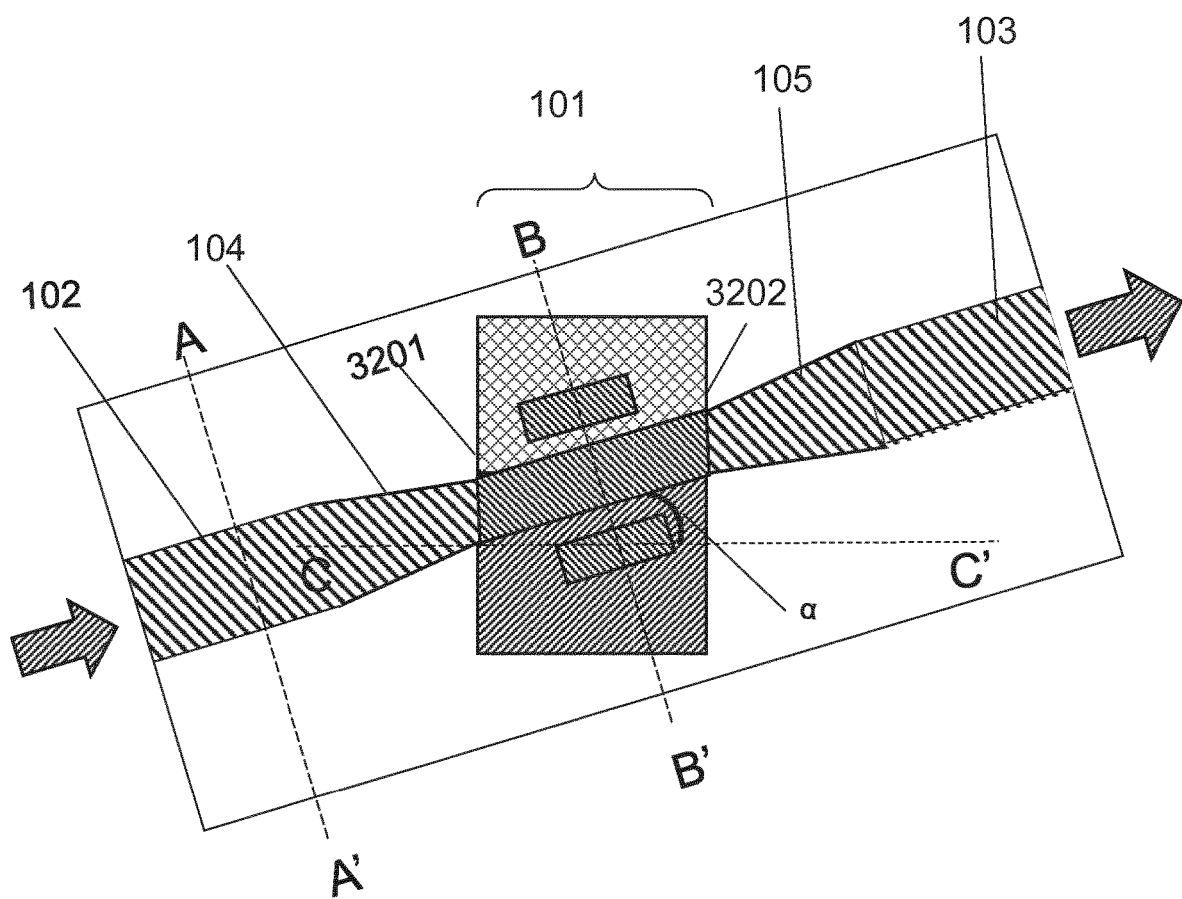
FIG. 35 shows a top down view of an optoelectronic component, also shown is an input waveguide with an input taper waveguide region and an output waveguide with an output waveguide taper region where the optoelectronic component has a rectangular geometry but has been disposed at an angle relative to the input and output waveguides.

A further embodiment of an optoelectronic component is shown in FIG. 35.

This embodiment differs from the embodiments shown in FIGS. 32-34 in that the optoelectronic component 101 has a generally rectangular geometry. However, the component 101 is disposed at an angle α relative direction C-C'. Therefore the two sides of the rectangle which intersect the first and second tapered waveguides provide the first and second interfaces 3201 and 3202. In this embodiment, the walls of the cavity within which the optically active material may be grown to be parallel along their entire lengths, and keep all corners of the cavity at 90°, and still have the waveguide interfaces at non-perpendicular angles with respect to the direction of propagation of light through the device, but all four sides are not parallel to the crystal planes of the Si wafer. Alternatively, the cavity walls could be orientated parallel to the Si wafer crystal planes, and instead the waveguides can be angled with respect to the Si wafer crystal planes. In this variant, it may be necessary to rotate the wafer off of the normal angle (parallel to the Si wafer crystal planes) during the diode implantation steps. This can help to ensure that the implantation beam is incident uniformly along the waveguide in the optically active region.

Figure 37:
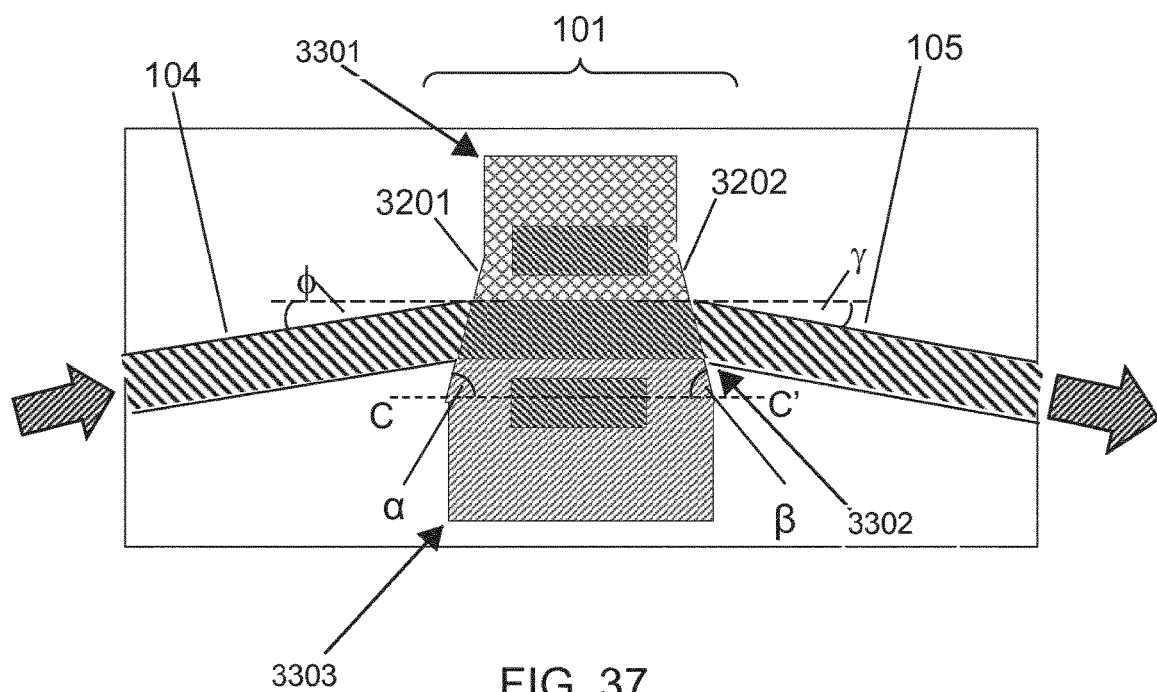
FIG. 37 shows a top down view of an optoelectronic component, also shown is an input waveguide and output waveguide which are disposed at angles φ and γ to the guiding direction of the OAR.

A further embodiment of an optoelectronic component is shown in FIG. 37.

This embodiment differs from embodiments shown previously in that the input waveguide 104 and output waveguide 105 are disposed at respective angles ϕ and γ to the guiding direction of the OAR (the guiding direction of the OAR being parallel to line C-C').

A further embodiment of an optoelectronic is shown in FIG. 37.

Figure 36:
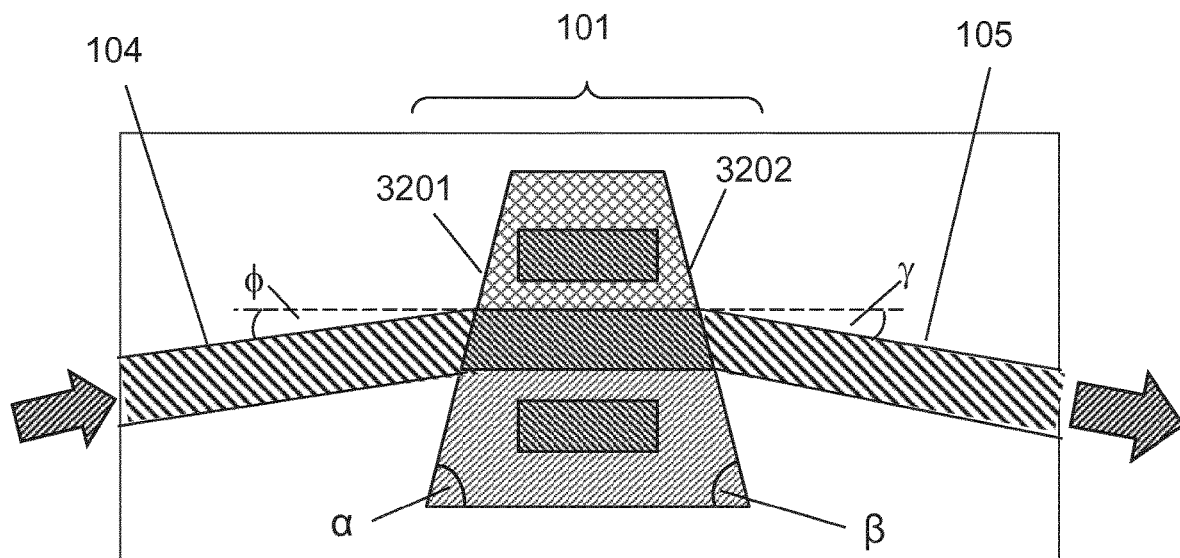
FIG. 36 shows a top down view of an optoelectronic component, also shown is an input waveguide and output waveguide which are disposed at angles φ and γ to the guiding direction of the OAR.

This embodiment differs from that shown in FIG. 36 in that it can be described as having generally three regions: a first and second rectangular region 3301 and 3303, and a trapezoidal region 3302 between the first and second rectangular regions. Therefore, the angled interfaces are provided by trapezoidal region 3302 whilst the first and second rectangular regions may provide electrical contacts that may be easier to form. In this embodiment the waveguide interfaces can be provided at non-perpendicular angles with respect to the direction of propagation of light through the device, and can also minimize the portion of the walls of the optically active material interface that are non-parallel to each other, and not parallel to the crystal planes of the Si wafer. This can be helpful because if the cavity within the which the optically active material is grown has non-parallel walls, has walls that are not parallel to the crystal planes of the Si wafer, or has corner that are non-90°, the optical or electronic quality of the material could degrade during or after epitaxial growth of the material.

Figure 38:
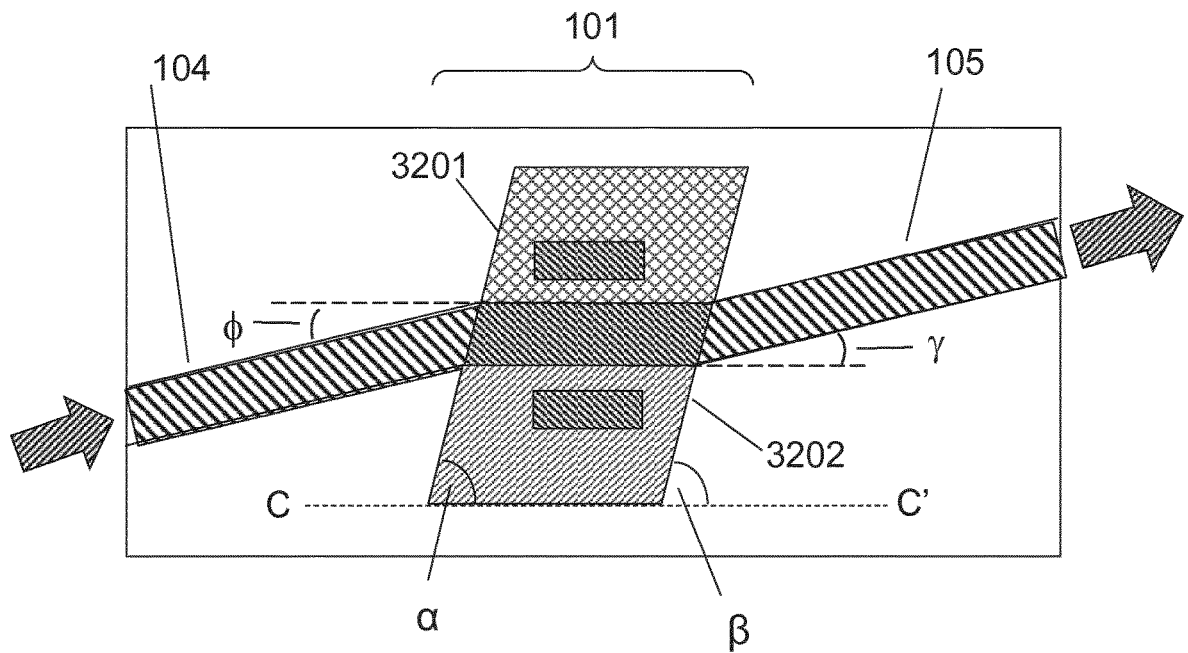
FIG. 38 shows a top down view of an optoelectronic component, also shown is an input waveguide and output waveguide which are disposed at angles φ and γ to the guiding direction of the OAR and are arranged such that their guiding directions are parallel.

A further embodiment of an optoelectronic component is shown in FIG. 38.

This embodiment differs from the embodiments shown in FIGS. 36 and 37 in that the optoelectronic component has a generally parallelogramal geometry. Therefore, the first and second interfaces 3201 and 3202 are provided by the parallel sides of the parallelogram which intersects the first and second tapered waveguides 104 and 105. In this embodiment, the walls of the cavity within the optically active material may be grown to be parallel along their entire lengths whilst still having the waveguide interfaces at non-perpendicular angles with respect to the direction of the light through the device, but the corners of the cavity are not 90°, and the two sides are not parallel to the crystal planes of the Si wafer.

Figure 39:
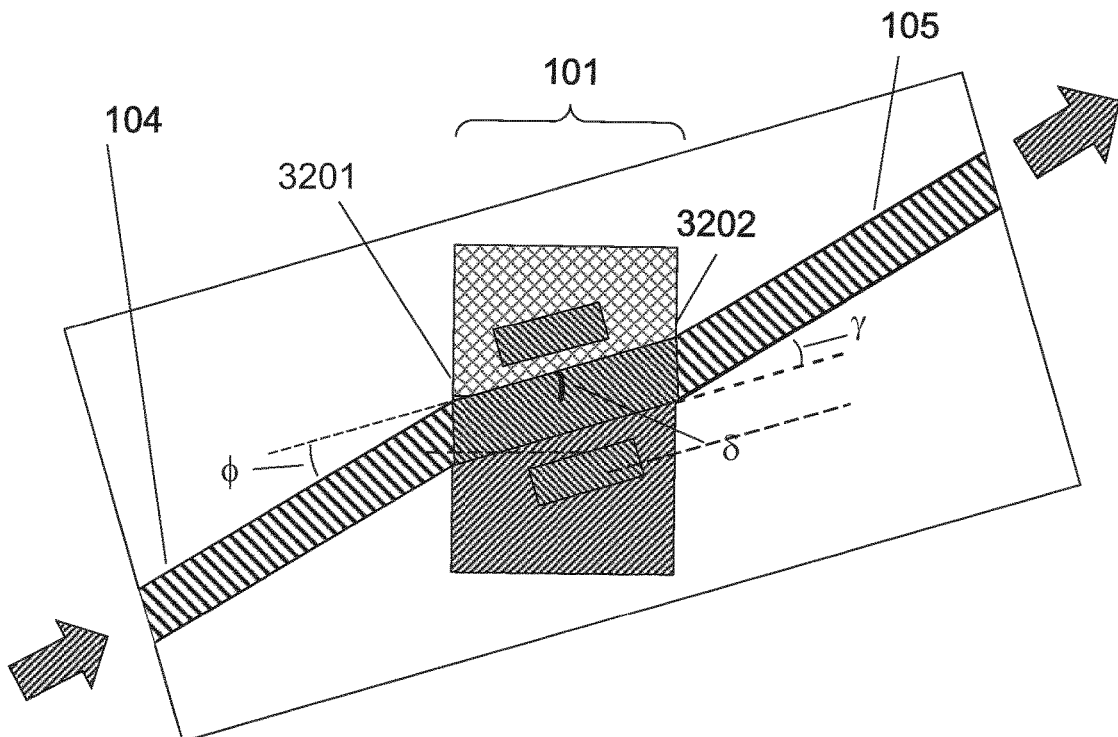
FIG. 39 shows a top down view of an optoelectronic component, also shown is an input waveguide and output waveguide which are disposed at angles φ and γ to the guiding direction of the OAR and are arranged such that their guiding directions are parallel and the entire component has been rotated by an angle S relative to a global horizontal.

A further embodiment of an optoelectronic component is shown in FIG. 39.

This embodiment differs from the embodiment shown in FIG. 38 in that the optoelectronic component 101 has a generally rectangular geometry. However, the component 101 is disposed at an angle δ relative to a guiding direction of the OAR (this indicated by the dotted line labeled δ). Therefore, the two sides of the rectangle which intersect the first and second tapered waveguides provide the first and second interfaces 3201 and 3202. In this embodiment, the walls of the cavity within which the optically active material may be grown to be parallel along their entire lengths, and keep all corners of the cavity at 90°, and still have the waveguide interfaces at non-perpendicular angles with respect to the direction of propagation of light through the device, but all four sides are not parallel to the crystal planes of the Si wafer. Alternatively, the cavity walls could be orientated parallel to the Si wafer crystal planes, and instead the waveguides can be angled with respect to the Si wafer crystal planes. In this variant, it may be necessary to rotate the wafer off the normal angle (parallel to the Si wafer crystal planes) during the diode implantation steps. This can help to ensure that the implantation beam is incident uniformly along the waveguide in the optically active region.

In the embodiments discussed above, the angled interfaces may extend beyond the waveguide. For example, the angled interfaces 3201 and 3202 in FIG. 32 extend beyond a width of the waveguide.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

Embodiments of the invention can be further understood with reference to the disclosures set out in the following numbered paragraphs:

Paragraph 1: An optoelectronic component including a waveguide, the waveguide comprising
　an optically active region (OAR), the OAR having an upper and a lower surface;
　a lower doped region, wherein the lower doped region is located at and/or adjacent to at least a portion of a lower surface of the OAR, and extends laterally outwards from the OAR in a first direction;
　an upper doped region, wherein the upper doped region is located at and/or adjacent to at least a portion of an upper surface of the OAR, and extends laterally outwards from the OAR in a second direction; and
　an intrinsic region located between the lower doped region and the upper doped region.

Paragraph 2: An optoelectronic component according to paragraph 1, wherein the doped regions are configured to generate an electric field through the OAR with a field direction, wherein the field direction is different from the first and second directions.

Paragraph 3: An optoelectronic component according to paragraph 2, wherein the field direction is perpendicular to the first and second directions.

Paragraph 4: An optoelectronic component according to paragraph 2, wherein the field direction is angled relative to the first and second directions.

Paragraph 5: An optoelectronic component according to any preceding paragraph, wherein the optically active region is formed from SiGe or Ge.

Paragraph 6: An optoelectronic component according to any preceding paragraph, further comprising a first electrode contacting the lower doped region at a first contact surface, and a second electrode contacting the upper doped region at a second contact surface.

Paragraph 7: An optoelectronic component according to any preceding paragraph, wherein the first contact surface is laterally offset from the waveguide portion in the first direction.

Paragraph 8: An optoelectronic component according to any preceding paragraph, wherein the second contact surface is laterally offset from the OAR in the second direction.

Paragraph 9: An optoelectronic component according to any preceding paragraph, wherein the first and second contact surfaces are equidistant from the OAR.

Paragraph 10: An optoelectronic component according to any preceding paragraph, wherein the first and second contact surfaces are in the same lateral plane.

Paragraph 11: An optoelectronic component according to any preceding paragraph wherein the lower doped region is formed from doped Si.

Paragraph 12: An optoelectronic component according to any preceding paragraph, wherein the upper doped region comprises a first upper zone and a second upper zone.

Paragraph 13: An optoelectronic component according to any one of paragraphs 9-12, wherein the average dopant concentration in the second upper zone is higher than the dopant concentration in the first upper zone.

Paragraph 14: An optoelectronic component according to paragraph 9, wherein first upper zone is at and/or adjacent to the upper surface of the OAR, and second upper zone extends outwards from the OAR in the second direction.

Paragraph 15: An optoelectronic component according to paragraph 9 or 10, wherein the first upper zone is a doped region of the waveguide.

Paragraph 16: An optoelectronic component according to any preceding paragraph, wherein the lower doped region comprises a first lower zone and a second lower zone.

Paragraph 17: An optoelectronic component according to paragraph 13, wherein first lower zone is at and/or adjacent to the lower surface of the OAR, and second lower zone extends outwards from the waveguide portion in the first direction.

Paragraph 18: A method for fabricating an optoelectronic component, comprising:
　an etching step, wherein a waveguide trench is etched into an SOI platform;
　a lower implantation step, comprising implanting a first dopant species into a base of the trench and on the SOI platform on a first lateral side of the trench, to thereby form a lower doped region;
　an upper lateral implantation step, comprising implanting a second dopant species on the SOI platform adjacent the second lateral side of the trench to form a upper lateral doped region;
　a waveguide formation step, comprising depositing optically active material into the waveguide trench;
　a protection step, comprising forming a protective layer covering the doped regions and the waveguide;
　an upper implantation step, comprising implanting the second dopant species into an upper region of the waveguide to form an upper doped region, wherein the upper lateral doped region and the upper doped region are contiguous;
　a metallization step, wherein
　a first electrode is fabricated, wherein the first electrode contacts the lower doped region at a contact point laterally offset from the waveguide in a first direction;
　a second electrode is fabricated, wherein the second electrode contacts the upper lateral doped region at a contact point laterally offset from the waveguide in a second direction.

Paragraph 19: A method according to paragraph 18, wherein the first and second electrodes are fabricated at the same time.

Paragraph 20: A method according to paragraph 18 or paragraph 19, further comprising a secondary lower implantation step, wherein a secondary lateral doped region laterally offset from the waveguide trench is doped with first dopant species to have a higher dopant concentration than the lower doped region.

Paragraph 21: A method according to any one of paragraphs 18-20, further comprising a secondary upper lateral implantation step, wherein a secondary upper lateral doped region laterally offset from the waveguide trench is doped with second dopant species to have a higher dopant concentration than the upper lateral doped region.

Paragraph 22: A method according to any one of paragraphs 18-21, further comprising a waveguide etching step, wherein the deposited optically active material is etched back to form a waveguide.

Paragraph 23: A method according to any one of paragraphs 18-22, further comprising a passivation step, wherein the passivation step comprises the formation of a passivation layer.

The invention claimed is:

1. An optoelectronic component comprising:
   an optically active region (OAR), including a waveguide ridge, the OAR having an upper surface and a lower surface;
   a lower doped region, wherein the lower doped region is located at and/or adjacent to at least a portion of the lower surface of the OAR, and extends laterally outwards from the waveguide ridge in a first direction;
   an upper doped region, wherein a portion of the upper doped region is located at and/or adjacent to at least a portion of the upper surface of the waveguide ridge of the OAR, and the upper doped region extends along a sidewall of the waveguide ridge and laterally outwards from the waveguide ridge in a second direction; and
   an intrinsic region consisting of an intrinsic material located between the lower doped region and the upper doped region and in direct contact with the lower doped region and the upper doped region,
   wherein the lower doped region does not directly contact the upper doped region.

2. The optoelectronic component of claim 1, further comprising a first electrode contacting the lower doped region at a first contact surface, and a second electrode contacting the upper doped region at a second contact surface;
   wherein the first contact surface is laterally offset from the waveguide ridge in the first direction; and
   wherein the second contact surface is laterally offset from the waveguide ridge in the second direction.

3. The optoelectronic component of claim 2, wherein the first and second contact surfaces are aligned with one another along a lateral plane.

4. The optoelectronic component of claim 2, wherein the upper doped region comprises a first doped zone and a second doped zone;
   wherein a dopant concentration in the second doped zone of the upper doped region is higher than a dopant concentration in the first doped zone of the upper doped region; and
   wherein the second doped zone of the upper doped region comprises the second contact surface.

5. The optoelectronic component of claim 4, wherein the first doped zone of the upper doped region is at and/or adjacent to the upper surface of the waveguide ridge of the OAR, and the second doped zone is located at a position which is laterally displaced from the waveguide ridge in the second direction.

6. The optoelectronic component of claim 2, wherein the lower doped region comprises a first doped zone and a second doped zone;
   wherein a dopant concentration in the second doped zone of the lower doped region is higher than a dopant concentration in the first doped zone of the lower doped region; and
   wherein the second doped zone of the lower doped region comprises the first contact surface.

7. The optoelectronic component of claim 6, wherein
   the first doped zone of the lower doped region is located directly underneath the OAR; and
   the second doped zone of the lower doped region is located within the OAR, laterally displaced from the waveguide ridge, the second doped zone of the lower doped region having an upper surface which comprises the first contact surface, and a lower surface which is in direct contact with the first doped zone of the lower doped region.

8. The optoelectronic component of claim 7, wherein the second doped zone of the lower doped region is located within a portion of the OAR having a reduced height.

9. The optoelectronic component of claim 8, wherein the portion of the OAR having a reduced height is a portion of the OAR which has been etched before a dopant species of the lower doped region is added.

10. The optoelectronic component of claim 6, wherein
    the first doped zone of the lower doped region is located directly underneath the OAR;
    the OAR including a slab which extends in the first direction, the slab exhibiting a via through its thickness at a location laterally displaced from the waveguide ridge in the first direction; and
    wherein the second doped zone of the lower doped region is located within the first doped zone, directly underneath the via.

11. The optoelectronic component of claim 2, wherein the upper doped region, intrinsic region, and lower doped regions form a PIN diode.

12. The optoelectronic component of claim 1, wherein the lower doped region is partially adjacent to the lower surface of the OAR and partially migrated into the OAR at the lower surface.

13. The optoelectronic component of claim 1, wherein the upper doped region is fully located within the OAR.

14. The optoelectronic component of claim 1, wherein the OAR is formed from an electro-absorption material in which the Franz-Keldysh effect occurs in response to application of an applied electric field.

15. The optoelectronic component of claim 1, wherein the OAR is formed from a light absorbing material suitable for generating a current upon detection of light when a voltage bias is applied across the upper and lower doped regions.

16. The optoelectronic component according to claim 1, wherein the optically active region (OAR) includes a waveguide ridge, a first slab on a first side of the waveguide ridge and a second slab on a second side of the of the waveguide ridge, the OAR having an upper surface and a lower surface;
    wherein the lower doped region is located adjacent to a portion of a lower surface of the OAR; the lower doped region also extending laterally along and adjacent to the first slab of the OAR, away from the waveguide ridge in a first direction; and
    wherein the upper doped region is located within at least a portion of an upper surface of the waveguide ridge of the OAR, and extends laterally outwards along the second slab of the OAR in a second direction.

17. The optoelectronic component of claim 16, wherein the lower doped region which is located adjacent to a portion of a lower surface of the OAR, migrates into the OAR at the same portion of the lower surface of the OAR.

18. The optoelectronic component of claim 1, further comprising an interface between the optoelectronic component and a first waveguide, wherein the interface is at an angle α relative to a guiding direction of the first waveguide which is less than 90°.

19. The optoelectronic component of claim 18, wherein the interface is at an angle of between 89° and 80° relative to guiding direction of the first waveguide.

20. The optoelectronic component of claim 18, further comprising a second interface between the optoelectronic component and a second waveguide, wherein the second interface is at an angle β relative to a guiding direction of the second waveguide which is less than 90°.

21. The optoelectronic component of claim 1, wherein an input waveguide of a first refractive index forms an input interface with the waveguide ridge of the OAR, the waveguide ridge of the OAR having a second refractive index;
    wherein the angle between the input waveguide and the normal to the input interface corresponds to a given angle of incidence; and
    wherein the angle between the waveguide ridge of the OAR and the normal to the input interface corresponds to the angle of refraction as calculated by Snell's law using the first refractive index, second refractive index and the given angle of incidence.

22. The optoelectronic component of claim 21, wherein an output waveguide of a third refractive index forms an output interface with the waveguide ridge of the OAR;
    wherein the angle between the waveguide ridge of the OAR and the normal to the output interface corresponds to a second given angle of incidence; and
    wherein the angle between the output waveguide and the normal to the output interface corresponds to the angle of refraction as calculated by Snell's law using the second refractive index, third refractive index and the second given angle of incidence.

23. A Mach-Zehnder modulator having a first waveguide arm and a second waveguide arm, the first waveguide arm comprising the optoelectronic component of claim 1.

24. The Mach-Zehnder modulator of claim 23, wherein a first contact surface of the first waveguide arm corresponds to a second contact surface of the second waveguide arm to form a shared central contact surface between the first waveguide arm and the second waveguide arm; and
    wherein a first electrode of the first waveguide arm corresponds to a second electrode of the second waveguide arm to form a shared central electrode between the first waveguide arm and the second waveguide arm.

25. The Mach-Zehnder modulator of claim 23, wherein the first waveguide arm further comprises an interface between the OAR and a first waveguide, wherein the interface is at an angle α relative to a guiding direction of the first waveguide which is less than 90°.

26. The Mach-Zehnder modulator of claim 25, wherein the interface is at an angle of between 89° and 80° relative to the guiding direction of the first waveguide.

27. The Mach-Zehnder modulator of claim 25, further comprising a second interface between the OAR and a second waveguide, wherein the second interface is at an angle β relative to a guiding direction of the second waveguide which is less than 90°.

28. The optoelectronic component of claim 1, formed on a silicon-on-insulator platform having a silicon substrate, an insulator layer on top of the silicon substrate, and a silicon device layer on top of the insulator layer,
    wherein the lower doped region is a doped portion of the silicon device layer, the portion of the silicon device layer being located adjacent the lower surface of the OAR, and
    wherein the upper doped region is a doped region of the OAR located at the doped region of the OAR.

29. The optoelectronic component of claim 28, wherein the OAR is SiGe or Ge.

* * * * *